(12) United States Patent
Chang et al.

(10) Patent No.: US 10,302,914 B2
(45) Date of Patent: *May 28, 2019

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Nai-Yuan Tang, Taichung (TW)

(73) Assignee: ABILITY OPTO-ELECTRONICS TECHNOLOGY CO. LTD., Taichung (TW)

(*) Notice: Subject to any disclaimer, the term of this patent is extended or adjusted under 35 U.S.C. 154(b) by 11 days.

This patent is subject to a terminal disclaimer.

(21) Appl. No.: 15/680,781

(22) Filed: Aug. 18, 2017

(65) Prior Publication Data
US 2018/0329179 A1    Nov. 15, 2018

(30) Foreign Application Priority Data
May 15, 2017    (TW) ............................. 106116009 A

(51) Int. Cl.
*G02B 13/00*    (2006.01)
*G02B 9/64*    (2006.01)
*G02B 3/04*    (2006.01)

(52) U.S. Cl.
CPC ........... *G02B 13/0045* (2013.01); *G02B 3/04* (2013.01); *G02B 9/64* (2013.01)

(58) Field of Classification Search
CPC .............. G02B 3/04; G02B 9/00–9/64; G02B 13/002–13/0045; G02B 13/18
USPC ................. 359/676–695, 708–718, 745–795
See application file for complete search history.

(56) References Cited

U.S. PATENT DOCUMENTS

| | | | |
|---|---|---|---|
| 7,675,694 B2* | 3/2010 | Kim .................... | G02B 13/0045 359/793 |
| 9,995,910 B1* | 6/2018 | Hudyma .................. | G02B 9/64 |
| 2017/0192200 A1* | 7/2017 | Hsieh ..................... | G02B 13/04 |
| 2017/0293110 A1* | 10/2017 | Kim ........................ | B60R 11/04 |
| 2018/0039049 A1* | 2/2018 | Lee ..................... | G02B 13/0045 |
| 2018/0180844 A1* | 6/2018 | Fu .......................... | G02B 1/041 |
| 2018/0239117 A1* | 8/2018 | Lee ........................ | G02B 13/06 |

* cited by examiner

*Primary Examiner* — Nicholas R. Pasko
(74) *Attorney, Agent, or Firm* — Muncy, Geissler, Olds & Lowe, P.C.

(57) ABSTRACT

The invention discloses an eight-piece optical lens for capturing image and an eight-piece optical module for capturing image. In the order from an object side to an image side, the optical lens along the optical axis comprises a first lens with refractive power; a second lens with refractive power; a third lens with refractive power; a fourth lens with refractive power; a fifth lens with refractive power; a sixth lens with refractive power; a seventh lens with refractive power; and an eighth lens with refractive power; and at least one of the image-side surface and object-side surface of each of the eight lens elements can be aspheric. The optical lens can increase aperture value and improve the imagining quality for use in compact cameras.

21 Claims, 30 Drawing Sheets

OPTICAL IMAGE CAPTURING SYSTEM

CROSS-REFERENCE TO RELATED APPLICATION

This application claims priority from Taiwan Patent Application No. 106116009, filed on May 15, 2017, in the Taiwan Intellectual Property Office, the disclosure of which is hereby incorporated by reference in its entirety for all purposes.

BACKGROUND OF THE INVENTION

1. Field of the Invention

The present invention relates to an optical image capturing system, and more particularly is about a minimized optical image capturing system which can be applied to electronic products.

2. Description of the Related Art

In recent years, as the popularization of portable electronic devices with camera functionalities, it has elevated the demand for optical system. The photosensitive element of ordinary optical system is commonly selected from charge coupled device (CCD) or complementary metal-oxide semiconductor sensor (CMOS Sensor). Besides, as the advancement in semiconductor devices manufacturing technology, the pixel size of the photosensitive element is gradually minimized, and the optical systems make a development about the high pixel field by degrees. Therefore, it increases daily the demand of the quality of the image.

Conventional optical systems of portable electronic devices usually adopt six lenses or seven lenses structure as main structure. However, since the pixel of the portable electronic devices continuously raises, and more end-users are demanding for cameras having large aperture, which is equipped with functionalities such as low light mode or night mode. The conventional optical image capturing systems may not be sufficient to meet those advanced photography requirements.

Therefore, it is an important issue about how to effectively increase the amount of light admitted into the optical image capturing system and further elevate the image quality thereof.

SUMMARY OF THE INVENTION

The aspect of embodiment of the present invention directs to an optical image capturing system and an optical image capturing lens which use combination of refractive powers, convex surfaces and concave surfaces of eight lenses (the convex surface or concave surface in the present invention is the description of the change of geometrical shape of an object-side surface or an image-side surface of each lens at different heights from an optical axis in principle) to further increase the amount of light admitted into the optical image capturing system, and to improve quality of image formation, so as to be applied to minimized electronic products.

In addition, when it comes to certain application field of optical imaging, there will be a need to capture image with respect to light sources having wavelengths of both visible and infrared ranges, and an example of this kind of application is the IP video surveillance camera, which is equipped with the Day & Night function. The visible light for human vision locates in wavelengths ranging from 400 to 700 nm in the spectrum, but the image formed on the camera sensor includes the infrared light which is invisible to human eyes. Therefore, in order to ensure that the sensor retains only the visible light for human eyes eventually, an IR Cut filter Removable (ICR) may be configured before the lens of the IP video surveillance camera under certain circumstances, so as to enhance the "fidelity" of the image. The ICR of the IP video surveillance camera may completely filter out the infrared light in daytime mode so as to avoid color cast; whereas in night mode, it allows the infrared light to pass through the lens to enhance the image brightness. Nevertheless, the element of the ICR occupies a significant amount of space and is also expensive, so that being disadvantageous to the design and manufacture of the miniaturized surveillance cameras in the future.

The type of embodiment of the present disclosure simultaneously directs to an optical image capturing system and an optical image capturing lens, which utilize the refractive power of eight lenses, combination of convex and concave surfaces, as well as the selection of materials thereof, so as to make the image capturing system reduce the difference between the image focal length of visible light and the image focal length of infrared light, that is, to achieve the near effect of "confocal" such that the use of ICR elements is not essential.

The lens parameters related to the magnification rate of the optical image capturing system and the optical image capturing lens The optical image capturing system and the optical image capturing lens of the present disclosure may be simultaneously designed and applied to the biometrics, such as facial recognition. When the embodiment of the present disclosure is used to capture images of the facial recognition, the infrared light may be selected for the operation wavelength. For a face with a width of about 15 centimeters (cm) at a distance of about 25-30 cm, at least 30 horizontal pixels may capture the image thereof in the horizontal direction of an image sensing device (the pixel size thereof is 1.4 micrometers ($\mu$m)). The linear magnification of the infrared light on the image plane is LM, which meets the following conditions: LM=(30 horizontal pixels)*(1.4 $\mu$m pixel size)/(15 cm of the width of the photographed object); wherein LM≥0.0003. In the meantime, the visible light may also be selected for the operation wavelength. For a face with a width of about 15 cm at a distance of about 25-30 cm, at least 50 horizontal pixels may capture the image thereof in the horizontal direction of an image sensing device (the pixel size thereof is 1.4 micrometers ($\mu$m)).

The terminologies together with their numerals for the lens parameters related to the embodiment of the present disclosure are provided in the following paragraphs for reference to subsequent descriptions:

Regarding the visible spectrum, the present disclosure may select the wavelength of 555 nm as the primary reference wavelength and the basis for the measurement of focus shift; and regarding the infrared spectrum (700-1000 nm), the present disclosure may select the wavelength of 850 nm as the primary reference wavelength and the basis for the measurement of focus shift.

The optical image capturing system has a first image plane and a second image plane. The first image plane is an image plane particularly for the visible light, which is perpendicular to the optical axis, and the central field of view (FOV) of the first image plane has a maximum value of the through-focus modulation transfer function rate (MTF) at the first spatial frequency; and the second image plane is an image plane particularly for the infrared light, which is perpendicular to the optical axis, and the central field of view of the second image plane has a maximum value of the through-focus modulation transfer function rate (MTF) at the first spatial frequency. Besides, the optical image capturing system also has a first average image plane and a second average image plane. The first average image plane is an image plane particularly for the visible light, which is perpendicular to the optical axis, and configured at the average position of the through-focus positions, where the values of MTF at the central field of view, 0.3 field of view and the 0.7 field of view are at their respective maximums at the first spatial frequency; and the second average image plane is an image plane for the infrared light, which is particularly perpendicular to the optical axis, and configured at the average position of the through-focus positions, where the values of MTF at the central field of view, 0.3 field of view and the 0.7 field of view are at their respective maximums at the first spatial frequency.

The aforementioned first spatial frequency is set to be a half of the spatial frequency (half frequency) of the image sensing device (sensor) used in the present disclosure. For example, for an image sensing device including the pixel size of 1.12 m or less, the quarter spatial frequency, half spatial frequency (half frequency) and full spatial frequency (full frequency) in the characteristic diagram of modulation transfer function thereof are at least 110 cycles/mm, 220 cycles/mm and 440 cycles/mm, respectively. Lights of any field of view may be further divided into the sagittal ray and the tangential ray.

The focus shift amounts, corresponding to the respective maximum values of through-focus MTF of the sagittal ray at the central field of view, 0.3 field of view and 0.7 field of view for the visible light of the optical image capturing system of the present disclosure, are denoted as VSFS0, VSFS3 and VSFS7 (the unit of measurement: mm), respectively; and the maximum values of through-focus MTF of the sagittal ray at the central field of view, 0.3 field of view and 0.7 field of view for the visible light are denoted as VSMTF0, VSMTF3 and VSMTF7, respectively. On the other hand, the focus shift amounts, corresponding to the respective maximum values of through-focus MTF of the tangential ray at the central field of view, 0.3 field of view and 0.7 field of view for the visible light of the optical image capturing system of the present disclosure, are denoted as VTFS0, VTFS3 and VTFS7 (the unit of measurement: mm), respectively; and the maximum values of through-focus MTF of the tangential ray at the central field of view, 0.3 field of view and 0.7 field of view for the visible light are denoted as VTMTF0, VTMTF3 and VTMTF7, respectively. The average focus shift amount (position) of both focus shift amounts of the aforementioned sagittal ray at three fields of view and tangential ray at three fields of view for the visible light is denoted as AVFS (the unit of measurement: mm), which is equal to the absolute value $|(VSFS0+VSFS3+VSFS7+VTFS0+VTFS3+VTFS7)/6|$.

The focus shift amounts, corresponding to the respective maximum values of through-focus MTF of the sagittal ray at the central field of view, 0.3 field of view and 0.7 field of view for the infrared light of the optical image capturing system of the present disclosure, are denoted as ISFS0, ISFS3 and ISFS7, respectively. The average focus shift amount (position) of the focus shift amounts of the aforementioned sagittal ray at three fields of view for the infrared light is denoted as AISFS (unit of measurement: mm); and the maximum values of through-focus MTF of the sagittal ray at the central field of view, 0.3 field of view and 0.7 field of view for the infrared light are denoted as ISMTF0, ISMTF3 and ISMTF7, respectively. On the other hand, the focus shift amounts, corresponding to the respective maximum values of through-focus MTF of the tangential ray at the central field of view, 0.3 field of view and 0.7 field of view for the infrared light of the optical image capturing system of the present disclosure, are denoted as ITFS0, ITFS3 and ITFS7 (the unit of measurement: mm), respectively. The average focus shift amount (position) of the focus shift amounts of the aforementioned tangential ray at three fields of view for the infrared light is denoted as AITFS (unit of measurement: mm); and the maximum values of through-focus MTF of the tangential ray at the central field of view, 0.3 field of view and 0.7 field of view for the infrared light are denoted as ITMTF0, ITMTF3 and ITMTF7, respectively. The average focus shift amount (position) of both focus shift amounts of the aforementioned sagittal ray at three fields of view and tangential ray at three fields of view for the infrared light is denoted as AIFS (the unit of measurement: mm), which is equal to the absolute value $|(ISFS0+ISFS3+ISFS7+ITFS0+ITFS3+ITFS7)/6|$.

The focus shift amount between the focal points of the central fields of view (RGB/IR) for the visible light and the infrared light of the entire optical image capturing system is denoted as FS (i.e. the wavelength of 850 nm versus wavelength of 555 nm, the unit of measurement: mm), which is equal to the absolute value $|(VSFS0+VTFS0)/2-(ISFS0+ITFS0)/2|$. The difference (focus shift amount) between the average focus shift amounts at three fields of view for the visible light and the infrared light (RGB/IR) of the entire optical image capturing system is denoted as AFS (i.e. the wavelength of 850 nm versus wavelength of 555 nm, the unit of measurement: mm), which is equal to the absolute value of $|AIFS-AVFS|$.

The Lens Parameter Related to the Length or the Height

The maximum height of an image of the optical image capturing system is expressed as HOI. The height of the optical image capturing system is expressed as HOS. The distance from the object-side surface of the first lens of the optical image capturing system to the image-side surface of the eighth lens of the optical image capturing system is expressed as InTL. The distance from a fixed aperture (stop) of the optical image capturing system to the image plane of the optical image capturing system is expressed as InS. The distance from the first lens of the optical image capturing system to the second lens of the optical image capturing system is expressed as In12 (example). The thickness of the first lens of the optical image capturing system on the optical axis is expressed as TP1 (example).

The Lens Parameter Related to the Material

A coefficient of dispersion of the first lens in the optical image capturing system is expressed as NA1 (example); a refractive index of the first lens is expressed as Nd1 (example).

The Lens Parameter Related to Angle of View

An angle of view is expressed as AF. Half of the view angle is expressed as HAF. An angle of a chief ray is expressed as MRA.

The Lens Parameter Related to the Exit/Entrance Pupil

An entrance pupil diameter of the optical image capturing system is expressed as HEP. The maximum effective half diameter (EHD) of any surface of a single lens refers to a perpendicular height between the optical axis and an intersection point, where the incident ray at the maximum view angle passing through the most marginal entrance pupil intersects with the surface of the lens. For example, the maximum effective half diameter of the object-side surface of the first lens is expressed as EHD11. The maximum effective half diameter of the image-side surface of the first lens is expressed as EHD 12. The maximum effective half diameter of the object-side surface of the second lens is expressed as EHD21. The maximum effective half diameter of the image-side surface of the second lens is expressed as EHD22. The maximum effective half diameters of any surfaces of other lens in the optical image capturing system are expressed in the similar way.

The Lens Parameter Related to the Arc Length of the Lens Shape and the Outline of Surface of the Lens The outline curve length of the maximum effective half diameter of any surface of single lens refers to an arc length of a curve, which starts from an intersection point as an initial point where the surface of the lens intersects the optical axis of the optical image capturing system, travels along the surface outline of the lens, and ends at the point which defines the maximum effective half diameter; the arc length between the aforementioned two points is the outline curve length of the maximum effective half diameter, and denoted as ARS. For example, the length of the maximum effective half diameter outline curve of the object-side surface of the first lens is denoted as ARS11. The length of the maximum effective half diameter outline curve of the image-side surface of the first lens is denoted as ARS12. The length of the maximum effective half diameter outline curve of the object-side surface of the second lens is denoted as ARS21. The length of the maximum effective half diameter outline curve of the image-side surface of the second lens is denoted as ARS22. The outline curve lengths of the maximum effective half diameter of any surface of the other lenses in the optical image capturing system are denoted according to the regular pattern shown above.

The outline curve length of ½ entrance pupil diameter (HEP) of any surface of single lens refers to an arc length of curve, which starts from an intersection point as an initial point where the surface of the lens intersects the optical axis of the optical image capturing system, travels along the surface outline of the lens, and ends at a coordinate point on the surface where the vertical height from the optical axis to the coordinate point is equivalent to ½ entrance pupil diameter; the arc length between the aforementioned two points is the outline curve length of the ½ entrance pupil diameter (HEP), and denoted as ARE. For example, the outline curve length of the ½ entrance pupil diameter (HEP) of the object-side surface of the first lens is denoted as ARE11. The outline curve length of the ½ entrance pupil diameter (HEP) of the image-side surface of the first lens is denoted as ARE12. The outline curve length of the ½ entrance pupil diameter (HEP) of the object-side surface of the second lens is denoted as ARE21. The outline curve length of the ½ entrance pupil diameter (HEP) of the image-side surface of the second lens is denoted as ARE22. The outline curve lengths of the ½ entrance pupil diameter (HEP) of any surface of the other lenses in the optical image capturing system are denoted according to the regular pattern shown above.

The Lens Parameter Related to the Surface Depth of the Lens

The distance paralleling an optical axis, which is measured from the intersection point where the object-side surface of the eighth lens crosses the optical axis to the terminal point of the maximum effective half diameter of the object-side surface of the eighth lens is expressed as InRS81 (depth of the EHD). The distance paralleling an optical axis, which is measured from the intersection point where the image-side surface of the eighth lens crosses the optical axis to the terminal point of the maximum effective half diameter of the image-side surface of the eighth lens is expressed as InRS82 (depth of the EHD). The depths of the EHD (sinkage values) on the object-side surface or the image-side surface of other lens are expressed in similar way.

The Lens Parameter Related to the Shape of the Lens

The critical point C is a point which is tangential to the tangential plane being perpendicular to the optical axis on the specific surface of the lens except that an intersection point which crosses the optical axis on the specific surface of the lens. In addition to the description above, for example, the perpendicular distance between the critical point C51 on the object-side surface of the fifth lens and the optical axis is HVT51 (example). The perpendicular distance between a critical point C52 on the image-side surface of the fifth lens and the optical axis is HVT52 (example). The perpendicular distance between the critical point C61 on the object-side surface of the sixth lens and the optical axis is HVT61 (example). The perpendicular distance between a critical point C62 on the image-side surface of the sixth lens and the optical axis is HVT62 (example). The perpendicular distances between the critical point on the image-side surface or object-side surface of other lens such as the eighth lens and the optical axis are expressed in similar way.

The inflection point on the object-side surface of the eighth lens that is nearest to the optical axis is expressed as IF811, and the sinkage value of that inflection point IF811 is expressed as SGI811 (example). That is, the sinkage value SGI811 is a horizontal displacement distance paralleling the optical axis, which is measured from the intersection point crossing the optical axis on the object-side surface of the eighth lens to the inflection point nearest to the optical axis on the object-side surface of the eighth lens. The perpendicular distance between the inflection point IF811 and the optical axis is HIF811 (example). The inflection point on the image-side surface of the eighth lens that is nearest to the optical axis is expressed as IF821, and the sinkage value of the inflection point IF821 is expressed as SGI821 (example). That is, the sinkage value SGI821 is a horizontal displacement distance paralleling the optical axis, which is measured from the intersection point crossing the optical axis on the image-side surface of the eighth lens to the inflection point nearest to the optical axis on the image-side surface of the eighth lens. The perpendicular distance between the inflection point IF821 and the optical axis is HIF821 (example).

The inflection point on object-side surface of the eighth lens that is second nearest to the optical axis is expressed as IF812, and the sinkage value of the inflection point IF812 is expressed as SGI812 (example). That is, the sinkage value SGI812 is a horizontal displacement distance paralleling the optical axis, which is measured from the intersection point crossing the optical axis on the object-side surface of the eighth lens to the inflection point second nearest to the optical axis on the object-side surface of the eighth lens. The perpendicular distance between the inflection point IF812 and the optical axis is HIF812 (example). The inflection point on image-side surface of the eighth lens that is second nearest to the optical axis is expressed as IF822, and the sinkage value of that inflection point IF822 is expressed as SGI822 (example). That is, the sinkage value SGI822 is a horizontal displacement distance paralleling the optical axis, which is measured from the intersection point crossing the optical axis on the image-side surface of the eighth lens to the inflection point second nearest to the optical axis on the image-side surface of the eighth lens. The perpendicular distance between the inflection point IF822 and the optical axis is HIF822 (example).

The inflection point on the object-side surface of the eighth lens that is third nearest to the optical axis is expressed as IF813, and the sinkage value of the inflection point IF813 is expressed as SGI813 (example). That is, the sinkage value SGI813 is a horizontal displacement distance paralleling the optical axis, which is measured from the intersection point crossing the optical axis on the object-side surface of the eighth lens to the inflection point third nearest to the optical axis on the object-side surface of the eighth lens. The perpendicular distance between the inflection point IF813 and the optical axis is HIF813 (example). The inflection point on image-side surface of the eighth lens that is third nearest to the optical axis is expressed as IF823, and the sinkage value of the inflection point IF823 is expressed as SGI823 (example). That is, the sinkage value SGI823 is a horizontal displacement distance paralleling the optical axis, which is measured from the intersection point crossing the optical axis on the image-side surface of the eighth lens to the inflection point third nearest to the optical axis on the image-side surface of the eighth lens. The perpendicular distance between the inflection point IF823 and the optical axis is HIF823 (example).

The inflection point on object-side surface of the eighth lens that is fourth nearest to the optical axis is expressed as IF814, and the sinkage value of the inflection point IF814 is expressed as SGI814 (example). That is, the sinkage value SGI814 is a horizontal displacement distance paralleling the optical axis, which is measured from the intersection point crossing the optical axis on the object-side surface of the eighth lens to the inflection point fourth nearest to the optical axis on the object-side surface of the eighth lens. The perpendicular distance between the inflection point IF814 and the optical axis is HIF814 (example). The inflection point on image-side surface of the eighth lens that is fourth nearest to the optical axis is expressed as IF824, and the sinkage value of the inflection point IF824 is expressed as SGI824 (example). That is, the sinkage value SGI824 is a horizontal displacement distance paralleling the optical axis, which is measured from the intersection point crossing the optical axis on the image-side surface of the eighth lens to the inflection point fourth nearest to the optical axis on the image-side surface of the eighth lens. The perpendicular distance between the inflection point IF824 and the optical axis is HIF824 (example).

The inflection points on the object-side surface or the image-side surface of the other lens and the perpendicular distances between them and the optical axis, or the sinkage values thereof are expressed in the similar way described above.

The Lens Parameter Related to the Aberration

Optical distortion for image formation in the optical image capturing system is expressed as ODT. TV distortion for image formation in the optical image capturing system is expressed as TDT. Furthermore, the degree of aberration offset can be further described within the limited range of 50% to 100% field of view of the formed image. The offset of the spherical aberration is expressed as DFS. The offset of the coma aberration is expressed as DFC.

The transverse aberration of the edge of the aperture is denoted as STOP Transverse Aberration (STA), which assesses the performance of specific optical image capturing system. The tangential fan or sagittal fan may be utilized to calculate the STA of any fields of view, and in particular, to calculate the STAs of the longest operation wavelength (e.g. 650 nm) and the shortest operation wavelength (e.g. 470 nm) respectively, which serve as the standard indicating the performance thereof. The coordinate directions of the aforementioned tangential fan may be further defined as the positive (overhead-light) and negative (lower-light) directions. The STA of the longest operation wavelength is defined as the distance between the position of the image formed when the longest operation wavelength passing through the edge of the aperture strikes a specific field of view on the image plane and the position of the image formed via the primary light of the reference wavelength (e.g. 555 nm) on the specific field of view on the image plane. Whereas the STA of the shortest operation wavelength is defined as the distance between the position of the image formed when the shortest operation wavelength passing through the edge of the aperture strikes a specific field of view on the image plane and the position of the image formed via the primary light of the reference wavelength on the specific field of view on the image plane. The criteria for assessing whether an optical image capturing system has an excellent performance may be set as: both STAs of the incident longest operation wavelength and the incident shortest operation wavelength at 0.7 field of view on the image plane (i.e. 0.7 height of image (HOI)) must be less than 100 μm or, furthermore, even less than 80 m.

The optical image capturing system has a maximum height of image HOI perpendicular to the optical axis on the image plane. A transverse aberration of the longest operation wavelength of visible light of a positive direction tangential fan of the optical image capturing system passing through an edge of the entrance pupil and incident at the position of 0.7 HOI on the image plane is denoted as PLTA. A transverse aberration of the shortest operation wavelength of visible light of the positive direction tangential fan of the optical image capturing system passing through the edge of the entrance pupil and incident at the position of 0.7 HOI on the image plane is denoted as PSTA. A transverse aberration of the longest operation wavelength of visible light of a negative direction tangential fan of the optical image capturing system passing through the edge of the entrance pupil and incident at the position of 0.7 HOI on the image plane is denoted as NLTA. A transverse aberration of the shortest operation wavelength of visible light of a negative direction tangential fan of the optical image capturing system passing through the edge of the entrance pupil and incident at the position of 0.7 HOI on the image plane is denoted as NSTA. A transverse aberration of the longest operation wavelength of visible light of a sagittal fan of the optical image capturing system passing through the edge of the entrance pupil and incident at the position of 0.7 HOI on the image plane is denoted as SLTA. A transverse aberration of the shortest operation wavelength of visible light of the sagittal fan of the optical image capturing system passing through the edge of the entrance pupil and incident at the position of 0.7 HOI on the image plane is denoted as SSTA.

The present invention provides the optical image capturing system, which is capable of focusing with respect to the visible light and the infrared light (dual-mode) simultaneously while achieving certain performance respectively. The object-side surface or the image-side surface of the eighth lens of the optical image capturing system may be provided with the inflection point which can adjust each angle of view striking the sixth lens and conduct amendment for the optical distortion and TV distortion. Besides, the surface of the eighth lens can be provided with the function of the preferable adjustment about the optical path so as to elevate the quality of the image.

The present invention provides an optical image capturing system, from an object side to an image side, comprising: a first lens, a second lens, a third lens, a fourth lens, a fifth lens, a sixth lens, a seventh lens, an eighth lens, a first image plane and a second image plane. The first image plane is an image plane specifically for visible light and perpendicular to an optical axis, and a central field of view of the first image plane has a maximum value of through-focus modulation transfer rate (MTF) at a first spatial frequency; and the second image plane is an image plane specifically for infrared light and perpendicular to the optical axis, and a central field of view of the second image plane has a maximum value of through-focus modulation transfer rate (MTF) at the first spatial frequency. All of the eight lenses have refractive power. Focal lengths of the eight lenses are denoted as f1, f2, f3, f4, f5, f6, f7 and f8 respectively. The focal length of the optical image capturing system is denoted as f. The entrance pupil diameter of the optical image capturing system is denoted as HEP. The distance on the optical axis from an object-side surface of the first lens to the first image plane is denoted as HOS. The half of a maximum angle of view of the optical image capturing system is denoted as HAF. The optical image capturing system has a maximum image height HOI perpendicular to the optical axis on the first image plane. The distance on the optical axis between the first image plane and the second image plane is denoted as FS. Conditions as follows are satisfied: 1≤f/HEP≤10, 0 deg<HAF≤150 deg, and |FS|≤100 μm.

The present invention provides another optical image capturing system, from an object side to an image side, comprising: a first lens, a second lens, a third lens, a fourth lens, a fifth lens, a sixth lens, a seventh lens, an eighth lens, a first image plane and a second image plane. The first image plane is an image plane specifically for visible light and perpendicular to an optical axis, and a central field of view of the first image plane has a maximum value of through-focus modulation transfer rate (MTF) at a first spatial frequency (110 cycles/mm); and the second image plane is an image plane specifically for infrared light and perpendicular to the optical axis, and a central field of view of the second image plane has a maximum value of through-focus modulation transfer rate (MTF) at the first spatial frequency (110 cycles/mm). All of the eight lenses have refractive power. At least one of the eight lenses is made of plastic. The optical image capturing system has a maximum image height HOI perpendicular to the optical axis on the image plane. At least one of the eight lenses has positive refractive power. The focal lengths of the eight lenses are denoted as f1, f2, f3, f4, f5, f6, f7 and f8 respectively. The focal length of the optical image capturing system is denoted as f. The entrance pupil diameter of the optical image capturing system is denoted as HEP. The distance on the optical axis from an object-side surface of the first lens to the first image plane is denoted as HOS. The half of a maximum angle of view of the optical image capturing system is denoted as HAF. The optical image capturing system has a maximum image height HOI perpendicular to the optical axis on the first image plane. The distance on the optical axis between the first image plane and the second image plane is denoted as FS. The outline curve starting from an intersection point of the optical axis and any surface of any one of the eight lenses, travelling along an outline of the surface, and ending at a coordinate point on the surface which has a vertical height of ½ entrance pupil diameter from the optical axis, has an outline curve length denoted as ARE. Conditions as follows are satisfied: 1.0≤f/HEP≤10.0, 0 deg<HAF≤150 deg, |FS|≤100 μm, and 0.9≤2(ARE/HEP)≤2.0.

The present invention provides one more optical image capturing system, from an object side to an image side, comprising: a first lens, a second lens, a third lens, a fourth lens, a fifth lens, a sixth lens, a seventh lens, an eighth lens, a first average image plane and a second average image plane. The first average image plane is an image plane specifically for visible light and perpendicular to the optical axis, and configured at an average position of the through-focus positions where all of central field of view, 0.3 field of view and 0.7 field of view of the optical image capturing system have their respective maximums of through-focus modulation transfer rates (values of MTF) of the visible light at a first spatial frequency (110 cycles/mm); and the second average image plane is an image plane specifically for infrared light and perpendicular to the optical axis, and configured at the average position of the through-focus positions where all of central field of view, 0.3 field of view and 0.7 field of view of the optical image capturing system have their respective maximums of through-focus modulation transfer rates (values of MTF) of the infrared light at the first spatial frequency (110 cycles/mm). The optical image capturing system comprises eight lenses with refractive power. The optical image capturing system has a maximum image height HOI perpendicular to the optical axis on the first image plane. At least one of the eight lenses has positive refractive power. The focal lengths of the eight lenses are denoted as f1, f2, f3, f4, f5, f6, f7 and f8 respectively. The focal length of the optical image capturing system is denoted as f. The entrance pupil diameter of the optical image capturing system is denoted as HEP. The distance on the optical axis from an object-side surface of the first lens to the first average image plane is denoted as HOS. The half of a maximum angle of view of the optical image capturing system is denoted as HAF. The optical image capturing system has a maximum image height HOI perpendicular to the optical axis on the first average image plane. The outline curve starting from an intersection point of the optical axis and any surface of any one of the eight lenses, travelling along an outline of the surface, and ending at a coordinate point on the surface which has a vertical height of ½ entrance pupil diameter from the optical axis, has an outline curve length denoted as ARE. The distance on the optical axis between the first average image plane and the second average image plane is denoted as AFS. Conditions as follows are satisfied: 1≤f/HEP≤10, 0 deg<HAF≤150 deg, |AFS|≤100 μm, and 0.9≤2(ARE/HEP)≤2.0.

The length of the outline curve of any surface of single lens within the range of maximum effective half diameter affects the capability for correcting the surface aberration and the optical path difference between the rays in each field of view. Longer outline curve length may lead to a better capability for aberration correction, but the difficulty of production may simultaneously become higher as well. Hence, the length of the outline curve of any surface of single lens within the range of the maximum effective half diameter has to be controlled, and especially, the proportional relationship (ARS/TP) between the length of the outline curve (ARS) of the surface within the range of the maximum effective half diameter and the central thickness (TP) of the lens to which the surface belongs on the optical axis has to be controlled. For example, the length of the maximum effective half diameter outline curve of the object-side surface of the first lens is denoted as ARS11, and the central thickness of the first lens on the optical axis is TP1, wherein the ratio between both of them is ARS11/TP1. The length of the maximum effective half diameter outline curve of the image-side surface of the first lens is denoted as ARS12, and the ratio between the ARS12 and TP1 is ARS12/TP1. The length of the maximum effective half diameter outline curve of the object-side surface of the second lens is denoted as ARS21, and the central thickness of the second lens on the optical axis is TP2, wherein the ratio between both of them is ARS21/TP2. The length of the maximum effective half diameter outline curve of the image-side surface of the second lens is denoted as ARS22, wherein the ratio between ARS22 and TP2 is ARS22/TP2. The proportional relationships between the lengths of the maximum effective half diameter outline curve of any surface of the other lenses and the central thicknesses (TP) of the other lenses to which the surfaces belong on the optical axis are denoted according to the regular pattern shown above.

The outline curve length within a range of ½ entrance pupil diameter height (HEP) of any surface of single lens specifically affects the capability for correcting the aberration in the shared region of each field of view on the surface and the capability for correcting the optical path difference among each field of view. Longer outline curve length may lead to a better capability for aberration correction, but the difficulty in production of such lens may simultaneously become higher as well. Hence, the outline curve length within a range of ½ entrance pupil diameter height (HEP) of any surface of single lens has to be controlled, and especially, the proportional relationship between the outline curve length within a range of ½ entrance pupil diameter height (HEP) of any surface of single lens and the central thickness (TP) on the optical axis has to be controlled. For example, the outline curve length of the ½ entrance pupil diameter height (HEP) of the object-side surface of the first lens is denoted as ARE11, and the central thickness of the first lens on the optical axis is TP1, wherein the ratio thereof is ARE11/TP1. The outline curve length of the ½ entrance pupil diameter height (HEP) of the image-side surface of the first lens is denoted as ARE12, wherein the ratio of the ARE12 to TP1 is ARE12/TP1. The outline curve length of the ½ entrance pupil diameter height (HEP) of the object-side surface of the second lens is denoted as ARE21, and the central thickness of the second lens on the optical axis is TP2, wherein the ratio thereof is ARE21/TP2. The outline curve length of the ½ entrance pupil diameter height (HEP) of the image-side surface of the second lens is denoted as ARE22, wherein the ratio of the ARE22 to TP2 is ARE22/TP2. The proportional relationships of outline curve lengths of the ½ entrance pupil diameter height (HEP) on any surface of the other lenses of the optical image capturing system to the central thicknesses (TP) on the optical axis of the other lenses to which the surfaces belong are denoted according to the regular pattern shown above.

Besides, the eighth lens may have negative refractive power, and the image-side surface thereof may be a concave surface. With this configuration, the back focal length of the optical image capturing system may be shortened to keep the optical image capturing system minimized. Moreover, at least one surface of the eighth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

DESCRIPTION OF THE PREFERRED EMBODIMENTS

Figure 1A:
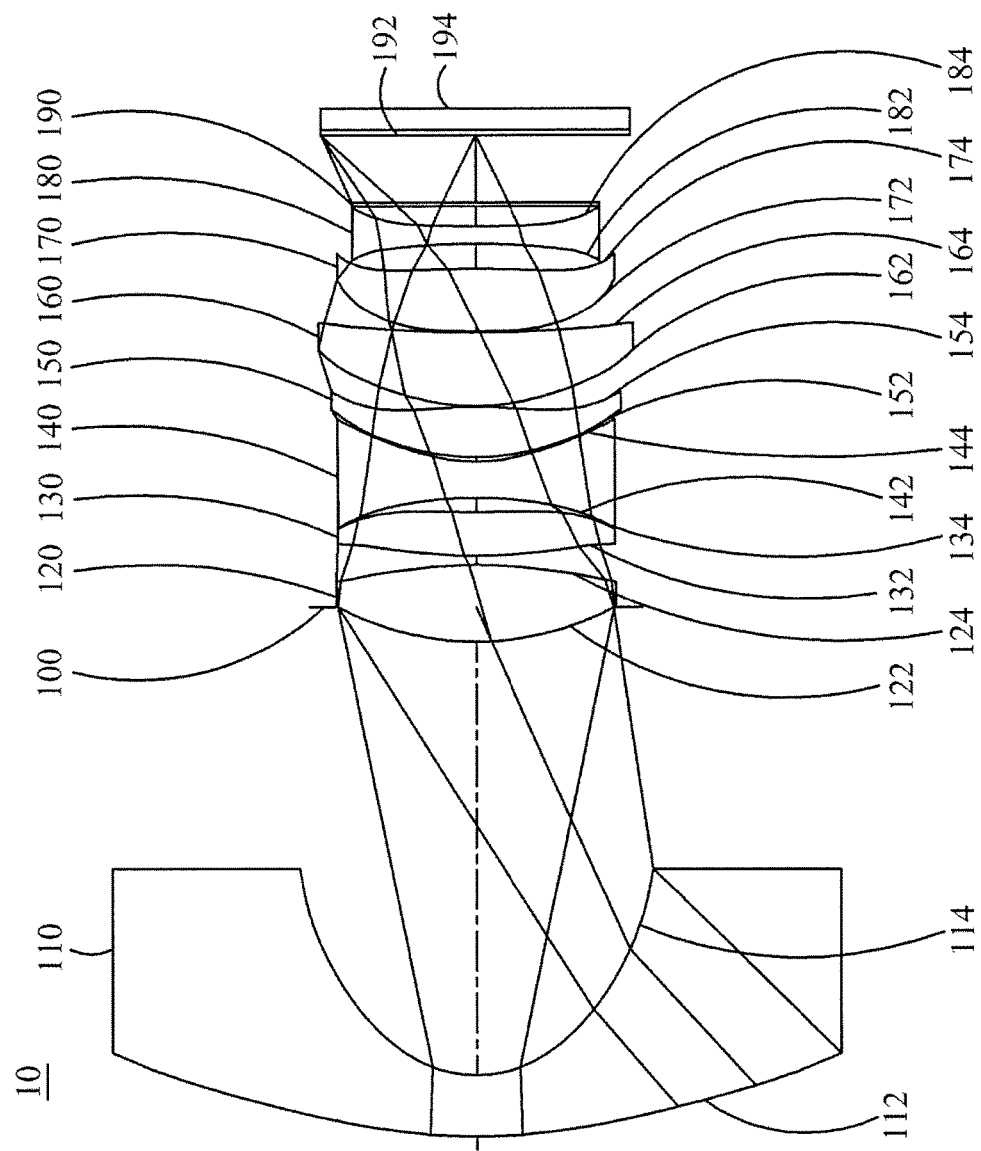
FIG. 1A is a schematic view of the optical image capturing system according to the first embodiment of the present invention.

An optical image capturing system, in the order from an object-side surface to an image-side surface, includes a first lens with refractive power, a second lens with refractive power, a third lens with refractive power, a fourth lens with refractive power, a fifth lens with refractive power, and a sixth lens with refractive power, a seventh lens with refractive power, the eighth lens with refractive power and an image plane. The optical image capturing system may further include an image sensing element, which is disposed on an image plane.

The optical image capturing system may use three sets of operation wavelengths, which are respectively 486.1 nm, 587.5 nm and 656.2 nm, and 587.5 nm is served as the primary reference wavelength and a reference wavelength to obtain technical features of the optical image capturing system. The optical image capturing system may also use five sets of wavelengths which are respectively 470 nm, 510 nm, 555 nm, 610 nm and 650 nm, and 555 nm is served as the primary reference wavelength and a reference wavelength to obtain technical features of the optical system.

The optical image capturing system may further include an image sensing device which is disposed on an image plane. Half of a diagonal of an effective detection field of the image sensing device (imaging height or the maximum image height of the optical image capturing system) is HOI. The distance on the optical axis from the object-side surface of the first lens to the image plane is HOS. They meet the following conditions: HOS/HOI≤30 and 0.5≤HOS/f≤30. Preferably, the following conditions may be satisfied: 1≤HOS/HOI≤10 and 1≤HOS/f≤10. Hereby, this configuration can keep the miniaturization of the optical image capturing system to collocate with light and thin portable electronic product.

In addition, in the optical image capturing system of the present invention, according to different requirements, at least one aperture may be arranged to reduce stray light and it is helpful to elevate the imaging quality.

In the optical image capturing system of the present invention, the aperture may be a front or middle aperture. Wherein, the front aperture is the aperture disposed between a photographed object and the first lens and the middle aperture is the aperture disposed between the first lens and the image plane. In the case that the aperture is the front aperture, it can make the optical image capturing system generate a longer distance between the exit pupil and the image plane thereof, such that the optical image capturing system can accommodate more optical elements and the efficiency of the image sensing device in receiving image can be increased; In the case that the aperture is the middle aperture, it is helpful to expand the angle of view of the optical image capturing system, such that the optical image capturing system has an advantage of the wide angle camera lens. The distance from the foregoing aperture to the image plane is InS. It meets following condition: 0.2≤InS/HOS≤1.5. Therefore, the configuration can keep the optical image capturing system miniaturization with the character of wide angle of view at the same time.

In the optical image capturing system of the present invention, the distance from the object-side surface of the first lens to the image-side surface of the eighth lens is InTL. The sum of thicknesses of all lenses with refractive power on the optical axis is ΣTP. It meets the following condition: $0.1 \le \Sigma TP/InTL \le 0.9$. Therefore, it can keep the contrast ratio of the optical image capturing system and the yield rate about manufacturing lens at the same time, and provide the proper back focal length to accommodate other elements.

The distance between the first lens and the second lens on the optical axis is IN12. The following condition is satisfied: $IN12/f \le 5.0$. Hereby, this configuration is helpful to improve the chromatic aberration of the lens in order to elevate their performance.

The distance between the seventh lens and the eighth lens on the optical axis is IN78. The following condition is satisfied: $IN78/f \le 0.8$. Hereby, this configuration is helpful to improve the chromatic aberration of the lens in order to elevate their performance.

The thicknesses of the first lens and the second lens on the optical axis are TP1 and TP2, respectively. The following condition is satisfied: $0.1 \le (TP1+IN12)/TP2 \le 10$. Therefore, this configuration is helpful to control the sensitivity of the optical image capturing system, and improve their performance.

The thicknesses of the seventh lens and the eighth lens on the optical axis are TP7 and TP8, respectively, and the distance between the foregoing two lens on the optical axis is IN78. They meet the following condition: $0.1 \le (TP8+IN78)/TP7 \le 10$. Therefore, this configuration is helpful to control the sensitivity of the optical image capturing system, and decrease the total height of the optical image capturing system.

The thicknesses of the third lens, fourth lens and fifth lens on the optical axis are TP3, TP4 and TP5, respectively. The distance between the second lens and the third lens on the optical axis is IN34. The distance between the fourth lens and the fifth lens on the optical axis is IN45. The distance between the object-side surface of the first lens and the image-side surface of the eighth lens is InTL. They meet the following condition: $0.1 \le TP4/(IN34+TP4+IN45) < 1$. Therefore, this configuration is helpful to slightly correct the aberration of the propagating process of the incident light layer by layer, and decrease the total height of the optical image capturing system.

In the optical image capturing system of the present invention, a perpendicular distance between a critical point C81 on an object-side surface of the eighth lens and the optical axis is HVT81. A perpendicular distance between a critical point C82 on an image-side surface of the eighth lens and the optical axis is HVT82. A horizontal distance from an intersection point on the object-side surface of the eighth lens crossing the optical axis to the critical point C81 on the optical axis is SGC81. A horizontal distance from an intersection point on the image-side surface of the eighth lens crossing the optical axis to the critical point C82 on the optical axis is SGC82. The following conditions can be satisfied: $0 \text{ mm} \le HVT81 \le 3 \text{ mm}$; $0 \text{ mm} < HVT82 \le 6 \text{ mm}$; $0 \le HVT81/HVT82$; $0 \text{ mm} \le |SGC81| \le 0.5 \text{ mm}$; $0 \text{ mm} < |SGC82| \le 2 \text{ mm}$, and $0 < |SGC82|/(|SGC82|+TP8) \le 0.9$. Therefore, this configuration is helpful to correct the off-axis aberration effectively.

The optical image capturing system of the present invention meets the following condition: $0.2 \le HVT82/HOI \le 0.9$. Preferably, it may meet the following condition: $0.3 \le HVT82/HOI \le 0.8$. Therefore, this configuration is helpful to correct the aberration of surrounding field of view for the optical image capturing system.

The optical image capturing system of the present invention may meet the following condition: $0 \le HVT82/HOS \le 0.5$. Preferably, the following condition can be satisfied: $0.2 \le HVT82/HOS \le 0.45$. Therefore, this configuration is helpful to correct the aberration of surrounding field of view for the optical image capturing system.

In the optical image capturing system of the present invention, the distance in parallel with an optical axis from an inflection point on the object-side surface of the eighth lens that is nearest to the optical axis to an intersection point on the object-side surface of the eighth lens crossing the optical axis is expressed as SGI811. The distance in parallel with an optical axis from an inflection point on the image-side surface of the eighth lens that is nearest to the optical axis to an intersection point on the image-side of the eighth lens crossing the optical axis is expressed as SGI821. The following conditions can be satisfied: $0 < SGI811/(SGI811+TP8) \le 0.9$ and $0 < SGI821/(SGI821+TP8) \le 0.9$. Preferably, they may meet the following conditions: $0.1 \le SGI811/(SGI811+TP8) \le 0.6$ and $0.1 \le SGI821/(SGI821+TP8) \le 0.6$.

The distance in parallel with the optical axis from the inflection point on the object-side surface of the eighth lens that is second nearest to the optical axis to an intersection point on the object-side surface of the eighth lens crossing the optical axis is expressed as SGI812. The distance in parallel with an optical axis from an inflection point on the image-side surface of the eighth lens that is second nearest to the optical axis to an intersection point on the image-side surface of the eighth lens crossing the optical axis is expressed as SGI822. The following conditions can be satisfied: $0 < SGI812/(SGI812+TP8) \le 0.9$ and $0 < SGI822/(SGI822+TP8) \le 0.9$. Preferably, the following conditions may be satisfied: $0.1 \le SGI812/(SGI812+TP8) \le 0.6$ and $0.1 \le SGI822/(SGI822+TP8) \le 0.6$.

The distance perpendicular to the optical axis between the inflection point on the object-side surface of the eighth lens that is the nearest to the optical axis and the optical axis is expressed as HIF811. The distance perpendicular to the optical axis between an intersection point on the image-side surface of the eighth lens crossing the optical axis and an inflection point on the image-side surface of the eighth lens that is the nearest to the optical axis is expressed as HIF821. They may meet the following conditions: $0.001 \text{ mm} \le |HIF811| \le 7.5 \text{ mm}$ and $0.001 \text{ mm} \le |HIF821| \le 7.5 \text{ mm}$. Preferably, the following conditions may be satisfied: $0.1 \text{ mm} \le |HIF811| \le 5 \text{ mm}$ and $0.1 \text{ mm} \le |HIF821| \le 5 \text{ mm}$.

The distance perpendicular to the optical axis between the inflection point on the object-side surface of the eighth lens that is second nearest to the optical axis and the optical axis is expressed as HIF812. The distance perpendicular to the optical axis between an intersection point on the image-side surface of the eighth lens crossing the optical axis and an inflection point on the image-side surface of the eighth lens that is second nearest to the optical axis is expressed as HIF822. The following conditions can be satisfied: $0.001 \text{ mm} \le |HIF812| \le 7.5 \text{ mm}$ and $0.001 \text{ mm} \le |HIF822| \le 7.5 \text{ mm}$. Preferably, the following conditions may be satisfied: $0.1 \text{ mm} \le |HIF822| \le 6 \text{ mm}$ and $0.1 \text{ mm} \le |HIF812| \le 6 \text{ mm}$.

The perpendicular distance between the inflection point on the object-side surface of the eighth lens that is third nearest to the optical axis and the optical axis is expressed as HIF813. The perpendicular distance between an intersection point on the image-side surface of the eighth lens crossing the optical axis and an inflection point on the image-side surface of the eighth lens that is third nearest to the optical axis is expressed as HIF823. The following conditions can be satisfied: $0.001 \text{ mm} \le |HIF813| \le 7.5 \text{ mm}$ and $0.001 \text{ mm} \le |HIF823| \le 7.5 \text{ mm}$. Preferably, the following conditions may be satisfied: $0.1 \text{ mm} \le |HIF823| \le 7 \text{ mm}$ and $0.1 \text{ mm} \le |HIF813| \le 7 \text{ mm}$.

The perpendicular distance between the inflection point on the object-side surface of the eighth lens that is fourth nearest to the optical axis and the optical axis is expressed as HIF814. The perpendicular distance between an intersection point on the image-side surface of the eighth lens crossing the optical axis and an inflection point on the image-side surface of the eighth lens that is fourth nearest to the optical axis is expressed as HIF824. The following conditions can be satisfied: 0.001 mm≤|HIF814|≤7.5 mm and 0.001 mm≤|HIF824|≤7.5 mm. Preferably, the following conditions may be satisfied: 0.1 mm≤|HIF824|≤7.25 mm and 0.1 mm≤|HIF814|≤7.25 mm.

In one embodiment of the optical image capturing system of the present invention, it can be helpful to correct the chromatic aberration of the optical image capturing system by arranging the lens with high coefficient of dispersion and low coefficient of dispersion in an interlaced manner.

The Aspheric equation for the lens can be represented by:

$$z = ch^2/[1+[1-(k+1)c^2h^2]^{0.5}] + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + \ldots \quad (1),$$

wherein z is a position value of the position along the optical axis and at the height h which refers to the surface apex; k is the cone coefficient, c is the reciprocal of curvature radius, and A4, A6, A8, A10, A12, A14, A16, A18, and A20 are high order aspheric coefficients.

In the optical image capturing system provided by the present invention, the lens may be made of glass or plastic material. If the lens is made of the plastic material, it can reduce the cost of manufacturing as well as the weight of the lens effectively. If lens is made of glass, it can control the heat effect and increase the design space of the configuration of the lens with refractive powers in the optical image capturing system. Besides, the object-side surface and the image-side surface of the first lens through eighth lens may be aspheric, which can gain more control variables and even reduce the number of the used lens in contrast to traditional glass lens in addition to the use of reducing the aberration. Thus, the total height of the optical image capturing system can be reduced effectively.

Furthermore, in the optical image capturing system provided by the present disclosure, when the surface of lens is a convex surface, the surface of that lens is basically a convex surface in the vicinity of the optical axis. When the surface of lens is a concave surface, the surface of that lens is basically a concave surface in the vicinity of the optical axis.

The optical image capturing system of the present invention can be applied to the optical image capturing system with automatic focus based on the demand and have the characters of a good aberration correction and a good quality of image. Thereby, the optical image capturing system can expand the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the process of the photographing.

In the optical image capturing system of the present invention, at least one lens among the first lens, second lens, third lens, fourth lens, fifth lens, sixth lens, seventh lens and eighth lens may further be a light filtering element for light with wavelength of less than 500 nm based on the design requirements. The light filtering element may be achieved by coating film on at least one surface of that lens with certain filtering function, or forming that lens with material that can filter light with short wavelength.

The image plane of the optical image capturing system of the present invention may be a plane or a curved surface based on the design requirement. When the image plane is a curved surface (e.g. a spherical surface with curvature radius), it is helpful to decrease the required incident angle that make the rays focus on the image plane. In addition to the aid of the miniaturization of the length of the optical image capturing system (TTL), it is helpful to elevate the relative illumination at the same time.

According to the foregoing implementation method, the specific embodiments with figures are presented in detail as below.

The First Embodiment

Figure 1B:
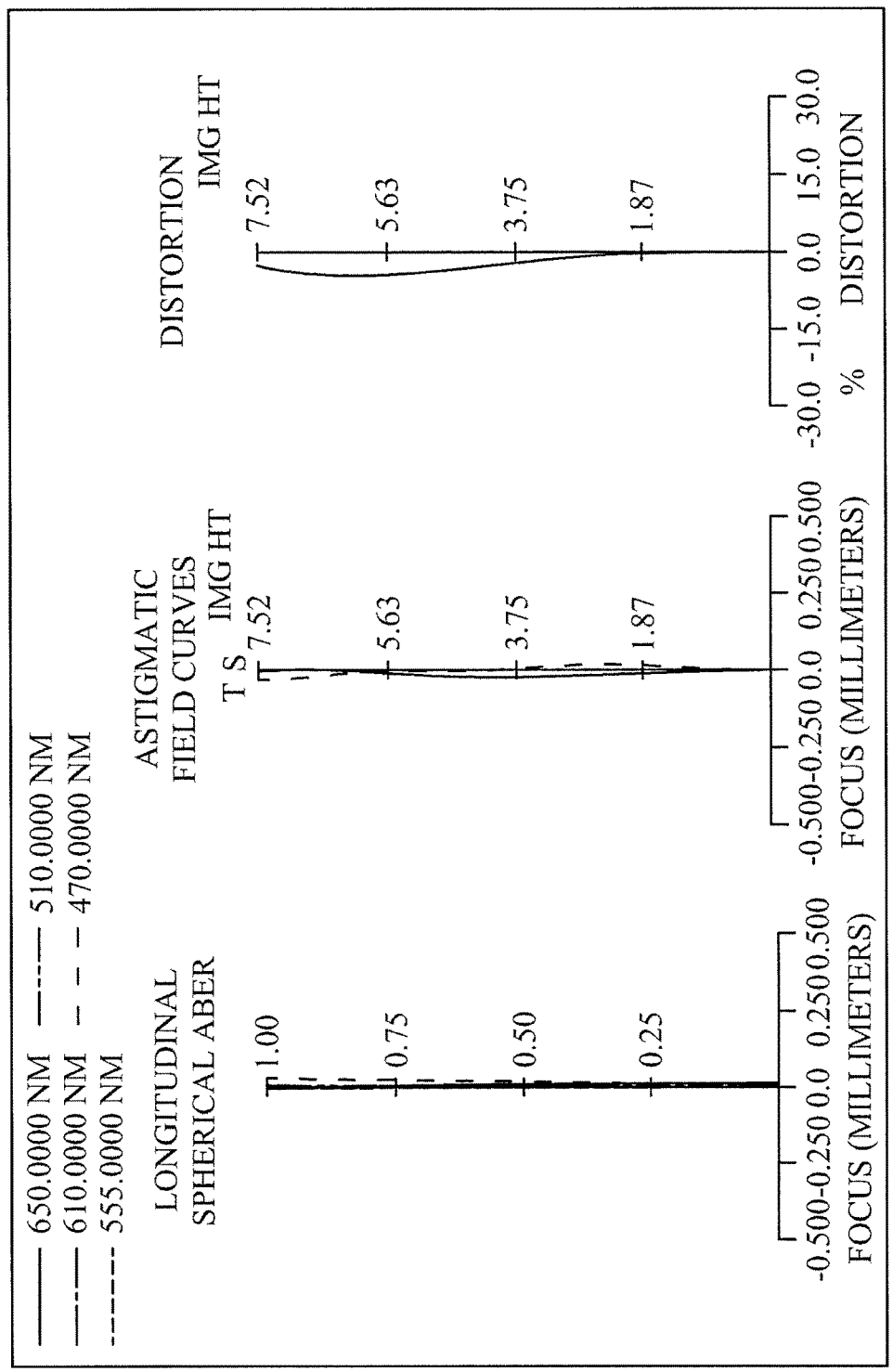
FIG. 1B shows the longitudinal spherical aberration curves, astigmatic field curves, and optical distortion curve of the optical image capturing system in the order from left to right according to the first embodiment of the present invention.
Figure 1C:
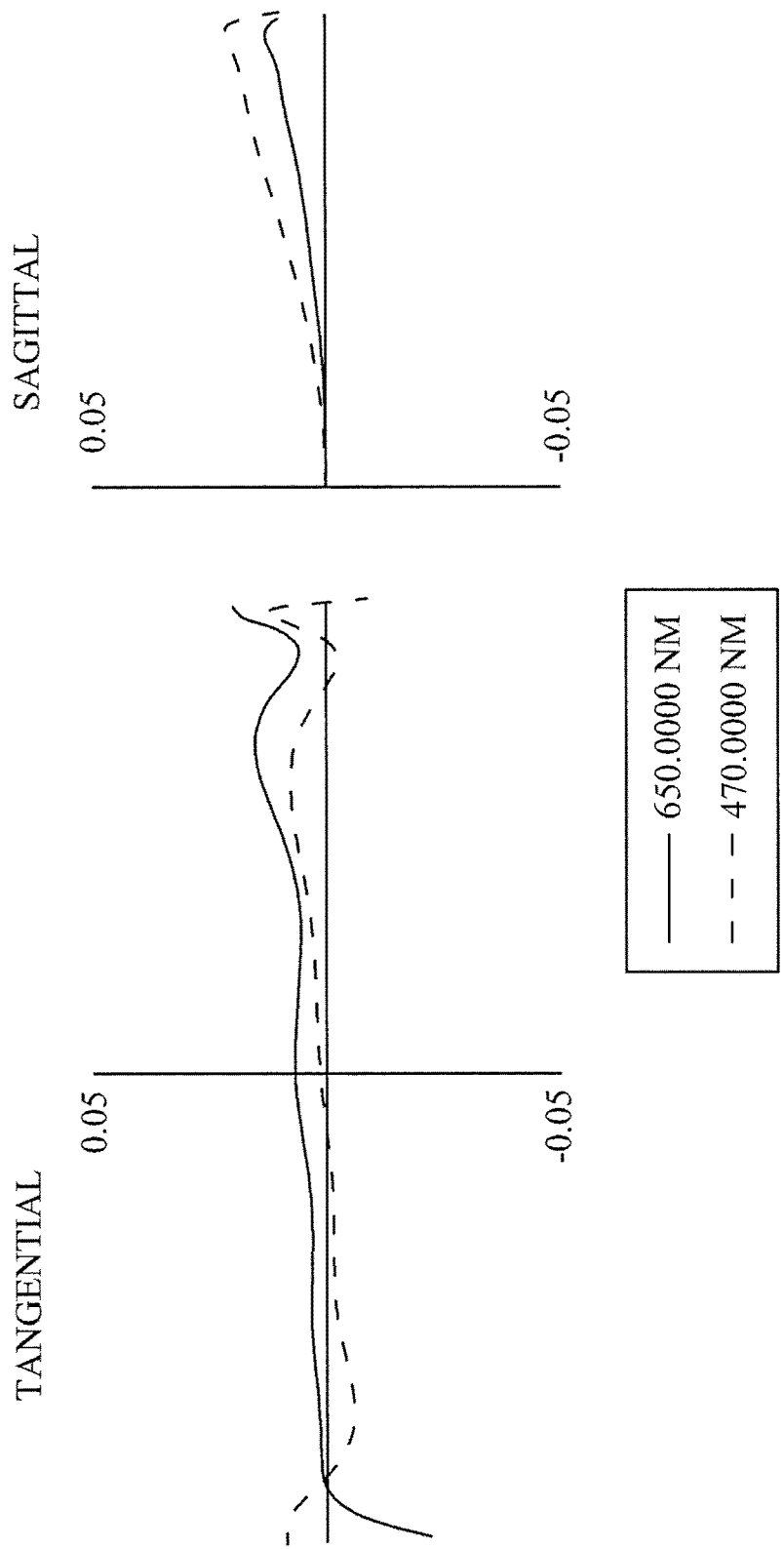
FIG. 1C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the first embodiment of the present disclosure.
Figure 1D:
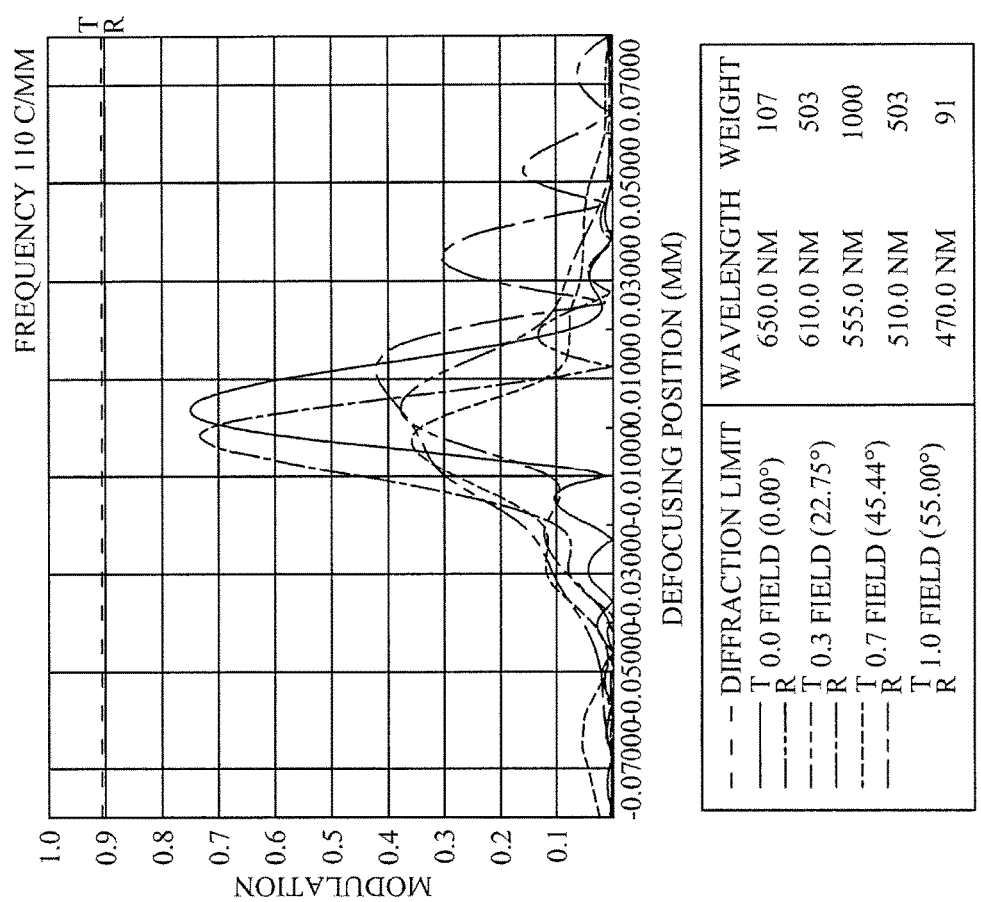
FIG. 1D is a diagram illustrating the through-focus MTF values for the visible light spectrum at the central field of view, 0.3 field of view and 0.7 field of view according to the first embodiment of the present disclosure.
Figure 1E:
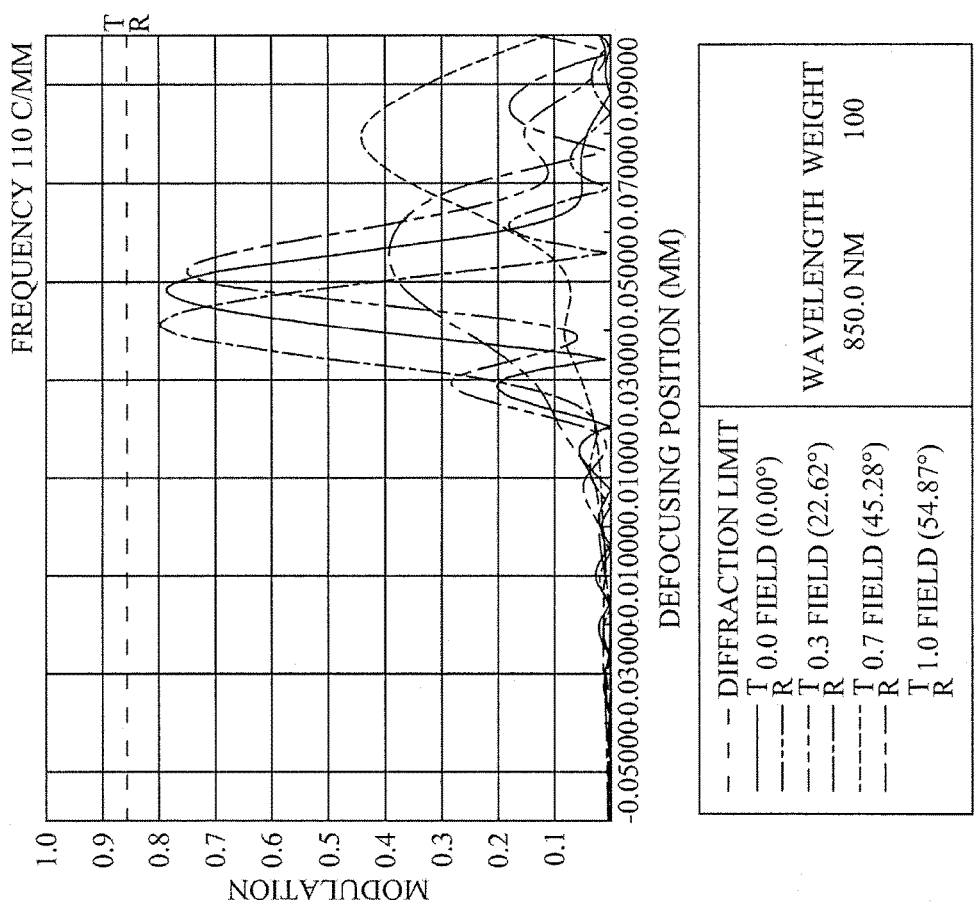
FIG. 1E is a diagram illustrating the through-focus MTF values for the infrared light spectrum at the central field of view, 0.3 field of view and 0.7 field of view according to the first embodiment of the present disclosure.

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the first embodiment of the present disclosure. FIG. 1D is a diagram illustrating the through-focus MTF values for the visible light spectrum at the central field of view, 0.3 field of view and 0.7 field of view according to the first embodiment of the present disclosure. FIG. 1E is a diagram illustrating the through-focus MTF values for the infrared light spectrum at the central field of view, 0.3 field of view and 0.7 field of view according to the first embodiment of the present disclosure. As shown in FIG. 1A, in order from an object-side surface to an image-side surface, the optical image capturing system includes a first lens 110, an aperture 100, a second lens 120, a third lens 130, a fourth lens 140, a fifth lens 150, a sixth lens 160, a seventh lens 170, an eighth lens 180, an infrared filter 190, an image plane 192, and an image sensing element 194.

The first lens 110 has negative refractive power and is made of plastic material. An object-side surface 112 of the first lens 110 is a convex surface and an image-side surface 114 of the first lens 110 is a concave surface, and both the object-side surface 112 and the image-side surface 114 are aspheric. The length of the maximum effective half diameter outline curve of the object-side surface of the first lens is denoted as ARS11, and the length of the maximum effective half diameter outline curve of the image-side surface of the first lens is denoted as ARS12. The outline curve length of the ½ entrance pupil diameter (HEP) of the object-side surface of the first lens is denoted as ARE11, and the outline curve length of the ½ entrance pupil diameter (HEP) of the image-side surface of the first lens is denoted as ARE12. The central thickness of the first lens on the optical axis is denoted as TP1.

The distance paralleling an optical axis from an inflection point on the object-side surface of the first lens which is nearest to the optical axis to an intersection point on the object-side surface of the first lens crossing the optical axis is expressed as SGI111. The distance paralleling an optical axis from an inflection point on the image-side surface of the first lens which is nearest to the optical axis to an intersection point on the image-side surface of the first lens crossing the optical axis is expressed as SGI121.

The distance in parallel with an optical axis from an inflection point on the object-side surface of the first lens that is second nearest to the optical axis to an intersection point on the object-side surface of the first lens crossing the optical axis is expressed as SGI112. The distance in parallel with an optical axis from an inflection point on the image-side surface of the first lens that is second nearest to the optical axis to an intersection point on the image-side surface of the first lens crossing the optical axis is expressed as SGI122.

The distance perpendicular to the optical axis from the inflection point on the object-side surface of the first lens that is nearest to the optical axis to an optical axis is expressed as HIF111. The distance perpendicular to the optical axis from the inflection point on the image-side surface of the first lens that is nearest to the optical axis to an intersection point on the image-side surface of the first lens crossing the optical axis is expressed as HIF121.

The distance perpendicular to the optical axis from the inflection point on the object-side surface of the first lens that is second nearest to the optical axis to an optical axis is expressed as HIF112. The distance perpendicular to the optical axis from the inflection point on the image-side surface of the first lens that is second nearest to the optical axis to an intersection point on the image-side surface of the first lens crossing the optical axis is expressed as HIF122.

The second lens 120 has positive refractive power and is made of plastic material. An object-side surface 122 of the second lens 120 is a convex surface and an image-side surface 124 of the second lens 120 is a convex surface, and both the object-side surface 122 and the image-side surface 124 are aspheric. The length of the maximum effective half diameter outline curve of the object-side surface of the second lens is denoted as ARS21, and the length of the maximum effective half diameter outline curve of the image-side surface of the second lens is denoted as ARS22. The outline curve length of the ½ entrance pupil diameter (HEP) of the object-side surface of the second lens is denoted as ARE21, and the outline curve length of the ½ entrance pupil diameter (HEP) of the image-side surface of the second lens is denoted as ARE22. The central thickness of the second lens on the optical axis is denoted as TP2.

The distance in parallel with an optical axis from an inflection point on the object-side surface of the second lens that is nearest to the optical axis to the intersection point on the object-side surface of the second lens crossing the optical axis is expressed as SGI211. The distance in parallel with an optical axis from an inflection point on the image-side surface of the second lens that is nearest to the optical axis to the intersection point on the image-side surface of the second lens crossing the optical axis is expressed as SGI221.

The perpendicular distance from the inflection point on the object-side surface of the second lens that is nearest to the optical axis to the optical axis is expressed as HIF211. The distance perpendicular to the optical axis from the inflection point on the image-side surface of the second lens that is nearest to the optical axis to the intersection point on the image-side surface of the second lens crossing the optical axis is expressed as HIF221.

The third lens 130 has positive refractive power and is made of plastic material. An object-side surface 132 of the third lens 130 is a convex surface and an image-side surface 134 of the third lens 130 is a concave surface, and both the object-side surface 132 and the image-side surface 134 are aspheric. The object-side surface 132 and the image-side surface 134 both have one inflection point. The length of the maximum effective half diameter outline curve of the object-side surface of the third lens is denoted as ARS31, and the length of the maximum effective half diameter outline curve of the image-side surface of the third lens is denoted as ARS32. The outline curve length of the ½ entrance pupil diameter (HEP) of the object-side surface of the third lens is denoted as ARE31, and the outline curve length of the ½ entrance pupil diameter (HEP) of the image-side surface of the third lens is denoted as ARE32. The central thickness of the third lens on the optical axis is denoted as TP3.

The distance in parallel with an optical axis from an inflection point on the object-side surface of the third lens that is nearest to the optical axis to an intersection point on the object-side surface of the third lens crossing the optical axis is expressed as SGI311. The distance in parallel with an optical axis from an inflection point on the image-side surface of the third lens that is nearest to the optical axis to an intersection point on the image-side surface of the third lens crossing the optical axis is expressed as SGI321. The following conditions can be satisfied: SGI311=0.3764 mm, |SGI311|/(|SGI311|+TP3)=0.1428, SGI321=0.0129 mm and |SGI321|/(|SGI321|+TP3)=0.0057.

The distance in parallel with an optical axis from an inflection point on the object-side surface of the third lens that is second nearest to the optical axis to the intersection point on the object-side surface of the third lens crossing the optical axis is expressed as SGI312. The distance in parallel with an optical axis from an inflection point on the image-side surface of the third lens that is second nearest to the optical axis to the intersection point on the image-side surface of the third lens crossing the optical axis is expressed as SGI322.

The perpendicular distance between the inflection point on the object-side surface of the third lens that is nearest to the optical axis and the optical axis is expressed as HIF311. The distance perpendicular to the optical axis between the inflection point on the image-side surface of the third lens that is nearest to the optical axis and the intersection point on the image-side surface of the third lens crossing the optical axis is expressed as HIF321. The following conditions can be satisfied: HIF311=4.4550 mm, HIF311/HOI=0.5940, HIF321=1.3867 mm and HIF321/HOI=0.1849.

The perpendicular distance between the inflection point on the object-side surface of the third lens that is second nearest to the optical axis and the optical axis is expressed as HIF312. The distance perpendicular to the optical axis between the inflection point on the image-side surface of the third lens that is second nearest to the optical axis and the intersection point on the image-side surface of the third lens crossing the optical axis is expressed as HIF322.

The fourth lens 140 has negative refractive power and is made of plastic material. An object-side surface 142 of the fourth lens 140 is a concave surface and an image-side surface 144 of the fourth lens 140 is a concave surface, and both of the object-side surface 142 and the image-side surface 144 are aspheric. The length of the maximum effective half diameter outline curve of the object-side surface of the fourth lens is denoted as ARS41, and the length of the maximum effective half diameter outline curve of the image-side surface of the fourth lens is denoted as ARS42. The outline curve length of the ½ entrance pupil diameter (HEP) of the object-side surface of the fourth lens is denoted as ARE41, and the outline curve length of the ½ entrance pupil diameter (HEP) of the image-side surface of the fourth lens is denoted as ARE42. The central thickness of the fourth lens on the optical axis is denoted as TP4.

The distance in parallel with the optical axis from an inflection point on the object-side surface of the fourth lens that is nearest to the optical axis to the intersection point on the object-side surface of the fourth lens crossing the optical axis is expressed as SGI411. The distance in parallel with the optical axis from an inflection point on the image-side surface of the fourth lens that is nearest to the optical axis to the intersection point on the image-side surface of the fourth lens crossing the optical axis is expressed as SGI421.

The distance in parallel with an optical axis from an inflection point on the object-side surface of the fourth lens that is second nearest to the optical axis to the intersection point on the object-side surface of the fourth lens crossing the optical axis is expressed as SGI412. The distance in parallel with an optical axis from an inflection point on the image-side surface of the fourth lens that is second nearest to the optical axis to the intersection point on the image-side surface of the fourth lens crossing the optical axis is expressed as SGI422.

The perpendicular distance between the inflection point on the object-side surface of the fourth lens that is nearest to the optical axis and the optical axis is expressed as HIF411. The distance perpendicular to the optical axis between the inflection point on the image-side surface of the fourth lens that is nearest to the optical axis and the intersection point on the image-side surface of the fourth lens crossing the optical axis is expressed as HIF421.

The perpendicular distance between the inflection point on the object-side surface of the fourth lens that is second nearest to the optical axis and the optical axis is expressed as HIF412. The distance perpendicular to the optical axis between the inflection point on the image-side surface of the fourth lens that is second nearest to the optical axis and the intersection point on the image-side surface of the fourth lens crossing the optical axis is expressed as HIF422.

The fifth lens 150 has positive refractive power and is made of plastic material. An object-side surface 152 of the fifth lens 150 is a convex surface and an image-side surface 154 of the fifth lens 150 is a convex surface, and both the object-side surface 152 and the image-side surface 154 are aspheric. The image-side surface 154 thereof has one inflection point. The length of the maximum effective half diameter outline curve of the object-side surface of the fifth lens is denoted as ARS51, and the length of the maximum effective half diameter outline curve of the image-side surface of the fifth lens is denoted as ARS52. The outline curve length of the ½ entrance pupil diameter (HEP) of the object-side surface of the fifth lens is denoted as ARE51, and the outline curve length of the ½ entrance pupil diameter (HEP) of the image-side surface of the fifth lens is denoted as ARE52. The central thickness of the fifth lens on the optical axis is denoted as TP5.

The distance in parallel with an optical axis from an inflection point on the object-side surface of the fifth lens that is nearest to the optical axis to the intersection point on the object-side surface of the fifth lens crossing the optical axis is expressed as SGI511. The distance in parallel with an optical axis from an inflection point on the image-side surface of the fifth lens that is nearest to the optical axis to the intersection point on the image-side surface of the fifth lens crossing the optical axis is expressed as SGI521. The following conditions can be satisfied: SGI521=−0.0777 mm and |SGI521|/(|SGI521|+TP5)=0.0296.

The distance in parallel with an optical axis from an inflection point on the object-side surface of the fifth lens that is second nearest to the optical axis to the intersection point on the object-side surface of the fifth lens crossing the optical axis is expressed as SGI512. The distance in parallel with an optical axis from an inflection point on the image-side surface of the fifth lens that is second nearest to the optical axis to the intersection point on the image-side surface of the fifth lens crossing the optical axis is expressed as SGI522.

The perpendicular distance between the optical axis and the inflection point on the object-side surface of the fifth lens that is nearest to the optical axis is expressed as HIF511. The perpendicular distance between the optical axis and the inflection point on the image-side surface of the fifth lens that is nearest to the optical axis is expressed as HIF521. The following conditions can be satisfied: HIF521=2.1725 mm and HIF521/HOI=0.2897.

The perpendicular distance between the inflection point on the object-side surface of the fifth lens that is second nearest to the optical axis and the optical axis is expressed as HIF512. The perpendicular distance between the inflection point on the image-side surface of the fifth lens that is second nearest to the optical axis and the optical axis is expressed as HIF522.

The sixth lens 160 has positive refractive power and it is made of plastic material. An object-side surface 162 of the sixth lens 160 is a convex surface and an image-side surface 164 of the sixth lens 160 is a concave surface, and both the object-side surface 162 and the image-side surface 164 have one inflection point. Therefore, the incident angle of each field of view on the sixth lens can be effectively adjusted and the spherical aberration can thus be improved. The length of the maximum effective half diameter outline curve of the object-side surface of the sixth lens is denoted as ARS61, and the length of the maximum effective half diameter outline curve of the image-side surface of the sixth lens is denoted as ARS62. The outline curve length of the ½ entrance pupil diameter (HEP) of the object-side surface of the sixth lens is denoted as ARE61, and the outline curve length of the ½ entrance pupil diameter (HEP) of the image-side surface of the sixth lens is denoted as ARE62. The central thickness of the sixth lens on the optical axis is denoted as TP6.

The distance in parallel with an optical axis from an inflection point on the object-side surface of the sixth lens that is nearest to the optical axis to the intersection point on the object-side surface of the sixth lens crossing the optical axis is expressed as SGI611. The distance in parallel with an optical axis from an inflection point on the image-side surface of the sixth lens that is nearest to the optical axis to the intersection point on the image-side surface of the sixth lens crossing the optical axis is expressed as SGI621. They meet the following conditions: SGI621=0.3579 mm and |SGI621|/(|SGI621|+TP6)=0.0867.

The perpendicular distance between the inflection point on the object-side surface of the sixth lens that is nearest to the optical axis and the optical axis is expressed as HIF611. The perpendicular distance between the inflection point on the image-side surface of the sixth lens that is nearest to the optical axis and the optical axis is expressed as HIF621. They meet the following conditions: HIF621=6.3642 mm and HIF621/HOI=0.8486.

The seventh lens 170 has positive refractive power and it is made of plastic material. An object-side surface 172 of the seventh lens 170 is a convex surface and an image-side surface 174 of the seventh lens 170 is a convex surface, and the image-side surface 174 has one inflection point. Therefore, the incident angle of each field of view on the sixth lens can be effectively adjusted and the spherical aberration can thus be improved. The length of the maximum effective half diameter outline curve of the object-side surface of the seventh lens is denoted as ARS71, and the length of the maximum effective half diameter outline curve of the image-side surface of the seventh lens is denoted as ARS72. The outline curve length of the ½ entrance pupil diameter (HEP) of the object-side surface of the seventh lens is denoted as ARE71, and the outline curve length of the ½ entrance pupil diameter (HEP) of the image-side surface of the seventh lens is denoted as ARE72. The central thickness of the seventh lens on the optical axis is denoted as TP7.

The distance in parallel with an optical axis from an inflection point on the object-side surface of the seventh lens that is nearest to the optical axis to the intersection point on the object-side surface of the seventh lens crossing the optical axis is expressed as SGI711. The distance in parallel with an optical axis from an inflection point on the image-side surface of the seventh lens that is nearest to the optical axis to the intersection point on the image-side surface of the seventh lens crossing the optical axis is expressed as SGI721. They meet the following conditions: SGI721=−0.0364 mm and |SGI721|/(|SGI721|+TP7)=0.0111.

The perpendicular distance between the inflection point on the object-side surface of the seventh lens that is nearest to the optical axis and the optical axis is expressed as HIF711. The perpendicular distance between the inflection point on the image-side surface of the seventh lens that is nearest to the optical axis and the optical axis is expressed as HIF721. They meet the following conditions: HIF721=2.5166 mm and HIF721/HOI=0.3355.

The eighth lens 180 has negative refractive power and it is made of plastic material. An object-side surface 182 of the eighth lens 180 is a concave surface and an image-side surface 184 of the eighth lens 180 is a concave surface. Therefore, the incident angle of each field of view on the sixth lens can be effectively adjusted and the spherical aberration can thus be improved. The length of the maximum effective half diameter outline curve of the object-side surface of the eighth lens is denoted as ARS81, and the length of the maximum effective half diameter outline curve of the image-side surface of the eighth lens is denoted as ARS82. The outline curve length of the ½ entrance pupil diameter (HEP) of the object-side surface of the eighth lens is denoted as ARE81, and the outline curve length of the ½ entrance pupil diameter (HEP) of the image-side surface of the eighth lens is denoted as ARE82. The central thickness of the eighth lens on the optical axis is denoted as TP8.

The distance in parallel with an optical axis from an inflection point on the object-side surface of the eighth lens that is nearest to the optical axis to the intersection point on the object-side surface of the eighth lens crossing the optical axis is expressed as SGI811. The distance in parallel with an optical axis from an inflection point on the image-side surface of the eighth lens that is nearest to the optical axis to the intersection point on the image-side surface of the eighth lens crossing the optical axis is expressed as SGI821.

The perpendicular distance between the inflection point on the object-side surface of the eighth lens that is nearest to the optical axis and the optical axis is expressed as HIF811. The perpendicular distance between the inflection point on the image-side surface of the eighth lens that is nearest to the optical axis and the optical axis is expressed as HIF821.

In the present embodiment, related characteristics of descriptions below and inflection point are defined on a basis of the primary reference wavelength 555 nm.

The Infrared filter 190 is made of glass material. The Infrared filter 190 is disposed between the eighth lens 180 and the image plane 192, and it does not affect the focal length of the optical image capturing system.

In the optical image capturing system of the first embodiment, the focal length of the optical image capturing system is f, the entrance pupil diameter of the optical image capturing system is HEP, and a half maximum view angle of the optical image capturing system is HAF. The values of the parameters are shown as below: f=5.3947 mm, f/HEP=1.2, HAF=55°.

The ratio of the focal length f of the optical image capturing system to the focal length fp of each lens with positive refractive power is PPR. The ratio of the focal length f of the optical image capturing system to the focal length fn of each lens with negative refractive power is NPR. In the optical image capturing system of the first embodiment, a sum of the PPR of all lenses with positive refractive power is ΣPPR. The following conditions are also satisfied: |f/f1|=0.4204, |f/f2|=0.3695, |f/f3|=0.0986, |f/f4|=0.6333, |f/f5|=0.3560, |f/f6|=0.2635, |f/f7|=0.1252, and |f/f8|=0.0715.

In the optical image capturing system of the first embodiment, the distance from the object-side surface 112 of the first lens to the image-side surface 184 of the eighth lens is InTL. The distance from the object-side surface 112 of the first lens to the image plane 192 is HOS. The distance from an aperture 100 to an image plane 192 is InS. Half of a diagonal length of an effective detection field of the image sensing element 194 is HOI. The distance from the image-side surface 184 of the eighth lens to the image plane 192 is BFL. They meet the following conditions: InTL+BFL=HOS, HOS=51.6062 mm, InTL=46.9488 mm, HOI=7.5 mm, HOS/HOI=6.8808, HOS/f=9.5661, InS=24.2924 mm and InS/HOS=0.4707.

In the optical image capturing system of the first embodiment, a total thickness of all lenses with refractive power on the optical axis is ΣTP. It meets the following conditions: ΣTP=21.7939 mm and ΣTP/InTL=0.4642. Therefore, this configuration can keep the contrast ratio of the optical image capturing system and the yield rate about manufacturing lens at the same time, and provide the proper back focal length so as to accommodate other elements.

In the optical image capturing system of the first embodiment, a sum of focal lengths of all lenses with positive refractive power is ΣPP. The following conditions are satisfied: ΣPP=f2+f3+f5+f6+f7=148.001 mm and f2/(f2+f3+f5+f6+f7)=0.0986. Hereby, this configuration is helpful to distribute the positive refractive power of the second lens 120 to other lens with positive refractive power in an appropriate way, so as to suppress the generation of noticeable aberrations in the transmitting process of the incident light in the optical image capturing system.

In the optical image capturing system of the first embodiment, the sum of focal lengths of all lenses with negative refractive power is ΣNP. It meets the following conditions: ΣNP=f1+f4+f8=−96.8161 mm and f1/(f1+f4+f8)=0.1325. Hereby, this configuration is helpful to distribute the negative refractive power of the eighth lens to other lens with negative refractive power in an appropriate way, so as to suppress the generation of noticeable aberrations in the propagating process of the incident light in the optical image capturing system.

In the optical image capturing system of the first embodiment, the distance between the first lens 110 and the second lens 120 on the optical axis is IN12. It meets the following conditions: IN12=22.3504 mm and IN12/f=4.1430. Therefore, it is helpful to improve the chromatic aberration of the lens in order to elevate their performance.

In the optical image capturing system of the first embodiment, the thicknesses of the first lens 110 and the second lens 120 on the optical axis are TP1 and TP2, respectively. The following conditions are satisfied: TP1=3.1800 mm, TP2=3.9903 mm and (TP1+IN12)/TP2=6.3981. Therefore, it is helpful to control the sensitivity generated by the optical image capturing system and elevate their performance.

In the optical image capturing system of the first embodiment, central thicknesses of the sixth lens 160, seventh lens 170 and eighth lens 180 on the optical axis are TP6, TP7 and TP8, respectively. The distance between the sixth lens 160 and the seventh lens 170 on the optical axis is IN67. The distance between the seventh lens 170 and the eighth lens 180 on the optical axis is IN78. The following conditions are satisfied: TP6=3.7720 mm, TP7=3.2362 mm, TP8=0.9274 and (TP8+IN78)/TP7=0.6815. Therefore, it is helpful to control the sensitivity generated by the optical image capturing system and reduce the total height of the optical image capturing system.

In the optical image capturing system of the first embodiment, central thicknesses of the third lens 130, fourth lens 140 and fifth lens 150 on the optical axis are TP3, TP4 and TP5, respectively. The distance between the third lens 130 and the fourth lens 140 on the optical axis is IN34. The distance between the fourth lens 140 and the fifth lens 150 on the optical axis is IN45. The distance from the object-side surface 112 of the first lens to the image-side surface 184 of the eighth lens is InTL. The following conditions are satisfied: TP3=2.2593 mm, TP4=1.8776 mm, TP5=2.5511 mm, IN34=0.7118 mm, IN45=0.2345 mm and (TP3+TP4+TP5)/ΣTP=0.3069. Therefore, this configuration is helpful to slightly correct the aberration of the propagating process of the incident light layer by layer and decrease the total height of the optical image capturing system.

In the optical image capturing system of the first embodiment, a distance in parallel with an optical axis from a maximum effective half diameter position on the object-side surface 172 of the seventh lens to an intersection point on the object-side surface 172 of the seventh lens crossing the optical axis is InRS71. The distance in parallel with an optical axis from a maximum effective half diameter position on the image-side surface 174 of the seventh lens to an intersection point on the image-side surface 174 of the seventh lens crossing the optical axis is InRS72. The thickness of the seventh lens 170 is TP7. The following conditions are satisfied: InRS71=2.7049 mm, InRS72=0.3270 mm, and |InRS72|/TP7=0.1010. Hereby, this configuration is favorable to the manufacturing and forming of lens and keeping the miniaturization of the optical image capturing system effectively.

In the optical image capturing system of the first embodiment, the perpendicular distance between a critical point on the object-side surface 172 of the seventh lens and the optical axis is HVT71. The perpendicular distance between a critical point on the image-side surface 174 of the seventh lens and the optical axis is HVT72. The following conditions are satisfied: HVT71=0 mm, HVT72=3.7869 mm and HVT71/HVT72=0.

In the optical image capturing system of the first embodiment, a distance in parallel with an optical axis from a maximum effective half diameter position on the object-side surface 182 of the eighth lens to an intersection point on the object-side surface 182 of the eighth lens crossing the optical axis is InRS81. A distance in parallel with an optical axis from a maximum effective half diameter position on the image-side surface 184 of the eighth lens to an intersection point on the image-side surface 184 of the eighth lens crossing the optical axis is InRS82. The thickness of the eighth lens 180 is TP8. The following conditions are satisfied: InRS81=−0.8396 mm, InRS82=0.9232 mm, and |InRS82|/TP8=0.9954. Hereby, this configuration is favorable to the manufacturing and forming of lens and keeping the miniaturization of the optical image capturing system effectively.

In the optical image capturing system of the first embodiment, the perpendicular distance between a critical point on the object-side surface 182 of the eighth lens and the optical axis is HVT81. The perpendicular distance between a critical point on the image-side surface 184 of the eighth lens and the optical axis is HVT82. The following conditions are satisfied: HVT81=0 mm and HVT82=0 mm.

In the optical image capturing system of the first embodiment, TV distortion and optical distortion for image formation in the optical image capturing system are TDT and ODT, respectively. The following conditions are satisfied: TDT=1.9874% and ODT=−4.6109%.

In the present embodiment of the disclosure, the light of any field of view may be further divided into the sagittal ray and tangential ray, and the spatial frequency of 110 cycles/mm serves as the benchmark for assessing the focus shifts and the values of MTF. The focus shifts where the through-focus MTF values of the visible sagittal ray at the central field of view, 0.3 field of view and 0.7 field of view of the optical image capturing system are at their respective maximums are denoted as VSFS0, VSFS3 and VSFS7 (the unit of measurement: mm), respectively, wherein the values of VSFS0, VSFS3 and VSFS7 equal to 0.000 mm, 0.000 mm and 0.010 mm, respectively. The maximum values of the through-focus MTF of the visible sagittal ray at the central field of view, 0.3 field of view and 0.7 field of view are denoted as VSMTF0, VSMTF3 and VSMTF7, respectively, wherein the values of VSMTF0, VSMTF3 and VSMTF7 equal to 0.667, 0.717 and 0.418, respectively. The focus shifts where the through-focus MTF values of the visible tangential ray at the central field of view, 0.3 field of view and 0.7 field of view of the optical image capturing system are at their respective maximums are denoted as VTFS0, VTFS3 and VTFS7 (the unit of measurement: mm), respectively, wherein the values of VTFS0, VTFS3 and VTFS7 equal to 0.000 mm, 0.000 mm, and 0.000 mm, respectively. The maximum values of the through-focus MTF of the visible tangential ray at the central field of view, 0.3 field of view and 0.7 field of view are denoted as VTMTF0, VTMTF3 and VTMTF7, respectively, wherein the values of VTMTF0, VTMTF3 and VTMTF7 equal to 0.667, 0.345 and 0.343, respectively. The average focus shift (position) of the aforementioned focus shifts of the visible sagittal ray at three fields of view and the visible tangential ray at three fields of view is denoted as AVFS (the unit of measurement: mm), which meets the absolute value |(VSFS0+VSFS3+VSFS7+VTFS0+VTFS3+VTFS7)/6|=|0.002 mm|.

The focus shifts where the through-focus MTF values of the infrared sagittal ray at the central field of view, 0.3 field of view and 0.7 field of view of the optical image capturing system are at their respective maximums are denoted as ISFS0, ISFS3 and ISFS7 (the unit of measurement: mm), respectively, wherein the values of ISFS0, ISFS3 and ISFS7 equal to 0.050 mm, 0.040 mm, and 0.060 mm, respectively.

The average focus shift (position) of the aforementioned focus shifts of the infrared sagittal ray at three fields of view is denoted as AISFS. The maximum values of the through-focus MTF of the infrared sagittal ray at the central field of view, 0.3 field of view and 0.7 field of view are denoted as ISMTF0, ISMTF3, and ISMTF7, respectively, wherein the values of ISMTF0, ISMTF3 and ISMTF7 equal to 0.768, 0.785 and 0.382, respectively. The focus shifts where the through-focus MTF values of the infrared tangential ray at the central field of view, 0.3 field of view and 0.7 field of view of the optical image capturing system are at their respective maximums are denoted as ITFS0, ITFS3 and ITFS7 (the unit of measurement: mm), respectively, wherein the values of ITFS0, ITFS3 and ITFS7 equal to 0.050, 0.050 and 0.080, respectively. The average focus shift (position) of the aforementioned focus shifts of the infrared tangential ray at three fields of view is denoted as AITFS (the unit of measurement: mm). The maximum values of the through-focus MTF of the infrared tangential ray at the central field of view, 0.3 field of view and 0.7 field of view are denoted as ITMTF0, ITMTF3 and ITMTF7, respectively, wherein the values of ITMTF0, ITMTF3 and ITMTF7 equal to 0.768, 0.714 and 0.441, respectively. The average focus shift (position) of the aforementioned focus shifts of the infrared sagittal ray at the three fields of view and of the infrared tangential ray at the three fields of view is denoted as AIFS (the unit of measurement: mm), which meets the absolute value of |(ISFS0+ISFS3+ISFS7+ITFS0+ITFS3+ITFS7)/6|=|0.055 mm|.

The focus shift between the focal points for the visible light and the infrared light at their central fields of view (RGB/IR) of the entire optical image capturing system (i.e. the wavelength of 850 nm versus the wavelength of 555 nm, the unit of measurement: mm) is denoted as FS (the distance between the first and second image planes on the optical axis), which meets the absolute value of |(VSFS0+VTFS0)/2−(ISFS0+ITFS0)/2|=|0.050 mm|. The difference (focus shift) between the average focus shift of the visible light at the three fields of view and the average focus shift of the infrared light at the three fields of view (RGB/IR) of the entire optical image capturing system is denoted as AFS (i.e. the wavelength of 850 nm versus the wavelength of 555 nm, the unit of measurement: mm), which meets the absolute value of |AIFS−AVFS|=|0.053 mm|.

In the first embodiment of the optical image capturing system, the transverse aberration of the shortest operation wavelength of the visible light of a positive direction tangential fan passing through the edge of aperture and striking at the position of 0.7 field of view on the image plane is denoted as PSTA, which is −0.009 mm. The transverse aberration of the longest operation wavelength of the visible light of a positive direction tangential fan passing through the edge of aperture and striking at the position of 0.7 field of view on the image plane is denoted as PLTA, which is 0.021 mm. The transverse aberration of the shortest operation wavelength of the visible light of the negative direction tangential fan passing through the edge of aperture and striking at the position of 0.7 field of view on the image plane is denoted as NSTA, which is 0.009 mm. The transverse aberration of the longest operation wavelength of the visible light of the negative direction tangential fan passing through the edge of aperture and striking at the position of 0.7 field of view on the image plane is denoted as NLTA, which is −0.024 mm. The transverse aberration of the shortest operation wavelength of the visible light of the sagittal fan passing through the edge of aperture and striking at the position of 0.7 field of view on the image plane is denoted as SSTA, which is 0.011 mm. The transverse aberration of the longest operation wavelength of the visible light of the sagittal fan passing through the edge of aperture and striking at the position of 0.7 field of view on the image plane is denoted as SLTA, which is 0.011 mm.

The contents in Tables 1 and 2 below should be incorporated into the reference of the present embodiment.

TABLE 1

Lens Parameters for the First Embodiment
f(focal length) = 5.3947 mm; f/HEP = 1.2; HAF(half angle of view) = 55 deg

| Surfaces No. | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | Lens 1 | 24.10442007 | 3.180 | Plastic | 1.565 | 58.00 | −12.832 |
| 2 | | 5.320562553 | 24.134 | | | | |
| 3 | Aperture | 1E+18 | −1.783 | | | | |
| 4 | Lens 2 | 13.43633803 | 3.990 | Plastic | 1.583 | 30.20 | 14.600 |
| 5 | | −21.01336968 | 0.480 | | | | |
| 6 | Lens 3 | 20.93757518 | 2.259 | Plastic | 1.565 | 58.00 | 54.695 |
| 7 | | 61.98504985 | 0.712 | | | | |
| 8 | Lens 4 | −20.77669725 | 1.878 | Plastic | 1.661 | 20.40 | −8.519 |
| 9 | | 8.099983384 | 0.234 | | | | |
| 10 | Lens 5 | 12.45426537 | 2.551 | Plastic | 1.565 | 58.00 | 15.154 |
| 11 | | −25.62260651 | 0.050 | | | | |
| 12 | Lens 6 | 9.802286731 | 3.772 | Plastic | 1.565 | 58.00 | 20.476 |
| 13 | | 54.30873521 | 0.050 | | | | |
| 14 | Lens 7 | 30.35740823 | 3.236 | Plastic | 1.514 | 56.80 | 43.076 |
| 15 | | −79.78586782 | 1.278 | | | | |
| 16 | Lens 8 | −52.80596025 | 0.927 | Plastic | 1.661 | 20.40 | −75.465 |
| 17 | | 1076.551341 | 1.000 | | | | |
| 18 | Infrared filter | 1E+18 | 0.200 | BK_7 | 1.517 | 64.2 | |
| 19 | | 1E+18 | 3.461 | | | | |
| 20 | Image Plane | 1E+18 | −0.004 | | | | |

Reference Wavelength (d-line): 555 nm

TABLE 2

Aspheric Coefficients in the First Embodiment
Table 2: Aspheric Coefficients

| | Surface No | | | | | | |
|---|---|---|---|---|---|---|---|
| | 1 | 2 | 4 | 5 | 6 | 7 | 8 |
| k | 0.000000E+00 | −6.347312E−01 | −1.241374E−01 | −3.925011E+00 | −1.239230E+01 | −3.576321E+02 | 4.660401E+00 |
| A4 | 0.000000E+00 | −6.373974E−05 | 1.757700E−05 | 1.645307E−04 | −1.638014E−04 | −5.472226E−04 | −6.458760E−05 |
| A6 | 0.000000E+00 | −3.330954E−07 | −7.768740E−08 | −2.230896E−06 | 3.137297E−06 | 1.041401E−07 | −4.557334E−06 |
| A8 | 0.000000E+00 | −1.225711E−08 | −8.480514E−09 | −9.713856E−09 | −5.543217E−08 | 5.418047E−09 | 1.153474E−07 |
| A10 | 0.000000E+00 | 1.019380E−10 | 1.014779E−10 | 3.194310E−10 | 4.404053E−11 | −2.150144E−10 | −8.824977E−10 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

| | Surface No | | | | | | |
|---|---|---|---|---|---|---|---|
| | 9 | 10 | 11 | 12 | 13 | 14 | 15 |
| k | −1.419080E+00 | 1.160063E+00 | −1.787274E+00 | −3.359494E+00 | 2.480422E+01 | 1.896298E+01 | 5.000000E+01 |
| A4 | −4.511984E−04 | 1.086597E−04 | 6.054571E−04 | −3.568053E−05 | −2.309982E−04 | 6.114576E−04 | 4.127602E−05 |
| A6 | 8.036379E−06 | −5.142695E−06 | 7.623918E−06 | 4.573090E−07 | 1.039199E−05 | 6.870081E−06 | 8.686605E−06 |
| A8 | −1.013564E−07 | 1.029807E−07 | −1.174933E−07 | 8.372695E−08 | −1.687118E−07 | −2.542782E−07 | −1.910974E−08 |
| A10 | 9.022617E−10 | −1.163426E−09 | 1.684909E−10 | −5.325352E−10 | 7.972063E−10 | 3.090262E−09 | 1.618760E−09 |
| A12 | 0.000000E+00 | 0.000000E+00 | 0.000000E+00 | 0.000000E+00 | 0.000000E+00 | 0.000000E+00 | 0.000000E+00 |

| | Surface No | |
|---|---|---|
| | 16 | 17 |
| k | −4.277708E+01 | −5.000000E+01 |
| A4 | −5.583548E−03 | 1.240671E−04 |
| A6 | 1.948110E−04 | −4.949077E−05 |
| A8 | −1.486947E−05 | 2.088854E−06 |
| A10 | −6.501246E−08 | −1.438383E−08 |
| A12 | 0.000000E+00 | 0.000000E+00 |
| A14 | 0.000000E+00 | 0.000000E+00 |

The values pertaining to the outline curve lengths are obtainable according to the data in Table 1 and Table 2:

First Embodiment (Primary Reference Wavelength Used = 555 nm)

| ARE | ½(HEP) | ARE value | ARE − ½(HEP) | 2(ARE/HEP) % | TP | ARE/TP (%) |
|---|---|---|---|---|---|---|
| 11 | 2.248 | 2.250 | 0.00232 | 100.10% | 3.180 | 70.76% |
| 12 | 2.248 | 2.314 | 0.06635 | 102.95% | 3.180 | 72.77% |
| 21 | 2.248 | 2.258 | 0.00984 | 100.44% | 3.990 | 56.58% |
| 22 | 2.248 | 2.251 | 0.00307 | 100.14% | 3.990 | 56.41% |
| 31 | 2.248 | 2.251 | 0.00290 | 100.13% | 2.259 | 99.62% |
| 32 | 2.248 | 2.247 | −0.00066 | 99.97% | 2.259 | 99.46% |
| 41 | 2.248 | 2.252 | 0.00395 | 100.18% | 1.878 | 119.93% |
| 42 | 2.248 | 2.273 | 0.02498 | 101.11% | 1.878 | 121.05% |
| 51 | 2.248 | 2.260 | 0.01218 | 100.54% | 2.551 | 88.59% |
| 52 | 2.248 | 2.249 | 0.00106 | 100.05% | 2.551 | 88.15% |
| 61 | 2.248 | 2.265 | 0.01727 | 100.77% | 3.772 | 60.05% |
| 62 | 2.248 | 2.248 | −0.00028 | 99.99% | 3.772 | 59.58% |
| 71 | 2.248 | 2.250 | 0.00254 | 100.11% | 3.236 | 69.54% |
| 72 | 2.248 | 2.247 | −0.00054 | 99.98% | 3.236 | 69.44% |
| 81 | 2.248 | 2.248 | 0.00014 | 100.01% | 0.927 | 242.39% |
| 82 | 2.248 | 2.247 | −0.00062 | 99.97% | 0.927 | 242.31% |

| ARS | EHD | ARS value | ARS − EHD | (ARS/EHD) % | TP | ARS/TP (%) |
|---|---|---|---|---|---|---|
| 11 | 15.531 | 15.980 | 0.449 | 102.89% | 3.180 | 502.51% |
| 12 | 8.073 | 12.356 | 4.284 | 153.06% | 3.180 | 388.56% |
| 21 | 6.701 | 7.012 | 0.311 | 104.64% | 3.990 | 175.72% |
| 22 | 6.785 | 6.853 | 0.068 | 101.00% | 3.990 | 171.74% |
| 31 | 6.743 | 6.774 | 0.032 | 100.47% | 2.259 | 299.84% |
| 32 | 6.729 | 6.894 | 0.165 | 102.45% | 2.259 | 305.14% |
| 41 | 6.690 | 6.954 | 0.264 | 103.95% | 1.878 | 370.35% |
| 42 | 6.770 | 7.196 | 0.426 | 106.29% | 1.878 | 383.24% |
| 51 | 7.086 | 7.679 | 0.593 | 108.37% | 2.551 | 301.01% |
| 52 | 7.036 | 7.222 | 0.186 | 102.65% | 2.551 | 283.10% |
| 61 | 7.721 | 8.482 | 0.761 | 109.85% | 3.772 | 224.87% |
| 62 | 7.448 | 7.468 | 0.020 | 100.27% | 3.772 | 197.99% |
| 71 | 6.751 | 7.745 | 0.994 | 114.73% | 3.236 | 239.32% |
| 72 | 6.118 | 6.176 | 0.058 | 100.94% | 3.236 | 190.83% |
| 81 | 6.070 | 6.207 | 0.137 | 102.25% | 0.927 | 669.25% |
| 82 | 6.052 | 6.227 | 0.175 | 102.88% | 0.927 | 671.41% |

Table 1 is the detailed structural data for the first embodiment in FIG. 1A, of which the unit for the curvature radius, the thickness, the distance, and the focal length is millimeters (mm). Surfaces 0-16 illustrate the surfaces from the object-side surface to the image-side surface in the optical image capturing system. Table 2 shows the aspheric coefficients of the first embodiment, where k is the cone coefficient in the aspheric surface equation, and A1-A20 are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
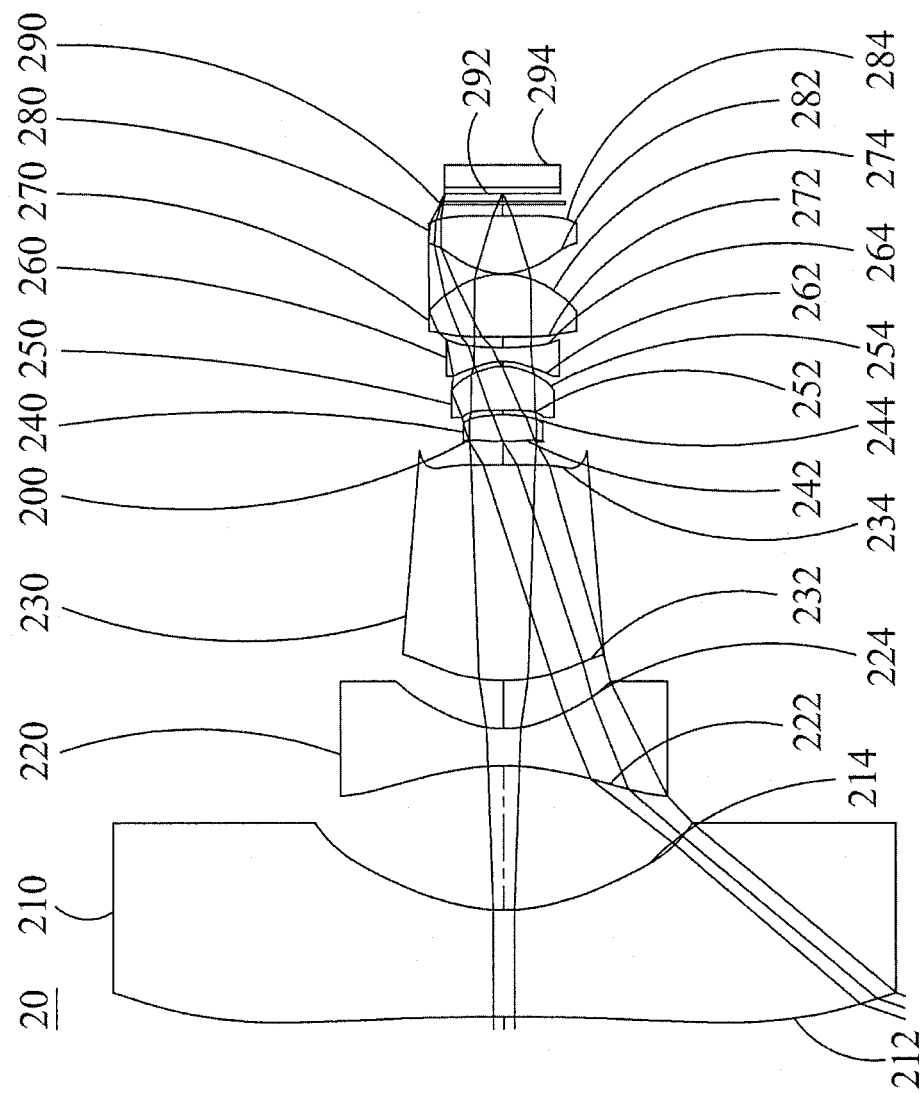
FIG. 2A is a schematic view of the optical image capturing system according to the second embodiment of the present invention.
Figure 2B:
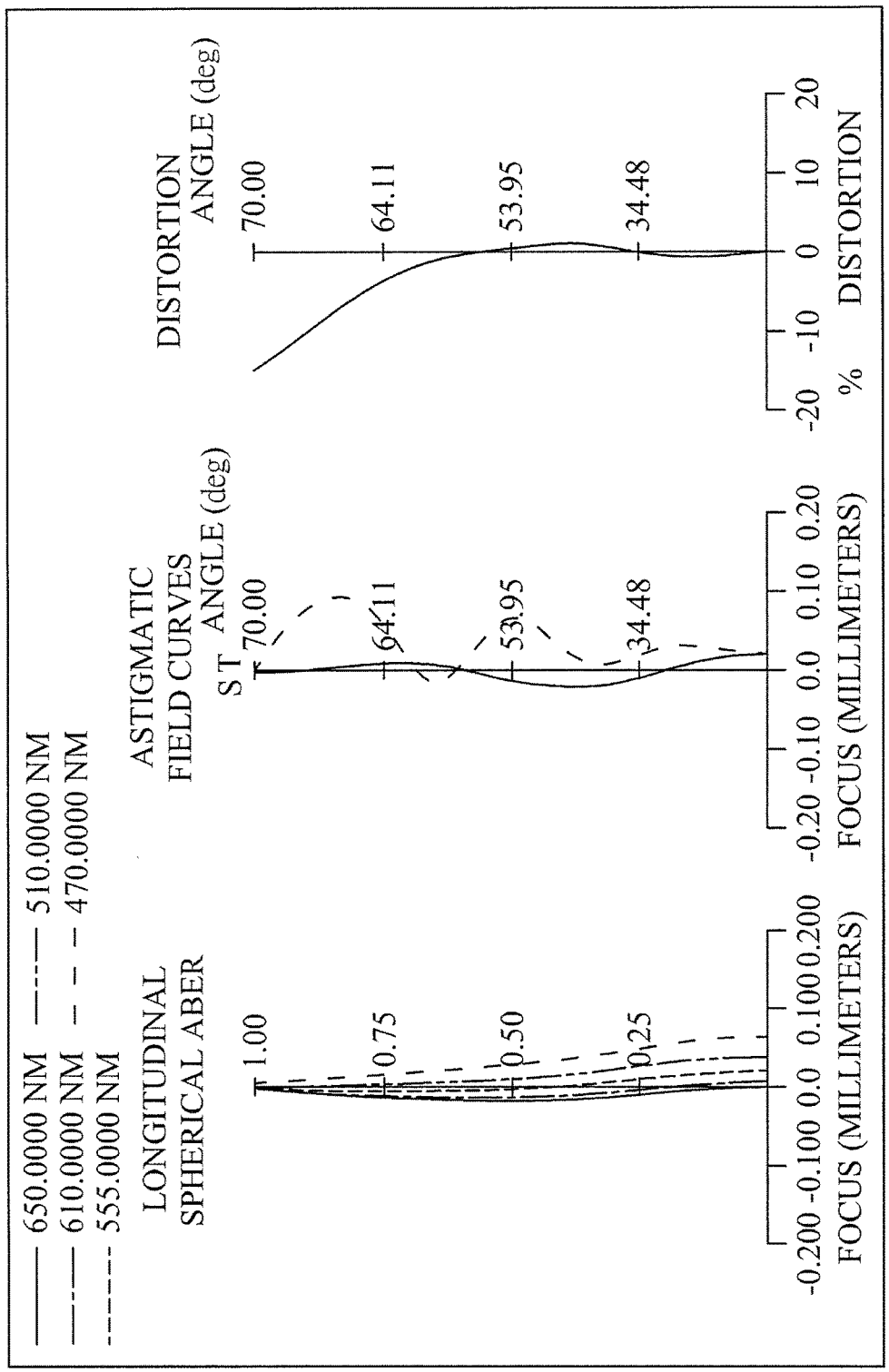
FIG. 2B shows the longitudinal spherical aberration curves, astigmatic field curves, and optical distortion curve of the optical image capturing system in the order from left to right according to the second embodiment of the present invention.
Figure 2C:
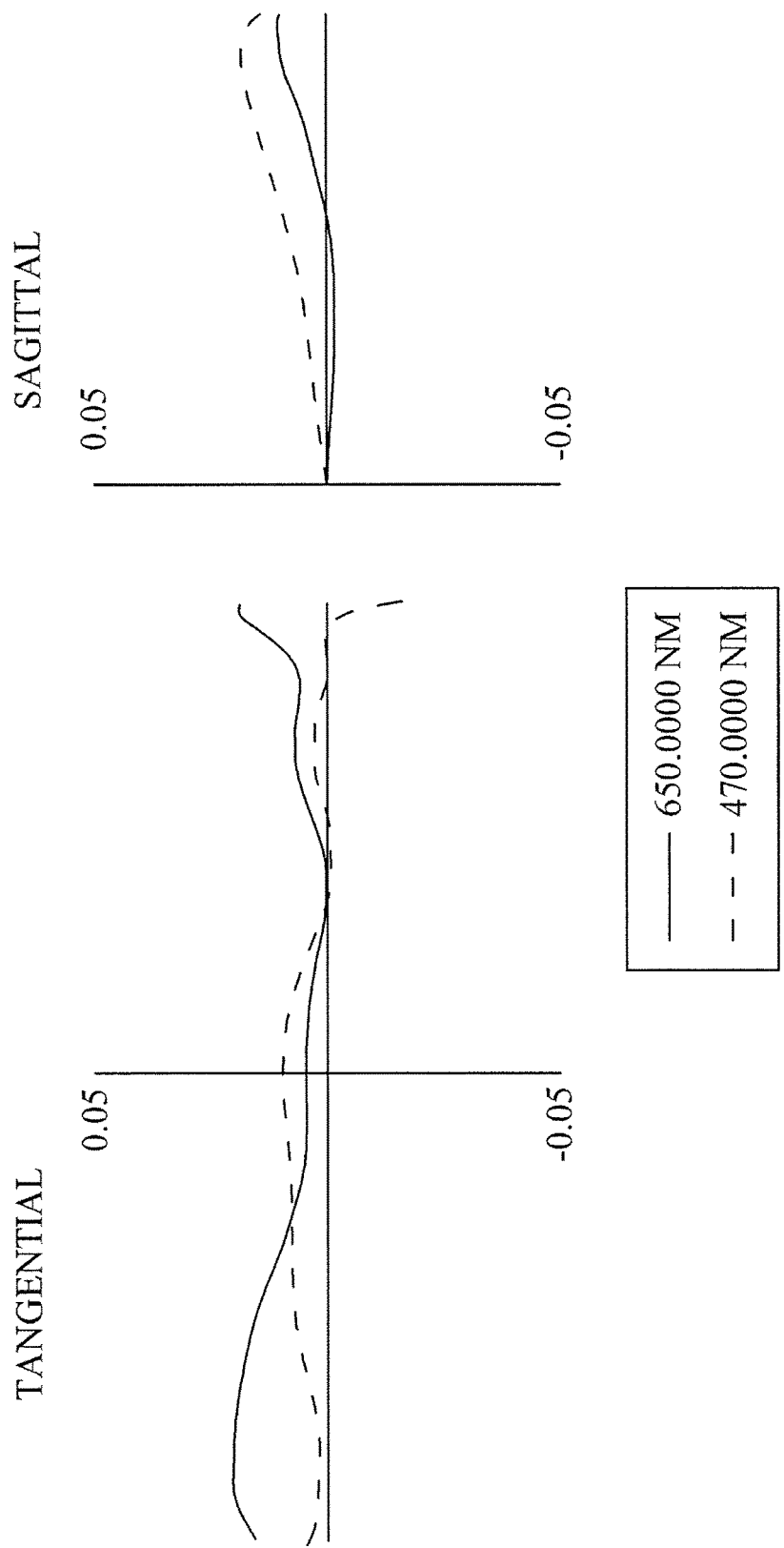
FIG. 2C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the second embodiment of the present disclosure.
Figure 2D:
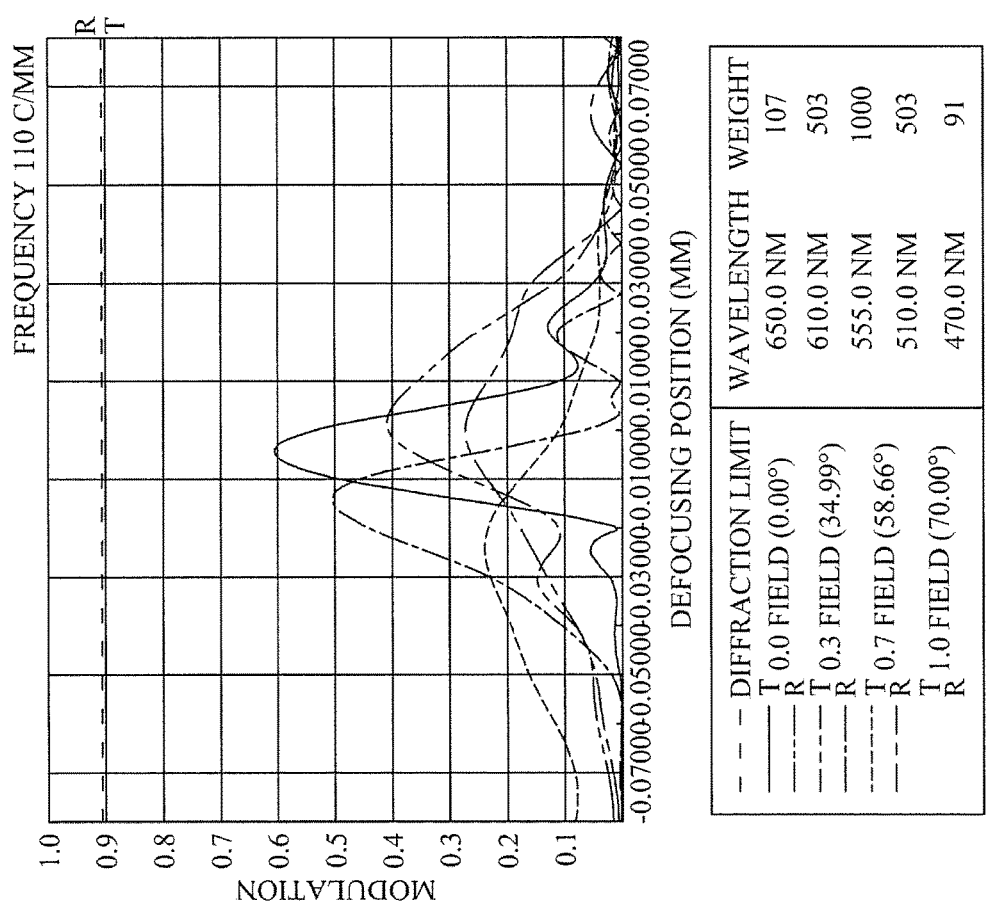
FIG. 2D is a diagram illustrating the through-focus MTF values for the visible light spectrum at the central field of view, 0.3 field of view and 0.7 field of view according to the second embodiment of the present disclosure.
Figure 2E:
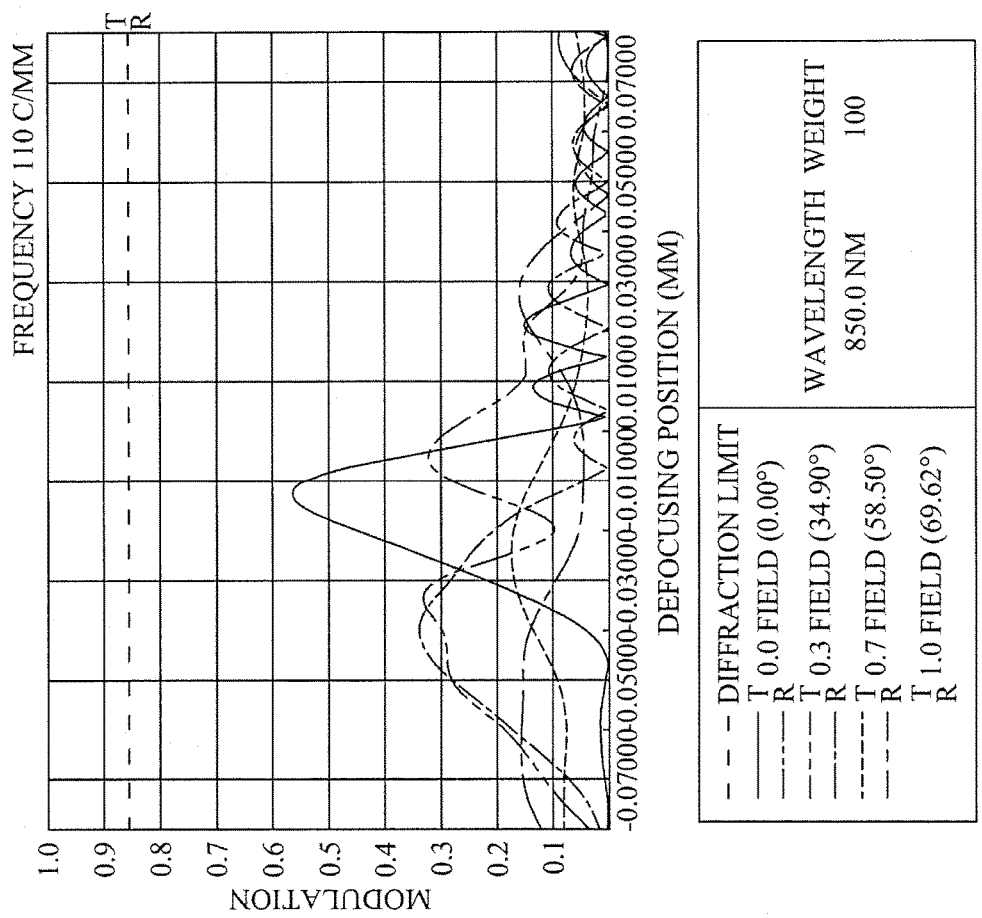
FIG. 2E is a diagram illustrating the through-focus MTF values for the infrared light spectrum at the central field of view, 0.3 field of view and 0.7 field of view according to the second embodiment of the present disclosure.

Please refer to FIG. 2A and FIG. 2B, wherein FIG. 2A is a schematic view of the optical image capturing system according to the second embodiment of the present invention and FIG. 2B shows the longitudinal spherical aberration curves, astigmatic field curves, and optical distortion curve of the optical image capturing system in the order from left to right according to the second embodiment of the present invention. FIG. 2C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the second embodiment of the present disclosure. FIG. 2D is a diagram illustrating the through-focus MTF values for the visible light spectrum at the central field of view, 0.3 field of view and 0.7 field of view according to the first embodiment of the present disclosure. FIG. 2E is a diagram illustrating the through-focus MTF values for the infrared light spectrum at the central field of view, 0.3 field of view and 0.7 field of view according to the second embodiment of the present disclosure. As shown in FIG. 2A, in the order from the object-side surface to the image-side surface, the optical image capturing system includes a first lens 210, a second lens 220, a third lens 230, an aperture 200, a fourth lens 240, a fifth lens 250, a sixth lens 260, a seventh lens 270, an eighth lens 280, an Infrared filter 290, an image plane 292, and an image sensing element 294.

The first lens 210 has negative refractive power and is made of plastic material. The object-side surface 212 of the first lens 210 is a concave surface and the image-side surface 214 of the first lens 210 is a concave surface. Both the object-side surface 212 and the image-side surface 214 are aspheric. The object-side surface 212 has two inflection points.

The second lens 220 has negative refractive power and is made of plastic material. The object-side surface 222 of the second lens 220 is a concave surface and the image-side surface 224 of the second lens 220 is a convex surface. Both the object-side surface 222 and the image-side surface 224 are aspheric. The object-side surface 222 has one inflection point.

The third lens 230 has positive refractive power and is made of plastic material. The object-side surface 232 of the third lens 230 is a convex surface and the image-side surface 234 of the third lens 230 is a convex surface. Both the object-side surface 232 and the image-side surface 234 are aspheric. Besides, the object-side surface 232 has one inflection point, and the image-side surface 234 has two inflection points.

The fourth lens 240 has positive refractive power and is made of plastic material. The object-side surface 242 of the fourth lens 240 is a convex surface and the image-side surface 244 of the fourth lens 240 is a convex surface. Both the object-side surface 242 and the image-side surface 244 are aspheric. The object-side surface 242 has one inflection point.

The fifth lens 250 has positive refractive power and is made of plastic material. The object-side surface 252 of the fifth lens 250 is a concave surface and the image-side surface 254 of the fifth lens 250 is a convex surface. Both the object-side surface 252 and the image-side surface 254 are aspheric.

The sixth lens 260 has negative refractive power and is made of plastic material. The object-side surface 262 of the sixth lens 260 is a concave surface and the image-side surface 264 of the sixth lens 260 is a concave surface. Both the object-side surface 262 and the image-side surface 264 are aspheric. Hereby, the angle of striking on the sixth lens 260 in each field of view may be effectively adjusted so as to improve the aberration.

The seventh lens 270 has positive refractive power and is made of plastic material. The object-side surface 272 thereof is a convex surface and the image-side surface 274 thereof is a convex surface. Both the object-side surface 272 and the image-side surface 274 are aspheric. Hereby, the configuration is beneficial to shorten the back focal length of the optical image capturing system so as to keep its miniaturization. Besides, it can reduce the incident angle of the off-axis rays effectively, and thereby further correcting the off-axis aberration.

The eighth lens 280 has positive refractive power and is made of plastic material. The object-side surface 282 thereof is a convex surface and the image-side surface 284 thereof is a concave surface. Both the object-side surface 282 and the image-side surface 284 are aspheric. Both the object-side surface 282 and the image-side surface 284 have one inflection point. Hereby, it can reduce the incident angle of the off-axis rays effectively, and thereby further correcting the off-axis aberration.

The Infrared filter 290 is made of glass material and is disposed between the eighth lens 280 and the image plane 292. The Infrared filter 290 does not affect the focal length of the optical image capturing system.

The contents in Tables 3 and 4 below should be incorporated into the reference of the present embodiment.

TABLE 3

Lens Parameters for the Second Embodiment
f(focal length) = 2.1395 mm; f/HEP = 1.2; HAF(half angle of view) = 69.9892 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | −160.4998864 | 9.625 | Plastic | 1.530 | 55.84 | −27.6519 |
| 2 | | 16.55729785 | 12.928 | | | | |
| 3 | Lens 2 | −21.62355826 | 3.384 | Plastic | 1.530 | 55.84 | −12.0054 |
| 4 | | 9.575436682 | 4.301 | | | | |
| 5 | Lens 3 | 15.22280182 | 19.331 | Plastic | 1.632 | 22.57 | 20.8369 |
| 6 | | −52.43902241 | 2.068 | | | | |
| 7 | Aperture | 1E+18 | 0.076 | | | | |
| 8 | Lens 4 | 64.64292684 | 2.341 | Plastic | 1.530 | 55.84 | 23.2098 |
| 9 | | −15.09602304 | 0.418 | | | | |
| 10 | Lens 5 | −4983.720224 | 3.946 | Plastic | 1.544 | 55.96 | 6.79184 |
| 11 | | −3.705096906 | 0.441 | | | | |

TABLE 3-continued

Lens Parameters for the Second Embodiment
f(focal length) = 2.1395 mm; f/HEP = 1.2; HAF(half angle of view) = 69.9892 deg

| Surface No | | Curvature Radius | Thickness (mm) | Material | Refractive Index | Coefficient of Dispersion | Focal Length |
|---|---|---|---|---|---|---|---|
| 12 | Lens 6 | −3.821728594 | 1.262 | Plastic | 1.661 | 20.40 | −4.9156 |
| 13 | | 26.06907225 | 0.961 | | | | |
| 14 | Lens 7 | 177.3507086 | 5.591 | Plastic | 1.544 | 55.96 | 11.7442 |
| 15 | | −6.576020391 | 0.062 | | | | |
| 16 | Lens 8 | 5.423821239 | 5.169 | Plastic | 1.544 | 55.96 | 10.1223 |
| 17 | | 197.5076393 | 1.000 | | | | |
| 18 | Infrared filter | 1E+18 | 0.300 | BK_7 | 1.517 | 64.2 | |
| 19 | | 1E+18 | 0.725 | | | | |
| 20 | Image Plane | 1E+18 | −0.021 | | | | |

Reference Wavelength (d-line) = 555 nm

TABLE 4

The Aspheric Coefficients of the Second Embodiment
Table 4: Aspheric Coefficients

| | Surface No | | | | | | |
|---|---|---|---|---|---|---|---|
| | 1 | 2 | 3 | 4 | 5 | 6 | 8 |
| k | −5.000000E+01 | −7.111761E−02 | −2.301851E−01 | −2.945723E−01 | 8.309928E−01 | −3.192839E+00 | 4.212401E+00 |
| A4 | 3.272466E−06 | −3.021667E−05 | 4.147623E−05 | −1.381994E−04 | 2.693510E−05 | 8.276452E−04 | 1.806661E−03 |
| A6 | 8.508574E−10 | −4.978862E−07 | 1.118428E−07 | −4.392559E−07 | −1.214326E−06 | −3.923560E−05 | −1.901661E−04 |
| A8 | 3.173816E−13 | 2.646383E−09 | −1.277168E−10 | −1.706951E−08 | −9.065855E−09 | 6.936865E−08 | 9.736555E−06 |
| A10 | −7.190096E−16 | −4.703459E−12 | 1.719591E−13 | 1.565300E−10 | 3.929504E−12 | 1.147217E−08 | −8.141463E−07 |
| A12 | 0.000000E+00 | 0.000000E+00 | 0.000000E+00 | 0.000000E+00 | 0.000000E+00 | 0.000000E+00 | 0.000000E+00 |

| | Surface No | | | | | | |
|---|---|---|---|---|---|---|---|
| | 9 | 10 | 11 | 12 | 13 | 14 | 15 |
| k | −2.327821E+01 | −6.103516E−03 | −4.765132E+00 | −6.032161E+00 | 1.508481E+01 | −1.118135E+01 | −9.347238E−01 |
| A4 | −5.627875E−04 | −1.633752E−03 | 1.815899E−03 | 8.294402E−05 | −3.295179E−04 | 2.761663E−04 | −7.715743E−05 |
| A6 | −1.455491E−04 | −9.917423E−05 | −6.364766E−05 | 9.351761E−06 | 2.315127E−05 | −1.273805E−07 | 2.861872E−06 |
| A8 | −1.165302E−05 | −1.641856E−05 | −1.833351E−06 | 5.577713E−07 | 1.266257E−06 | 7.346359E−08 | 1.172346E−07 |
| A10 | 5.196471E−07 | 4.686336E−07 | 1.573702E−08 | −8.910175E−08 | −4.504764E−08 | −2.241619E−09 | −5.409849E−09 |
| A12 | 0.000000E+00 | 0.000000E+00 | 0.000000E+00 | 0.000000E+00 | 0.000000E+00 | 0.000000E+00 | 0.000000E+00 |

| | Surface No | |
|---|---|---|
| | 16 | 17 |
| k | −7.824785E−01 | −2.881030E+01 |
| A4 | −4.779275E−04 | −2.070536E−04 |
| A6 | −2.732449E−06 | −5.814127E−06 |
| A8 | −7.540426E−08 | −1.409904E−07 |
| A10 | −1.303566E−09 | 2.857635E−09 |
| A12 | 0.000000E+00 | 0.000000E+00 |

In the second embodiment, the form of the aspheric surface equation therein is presented as that in the first embodiment. Besides, the definition of parameters in the following tables is equivalent to that in the first embodiment, so that the repetitive details are not stated here.

The following conditional values may be obtained according to the data in Table 3 and Table 4.

| Second Embodiment (Primary reference wavelength = 555 nm) | | | | | |
|---|---|---|---|---|---|
| $|f/f1|$ | $|f/f2|$ | $|f/f3|$ | $|f/f4|$ | $|f/f5|$ | $|f/f6|$ |
| 0.0765 | 0.1763 | 0.1028 | 0.0912 | 0.3150 | 0.4352 |

Second Embodiment (Primary reference wavelength = 555 nm)

| \|f/f7\| | \|f/f8\| | \|f1/f2\| | \|f2/f3\| | \|f6/f7\| | \|f7/f8\| |
|---|---|---|---|---|---|
| 0.1822 | 0.2114 | 2.3030 | 0.5833 | 0.4186 | 1.1602 |
| IN12/f | IN78/f | (TP1 + IN12)/TP2 | | (TP8 + IN78)/TP7 | |
| 6.0428 | 0.0290 | 6.6644 | | 0.9356 | |
| HOS | IntL | HOS/HOI | InS/HOS | ODT % | TDT % |
| 73.9091 | 71.9060 | 14.7818 | 0.3013 | −14.9916 | 73.9091 |
| HVT11 | HVT12 | HVT21 | HVT22 | HVT31 | HVT32 |
| 18.1688 | 0.0000 | 0.0000 | 0.0000 | 0.0000 | 0.0000 |
| HVT41 | HVT42 | HVT51 | HVT52 | HVT61 | HVT62 |
| 2.9141 | 0.0000 | 0.0000 | 0.0000 | 0.0000 | 0.0000 |
| HVT71 | HVT72 | HVT81 | HVT82 | HVT82/HOI | HVT82/HOS |
| 0.0000 | 0.0000 | 0.0000 | 2.2214 | 0.4443 | 0.0301 |
| PSTA | PLTA | NSTA | NLTA | SSTA | SLTA |
| −0.016 mm | 0.019 mm | 0.004 mm | 0.016 mm | 0.014 mm | 0.010 mm |
| VSFS0 | VSFS3 | VSFS7 | VTFS0 | VTFS3 | VTFS7 |
| 0.000 | −0.010 | 0.000 | 0.000 | 0.000 | −0.020 |
| VSMTF0 | VSMTF3 | VSMTF7 | VTMTF0 | VTMTF3 | VTMTF7 |
| 0.534 | 0.456 | 0.273 | 0.534 | 0.407 | 0.234 |
| ISFS0 | ISFS3 | ISFS7 | ITFS0 | ITFS3 | ITFS7 |
| −0.010 | −0.040 | −0.060 | −0.010 | −0.030 | −0.020 |
| ISMTF0 | ISMTF3 | ISMTF7 | ITMTF0 | ITMTF3 | ITMTF7 |
| 0.541 | 0.342 | 0.156 | 0.541 | 0.308 | 0.169 |
| FS | AIFS | AVFS | AFS | | |
| 0.010 | −0.028 | −0.005 | 0.023 | | |

The values pertaining to the outline curve lengths are obtainable according to the data in Table 3 and Table 4:

Second Embodiment (Primary reference wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.891 | 0.891 | −0.00025 | 99.97% | 9.625 | 9.26% |
| 12 | 0.891 | 0.891 | 0.00018 | 100.02% | 9.625 | 9.26% |
| 21 | 0.891 | 0.891 | −0.00000 | 100.00% | 3.384 | 26.34% |
| 22 | 0.891 | 0.892 | 0.00103 | 100.12% | 3.384 | 26.37% |
| 31 | 0.891 | 0.892 | 0.00026 | 100.03% | 19.331 | 4.61% |
| 32 | 0.891 | 0.891 | −0.00022 | 99.98% | 19.331 | 4.61% |
| 41 | 0.891 | 0.891 | −0.00021 | 99.98% | 2.341 | 38.06% |
| 42 | 0.891 | 0.892 | 0.00026 | 100.03% | 2.341 | 38.08% |
| 51 | 0.891 | 0.891 | −0.00025 | 99.97% | 3.946 | 22.58% |
| 52 | 0.891 | 0.899 | 0.00731 | 100.82% | 3.946 | 22.77% |
| 61 | 0.891 | 0.898 | 0.00665 | 100.75% | 1.262 | 71.13% |
| 62 | 0.891 | 0.891 | −0.00008 | 99.99% | 1.262 | 70.60% |
| 71 | 0.891 | 0.891 | −0.00025 | 99.97% | 5.591 | 15.94% |
| 72 | 0.891 | 0.894 | 0.00247 | 100.28% | 5.591 | 15.99% |
| 81 | 0.891 | 0.895 | 0.00371 | 100.42% | 5.169 | 17.31% |
| 82 | 0.891 | 0.891 | −0.00025 | 99.97% | 5.169 | 17.24% |

Second Embodiment (Primary reference wavelength = 555 nm)

| ARS | EHD | ARS value | ARS − EHD | (ARS/EHD) % | TP | ARS/TP (%) |
|---|---|---|---|---|---|---|
| 11 | 33.926 | 34.251 | 0.325 | 100.96% | 9.625 | 355.87% |
| 12 | 16.349 | 18.690 | 2.341 | 114.32% | 9.625 | 194.18% |
| 21 | 14.117 | 14.420 | 0.302 | 102.14% | 3.384 | 426.09% |
| 22 | 9.285 | 10.410 | 1.124 | 112.11% | 3.384 | 307.60% |
| 31 | 8.701 | 9.102 | 0.400 | 104.60% | 19.331 | 47.08% |
| 32 | 4.026 | 4.026 | 0.001 | 100.02% | 19.331 | 20.83% |
| 41 | 2.922 | 2.924 | 0.002 | 100.07% | 2.341 | 124.91% |
| 42 | 3.421 | 3.563 | 0.142 | 104.16% | 2.341 | 152.20% |
| 51 | 3.471 | 3.628 | 0.157 | 104.53% | 3.946 | 91.93% |
| 52 | 4.405 | 5.068 | 0.663 | 115.05% | 3.946 | 128.42% |
| 61 | 4.274 | 4.505 | 0.231 | 105.41% | 1.262 | 356.88% |
| 62 | 4.872 | 4.969 | 0.097 | 101.99% | 1.262 | 393.66% |
| 71 | 5.580 | 5.601 | 0.021 | 100.38% | 5.591 | 100.17% |
| 72 | 6.388 | 7.471 | 1.083 | 116.95% | 5.591 | 133.63% |
| 81 | 6.443 | 7.116 | 0.673 | 110.45% | 5.169 | 137.67% |
| 82 | 6.328 | 6.431 | 0.103 | 101.63% | 5.169 | 124.42% |

The following conditional values may be obtained according to the data in Table 3 and Table 4.

Values Related to Inflection Point of Second Embodiment
(Primary Reference Wavelength = 555 nm)

| | | | | | | | |
|---|---|---|---|---|---|---|---|
| HIF111 | 10.5231 | HIF111/HOI | 2.1046 | SGI111 | −0.2872 | \|SGI111\|/(\|SGI111\| + TP1) | 0.0290 |
| HIF112 | 33.3146 | HIF112/HOI | 6.6629 | SGI112 | 1.9630 | \|SGI112\|/(\|SGI112\| + TP1) | 0.1694 |
| HIF211 | 8.8629 | HIF211/HOI | 1.7726 | SGI211 | −1.5734 | \|SGI211\|/(\|SGI211\| + TP2) | 0.3174 |
| HIF311 | 7.1282 | HIF311/HOI | 1.4256 | SGI311 | 1.7331 | \|SGI311\|/(\|SGI311\| + TP3) | 0.0823 |
| HIF321 | 1.6971 | HIF321/HOI | 0.3394 | SGI321 | −0.0215 | \|SGI321\|/(\|SGI321\| + TP3) | 0.0011 |
| HIF322 | 2.4806 | HIF322/HOI | 0.4961 | SGI322 | −0.0362 | \|SGI322\|/(\|SGI322\| + TP3) | 0.0019 |
| HIF411 | 2.2620 | HIF411/HOI | 0.4524 | SGI411 | 0.0653 | \|SGI411\|/(\|SGI411\| + TP4) | 0.0271 |
| HIF811 | 4.7046 | HIF811/HOI | 0.9409 | SGI811 | 1.8427 | \|SGI811\|/(\|SGI811\| + TP8) | 0.2628 |
| HIF821 | 1.3386 | HIF821/HOI | 0.2677 | SGI821 | 0.0038 | \|SGI821\|/(\|SGI821\| + TP8) | 0.0007 |

Third Embodiment

Figure 3A:
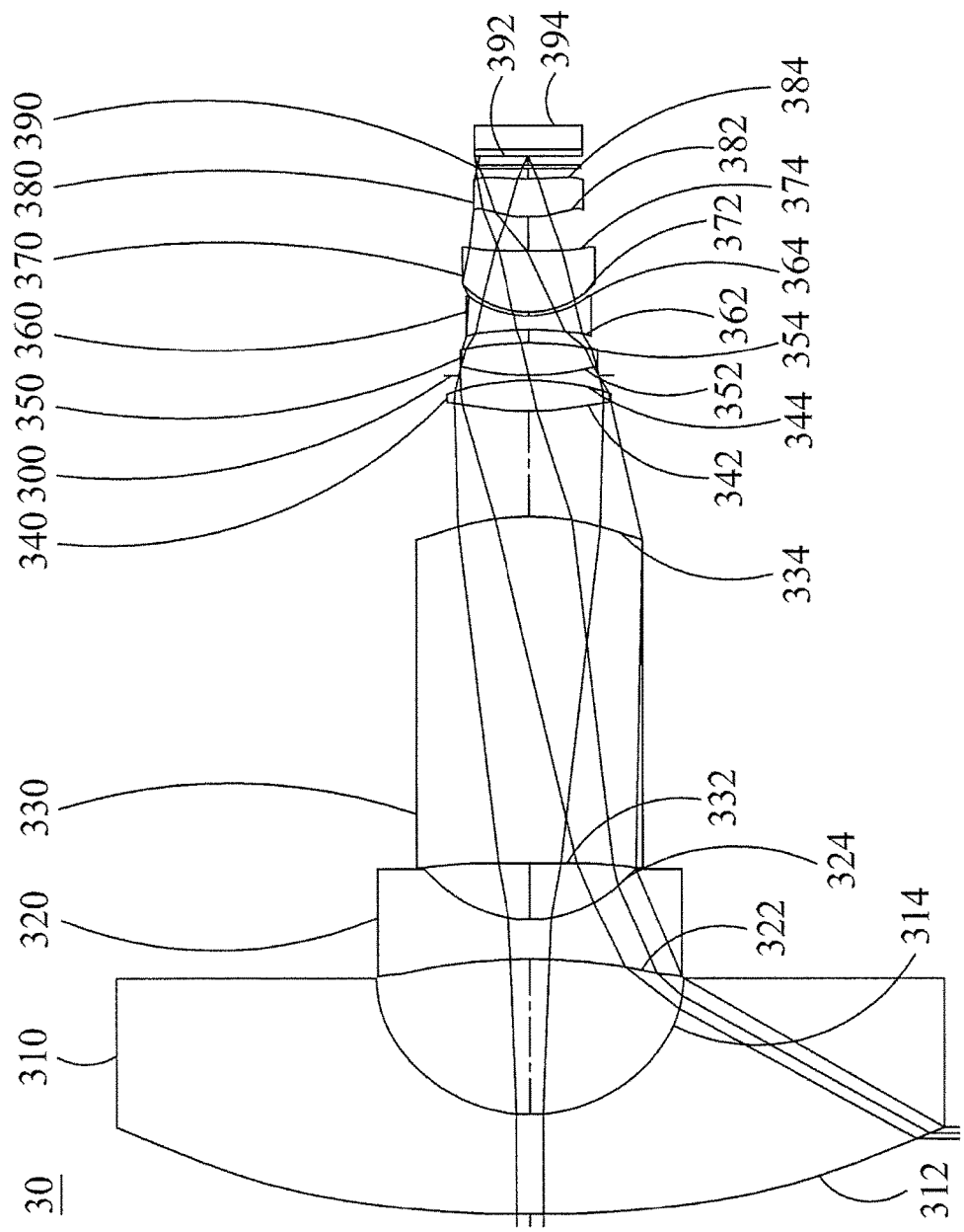
FIG. 3A is a schematic view of the optical image capturing system according to the third embodiment of the present invention.
Figure 3B:
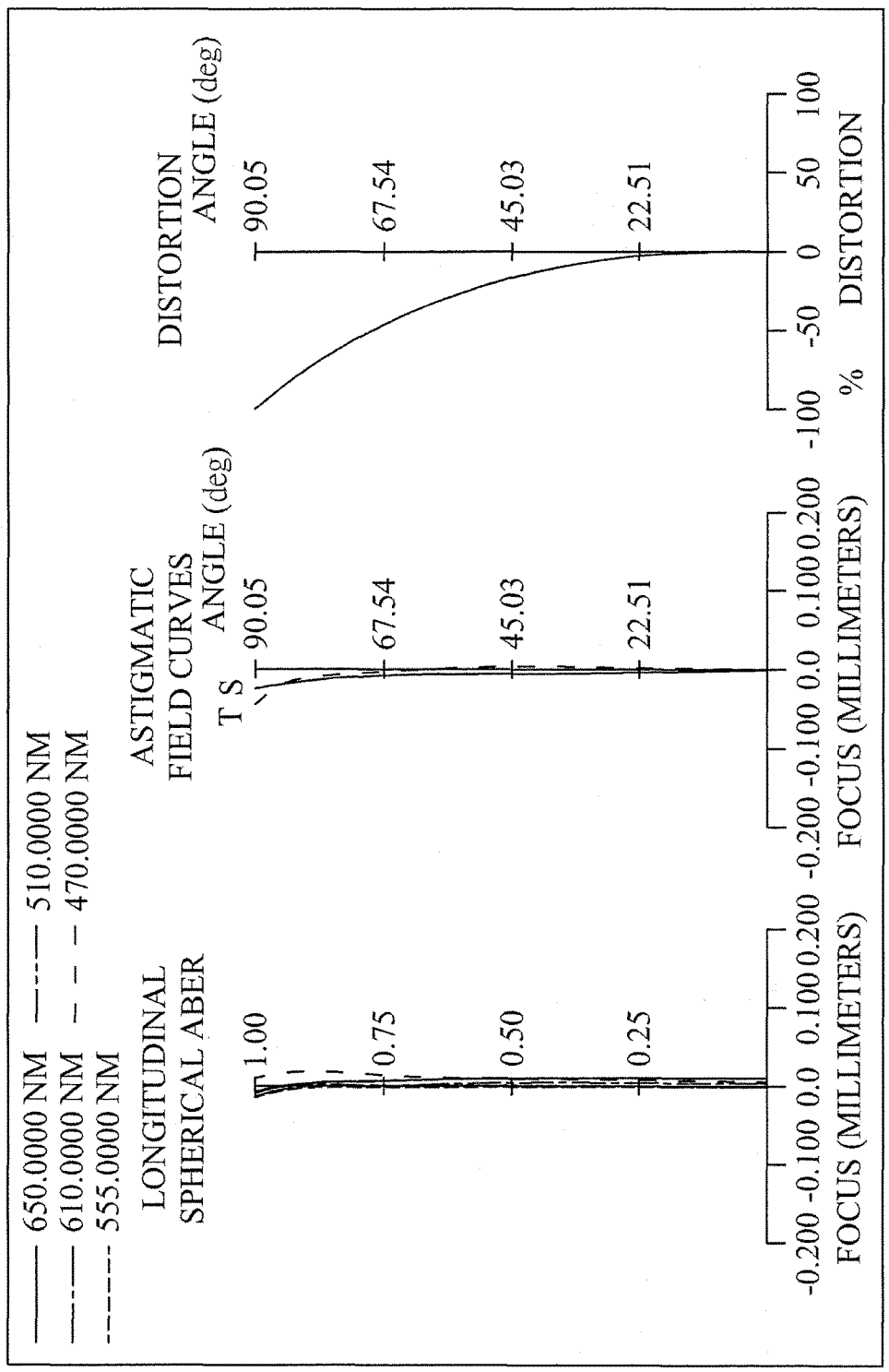
FIG. 3B shows the longitudinal spherical aberration curves, astigmatic field curves, and optical distortion curve of the optical image capturing system in the order from left to right according to the third embodiment of the present invention.
Figure 3C:
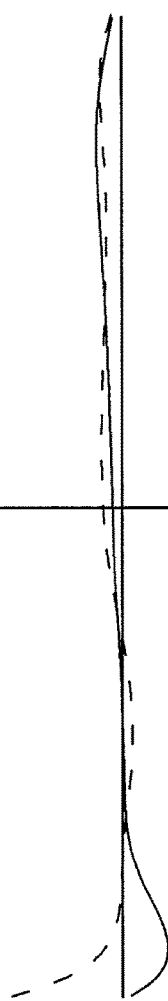
FIG. 3C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the third embodiment of the present disclosure.
Figure 3C:
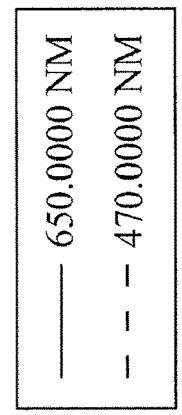
Figure 3D:
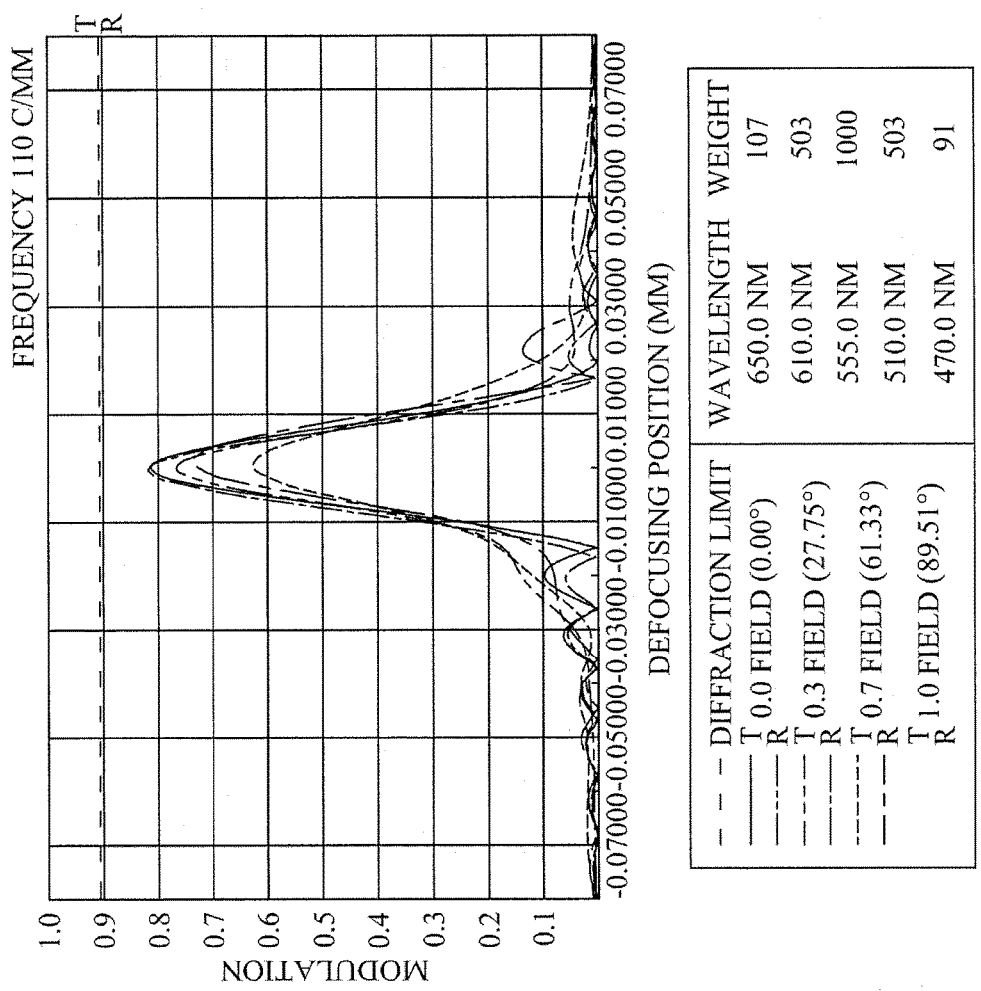
FIG. 3D is a diagram illustrating the through-focus MTF values for the visible light spectrum at the central field of view, 0.3 field of view and 0.7 field of view according to the third embodiment of the present disclosure.
Figure 3E:
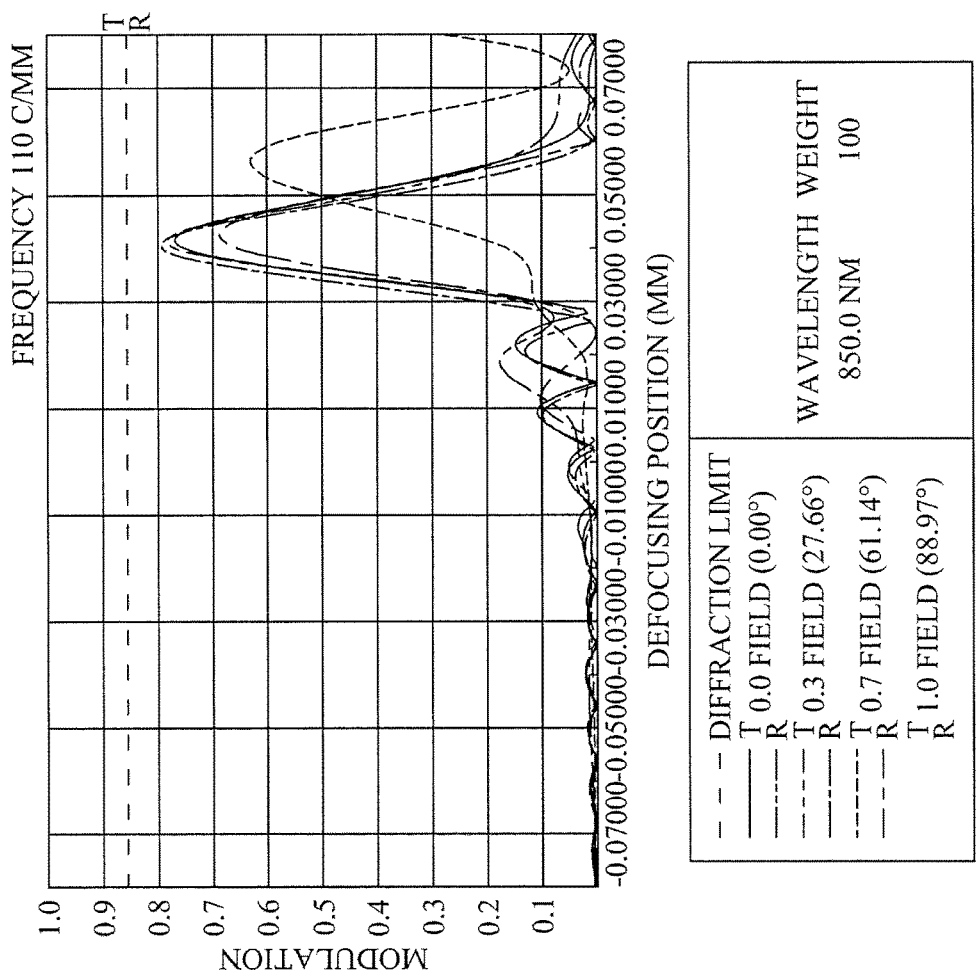
FIG. 3E is a diagram illustrating the through-focus MTF values for the infrared light spectrum at the central field of view, 0.3 field of view and 0.7 field of view according to the third embodiment of the present disclosure.

Please refer to FIG. 3A and FIG. 3B, wherein FIG. 3A is a schematic view of the optical image capturing system according to the third embodiment of the present invention and FIG. 3B shows the longitudinal spherical aberration curves, astigmatic field curves, and optical distortion curve of the optical image capturing system in the order from left to right according to the third embodiment of the present invention. FIG. 3C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the third embodiment of the present disclosure. FIG. 3D is a diagram illustrating the through-focus MTF values for the visible light spectrum at the central field of view, 0.3 field of view and 0.7 field of view according to the first embodiment of the present disclosure. FIG. 3E is a diagram illustrating the through-focus MTF values for the infrared light spectrum at the central field of view, 0.3 field of view and 0.7 field of view according to the third embodiment of the present disclosure. As shown in FIG. 3A, in the order from an object-side surface to an image-side surface, the optical image capturing system includes a first lens 310, a second lens 320, a third lens 330, a fourth lens 340, an aperture 300, a fifth lens 350, a sixth lens 360, a seventh lens 370, an eighth lens 380, an Infrared filter 390, an image plane 392, and an image sensing element 394.

The first lens 310 has negative refractive power and is made of plastic material. The object-side surface 312 of the first lens 310 is a convex surface and the image-side surface 314 of the first lens 310 is a concave surface. Both the object-side surface 312 and the image-side surface 314 are aspheric. The object-side surface 312 has one inflection point.

The second lens 320 has negative refractive power and is made of plastic material. The object-side surface 322 of the second lens 320 is a concave surface and the image-side surface 324 of the second lens 320 is a concave surface. Both the object-side surface 322 and the image-side surface 324 are aspheric. The object-side surface 322 has one inflection point.

The third lens 330 has positive refractive power and is made of plastic material. The object-side surface 332 of the third lens 330 is a concave surface and the image-side surface 334 of the third lens 330 is a convex surface. Both the object-side surface 332 and the image-side surface 334 are aspheric.

The fourth lens 340 has positive refractive power and is made of plastic material. The object-side surface 342 of the fourth lens 340 is a convex surface and the image-side surface 344 of the fourth lens 340 is a convex surface. The object-side surface 342 has one inflection point.

The fifth lens 350 has positive refractive power and is made of plastic material. The object-side surface 352 of the fifth lens 350 is a convex surface and the image-side surface 354 of the fifth lens 350 is a convex surface. Both the object-side surface 352 and the image-side surface 354 are aspheric.

The sixth lens 360 has negative refractive power and is made of plastic material. The object-side surface 362 of the sixth lens 360 is a concave surface and the image-side surface 364 of the sixth lens 360 is a concave surface. Both the object-side surface 362 and the image-side surface 364 are aspheric. Hereby, the angle of striking on the sixth lens 360 in each field of view may be effectively adjusted so as to improve the aberration.

The seventh lens 370 has positive refractive power and is made of plastic material. The object-side surface 372 thereof is a convex surface and the image-side surface 374 thereof is a concave surface. Both the object-side surface 372 and the image-side surface 374 are aspheric. Hereby, the configuration is beneficial to shorten the back focal length of the optical image capturing system so as to keep its miniaturization. Besides, the incident angle of the off-axis rays can be reduced effectively, thereby further correcting the off-axis aberration.

The eighth lens 380 has positive refractive power and is made of plastic material. The object-side surface 382 thereof is a convex surface and the image-side surface 384 thereof is a concave surface. Both the object-side surface 382 and the image-side surface 384 are aspheric. Hereby, the configuration is beneficial to shorten the back focal length of the optical image capturing system so as to keep its miniaturization. Both the object-side surface 382 and the image-side surface 384 have one inflection point. Hence, the incident angle of the off-axis rays can be reduced effectively, thereby further correcting the off-axis aberration.

The Infrared filter 390 is made of glass material and is disposed between the eighth lens 380 and the image plane 392. The Infrared filter 390 does not affect the focal length of the optical image capturing system.

The contents in Tables 5 and 6 below should be incorporated into the reference of the present embodiment.

TABLE 5

Lens Parameters for the Third Embodiment
f(focal length) = 3.0038 mm; f/HEP = 1.2; HAF(half angle of view) = 89.9520 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 118.4001906 | 9.776 | Plastic | 1.544 | 55.96 | −30.1596 |
| 2 | | 14.0299732 | 15.087 | | | | |
| 3 | Lens 2 | −43.68844757 | 3.914 | Plastic | 1.544 | 55.96 | −15.5398 |
| 4 | | 10.85723054 | 5.521 | | | | |
| 5 | Lens 3 | −128.0462036 | 33.558 | Plastic | 1.584 | 29.88 | 37.3357 |
| 6 | | −20.54075828 | 10.242 | | | | |
| 7 | Lens 4 | 28.75114673 | 2.911 | Plastic | 1.544 | 55.96 | 23.8725 |
| 8 | | −22.97454165 | 0.540 | | | | |
| 9 | Aperture | 1E+18 | 0.045 | | | | |
| 10 | Lens 5 | 26.54255419 | 3.121 | Plastic | 1.544 | 55.96 | 27.756 |
| 11 | | −33.82336317 | 1.311 | | | | |
| 12 | Lens 6 | −30.40228996 | 1.351 | Plastic | 1.661 | 20.40 | −10.0278 |
| 13 | | −8.838548876 | 0.450 | | | | |
| 14 | Lens 7 | 8.254210888 | 5.904 | Plastic | 1.544 | 55.96 | 17.1033 |
| 15 | | 53.30882032 | 3.292 | | | | |
| 16 | Lens 8 | 9.096541983 | 3.676 | Plastic | 1.544 | 55.96 | 23.6198 |
| 17 | | 26.49394254 | 1.000 | | | | |
| 18 | Infrared filter | 1E+18 | 0.300 | BK_7 | 1.517 | 64.2 | |
| 19 | | 1E+18 | 0.898 | | | | |
| 20 | Image Plane | 1E+18 | 0.001 | | | | |

Reference Wavelength (d-line) = 555 nm

TABLE 6

The Aspheric Coefficients of the Third Embodiment
Table 6: Aspheric Coefficients

| | Surface No | | | | | | |
|---|---|---|---|---|---|---|---|
| | 1 | 2 | 3 | 4 | 5 | 6 | 7 |
| k  | 1.057149E+00 | −4.692537E−02 | −2.405266E−01 | −4.107954E−02 | 1.523156E+01 | −2.486116E−01 | 5.768264E−01 |
| A4 | 9.230066E−07 | −1.156018E−05 | 1.601900E−05 | −5.942831E−05 | −9.371757E−06 | 6.310835E−05 | 8.814217E−06 |
| A6 | 3.005930E−10 | −1.223631E−07 | −8.905802E−09 | −2.911857E−07 | 1.469436E−07 | −9.417548E−08 | −3.861144E−07 |
| A8 | −5.449783E−14 | 6.758025E−10 | −2.189025E−10 | −1.835157E−09 | 1.382722E−09 | −1.085938E−10 | −3.704972E−09 |
| A10 | −1.357539E−16 | −2.423280E−12 | 1.372236E−12 | −3.426243E−11 | −2.704105E−11 | −2.269910E−12 | −1.326136E−10 |
| A12 | 0.000000E+00 | 0.000000E+00 | 0.000000E+00 | 0.000000E+00 | 0.000000E+00 | 0.000000E+00 | 0.000000E+00 |

| | Surface No | | | | | | |
|---|---|---|---|---|---|---|---|
| | 8 | 10 | 11 | 12 | 13 | 14 | 15 |
| k  | −7.331181E−01 | 7.819378E−01 | −8.551321E−01 | 6.140155E−01 | −1.333098E−02 | −1.576793E+00 | −5.000000E+01 |
| A4 | 2.617965E−05 | 1.462418E−05 | 1.678755E−05 | 3.808956E−05 | −1.129169E−04 | 1.634247E−04 | −3.063709E−04 |
| A6 | 1.204050E−08 | −2.047323E−07 | −3.076728E−07 | −1.278702E−06 | −2.866309E−06 | 4.099298E−06 | 1.456252E−05 |
| A8 | −4.122620E−09 | 1.719578E−09 | −3.547045E−08 | −2.574632E−08 | 3.547141E−08 | 2.757928E−08 | −6.497937E−08 |
| A10 | −4.210243E−11 | 2.052170E−10 | 4.170479E−10 | 3.702667E−10 | 3.668839E−10 | 4.191906E−10 | 1.395116E−09 |
| A12 | 0.000000E+00 | 0.000000E+00 | 0.000000E+00 | 0.000000E+00 | 0.000000E+00 | 0.000000E+00 | 0.000000E+00 |

| | Surface No | |
|---|---|---|
| | 16 | 17 |
| k  | −3.977750E+00 | 1.388764E+01 |
| A4 | −2.485142E−04 | −4.111982E−04 |
| A6 | −1.075338E−05 | −2.466359E−05 |
| A8 | 1.058302E−07 | −2.687338E−07 |
| A10 | −1.214508E−08 | 1.191070E−08 |
| A12 | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

Third Embodiment (Primary Reference Wavelength = 555 nm)

| |f/f1| | |f/f2| | |f/f3| | |f/f4| | |f/f5| | |f/f6| |
|---|---|---|---|---|---|
| 0.0996 | 0.1933 | 0.0807 | 0.1258 | 0.1082 | 0.2996 |
| |f/f7| | |f/f8| | |f1/f2| | |f2/f3| | |f6/f7| | |f7/f8| |
| 0.1756 | 0.1272 | 1.9408 | 0.4174 | 0.5863 | 0.7241 |
| IN12/f | IN78/f | (TP1 + IN12)/TP2 | | (TP8 + IN78)/TP7 | |
| 5.0227 | 1.0961 | 6.3522 | | 1.1803 | |
| HOS | InTL | HOS/HOI | InS/HOS | ODT % | TDT % |
| 102.7870 | 100.6030 | 20.5574 | 0.2066 | −100.1400 | 74.5964 |
| HVT11 | HVT12 | HVT21 | HVT22 | HVT31 | HVT32 |
| 0.0000 | 0.0000 | 0.0000 | 0.0000 | 0.0000 | 0.0000 |
| HVT41 | HVT42 | HVT51 | HVT52 | HVT61 | HVT62 |
| 0.0000 | 0.0000 | 0.0000 | 0.0000 | 0.0000 | 0.0000 |
| HVT71 | HVT72 | HVT81 | HVT82 | HVT82/HOI | HVT82/HOS |
| 0.0000 | 0.0000 | 0.0000 | 3.5075 | 0.7015 | 0.0341 |
| PSTA | PLTA | NSTA | NLTA | SSTA | SLTA |
| 0.002 mm | 0.002 mm | 0.023 mm | −0.002 mm | 0.004 mm | −0.005 mm |
| VSFS0 | VSFS3 | VSFS7 | VTFS0 | VTFS3 | VTFS7 |
| 0.000 | 0.000 | 0.000 | 0.000 | 0.000 | 0.000 |
| VSMTF0 | VSMTF3 | VSMTF7 | VTMTF0 | VTMTF3 | VTMTF7 |
| 0.813 | 0.817 | 0.728 | 0.813 | 0.767 | 0.623 |
| ISFS0 | ISFS3 | ISFS7 | ITFS0 | ITFS3 | ITFS7 |
| 0.040 | 0.040 | 0.040 | 0.040 | 0.040 | 0.060 |
| ISMTF0 | ISMTF3 | ISMTF7 | ITMTF0 | ITMTF3 | ITMTF7 |
| 0.751 | 0.790 | 0.651 | 0.751 | 0.767 | 0.576 |
| FS | AIFS | AVFS | AFS | | |
| 0.040 | 0.043 | 0.000 | 0.043 | | |

The values pertaining to the outline curve lengths are obtainable according to the data in Table 5 and Table 6:

Third Embodiment (Primary Reference Wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 1.251 | 1.250 | −0.00091 | 99.93% | 9.776 | 12.79% |
| 12 | 1.251 | 1.252 | 0.00072 | 100.06% | 9.776 | 12.80% |
| 21 | 1.251 | 1.250 | −0.00076 | 99.94% | 3.914 | 31.94% |
| 22 | 1.251 | 1.253 | 0.00183 | 100.15% | 3.914 | 32.01% |
| 31 | 1.251 | 1.250 | −0.00091 | 99.93% | 33.558 | 3.72% |
| 32 | 1.251 | 1.251 | −0.00017 | 99.99% | 33.558 | 3.73% |
| 41 | 1.251 | 1.250 | −0.00054 | 99.96% | 2.911 | 42.95% |
| 42 | 1.251 | 1.251 | −0.00032 | 99.97% | 2.911 | 42.96% |
| 51 | 1.251 | 1.250 | −0.00047 | 99.96% | 3.121 | 40.06% |
| 52 | 1.251 | 1.250 | −0.00065 | 99.95% | 3.121 | 40.06% |
| 61 | 1.251 | 1.250 | −0.00058 | 99.95% | 1.351 | 92.55% |
| 62 | 1.251 | 1.254 | 0.00335 | 100.27% | 1.351 | 92.84% |
| 71 | 1.251 | 1.255 | 0.00384 | 100.31% | 5.904 | 21.25% |
| 72 | 1.251 | 1.250 | −0.00083 | 99.93% | 5.904 | 21.17% |
| 81 | 1.251 | 1.254 | 0.00279 | 100.22% | 3.676 | 34.11% |
| 82 | 1.251 | 1.250 | −0.00050 | 99.96% | 3.676 | 34.02% |

-continued

Third Embodiment (Primary Reference Wavelength = 555 nm)

| ARS | EHD | ARS value | ARS − EHD | (ARS/ EHD) % | TP | ARS/TP (%) |
|---|---|---|---|---|---|---|
| 11 | 37.659 | 38.874 | 1.215 | 103.23% | 9.776 | 397.63% |
| 12 | 14.325 | 20.648 | 6.322 | 144.13% | 9.776 | 211.20% |
| 21 | 13.385 | 13.499 | 0.115 | 100.86% | 3.914 | 344.88% |
| 22 | 9.637 | 10.977 | 1.340 | 113.91% | 3.914 | 280.44% |
| 31 | 9.611 | 9.623 | 0.012 | 100.13% | 33.558 | 28.68% |
| 32 | 10.298 | 10.577 | 0.279 | 102.71% | 33.558 | 31.52% |
| 41 | 7.582 | 7.642 | 0.060 | 100.79% | 2.911 | 262.50% |
| 42 | 7.443 | 7.570 | 0.127 | 101.70% | 2.911 | 260.04% |
| 51 | 6.461 | 6.537 | 0.076 | 101.18% | 3.121 | 209.42% |
| 52 | 6.250 | 6.291 | 0.042 | 100.66% | 3.121 | 201.55% |
| 61 | 5.819 | 5.859 | 0.041 | 100.70% | 1.351 | 433.68% |
| 62 | 5.535 | 5.920 | 0.386 | 106.97% | 1.351 | 438.20% |
| 71 | 6.000 | 6.680 | 0.681 | 111.35% | 5.904 | 113.15% |
| 72 | 5.395 | 5.414 | 0.019 | 100.36% | 5.904 | 91.70% |
| 81 | 5.012 | 5.085 | 0.073 | 101.45% | 3.676 | 138.32% |
| 82 | 5.117 | 5.149 | 0.032 | 100.62% | 3.676 | 140.06% |

The following values for the conditional expressions can be obtained from the data in Table 5 and Table 6.

Values Related to Inflection Point of Third Embodiment (Primary Reference Wavelength = 555 nm)

| HIF111 | 35.9970 | HIF111/HOI | 7.1994 | SGI111 | 7.3145 | |SGI111|/(|SGI111| + TP1) | 0.4280 |
|---|---|---|---|---|---|---|---|
| HIF211 | 11.0537 | HIF211/HOI | 2.2107 | SGI211 | −1.2043 | |SGI211|/(|SGI211| + TP2) | 0.2353 |
| HIF411 | 5.9473 | HIF411/HOI | 1.1895 | SGI411 | 0.6067 | |SGI411|/(|SGI411| + TP4) | 0.1725 |
| HIF811 | 3.1861 | HIF711/HOI | 0.6372 | SGI811 | 0.4776 | |SGI811|/(|SGI811| + TP8) | 0.1150 |
| HIF821 | 2.2417 | HIF821/HOI | 0.4483 | SGI821 | 0.0839 | |SGI821|/(|SGI821| + TP8) | 0.0223 |

Fourth Embodiment

Figure 4A:
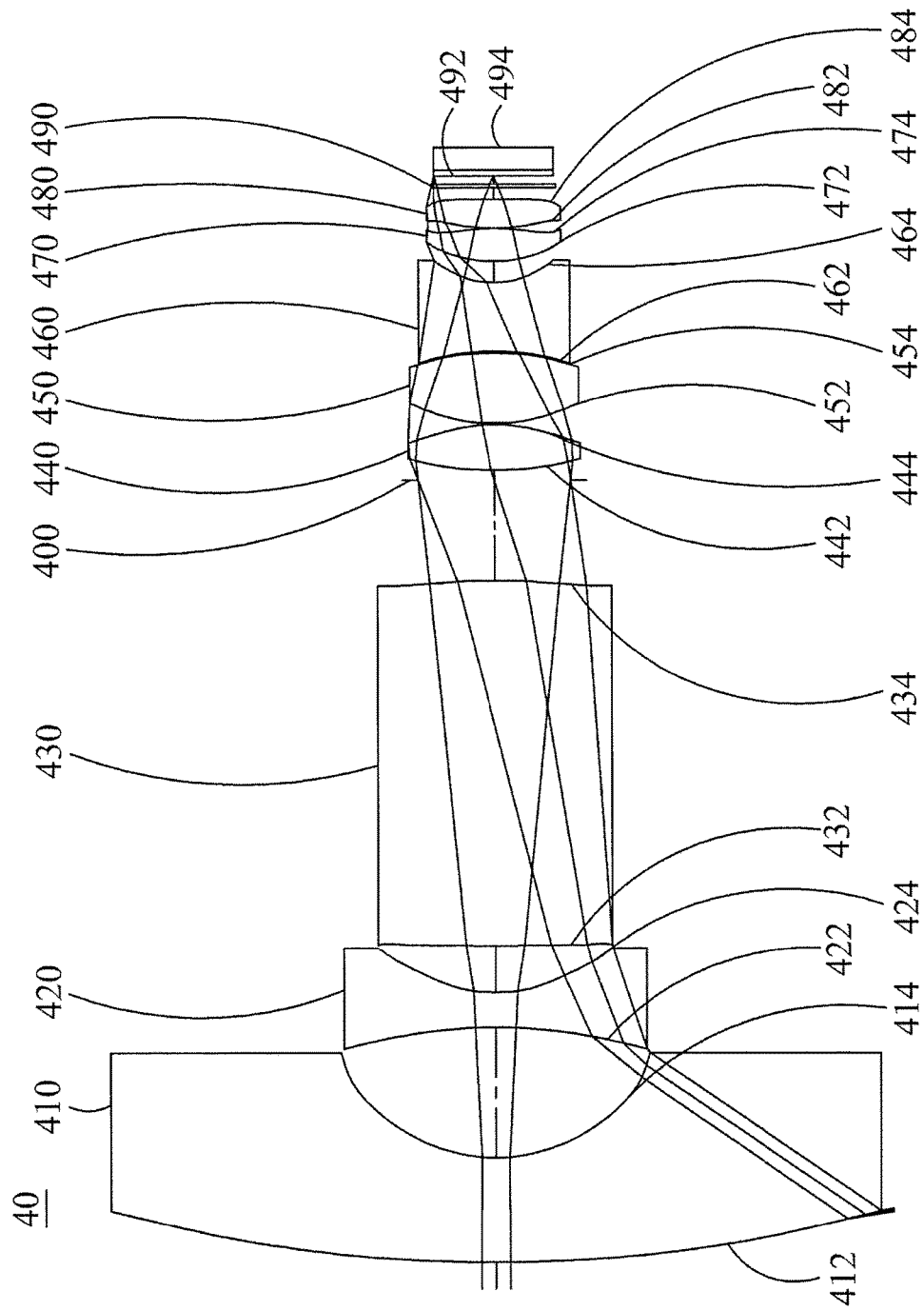
FIG. 4A is a schematic view of the optical image capturing system according to the fourth embodiment of the present invention.
Figure 4B:
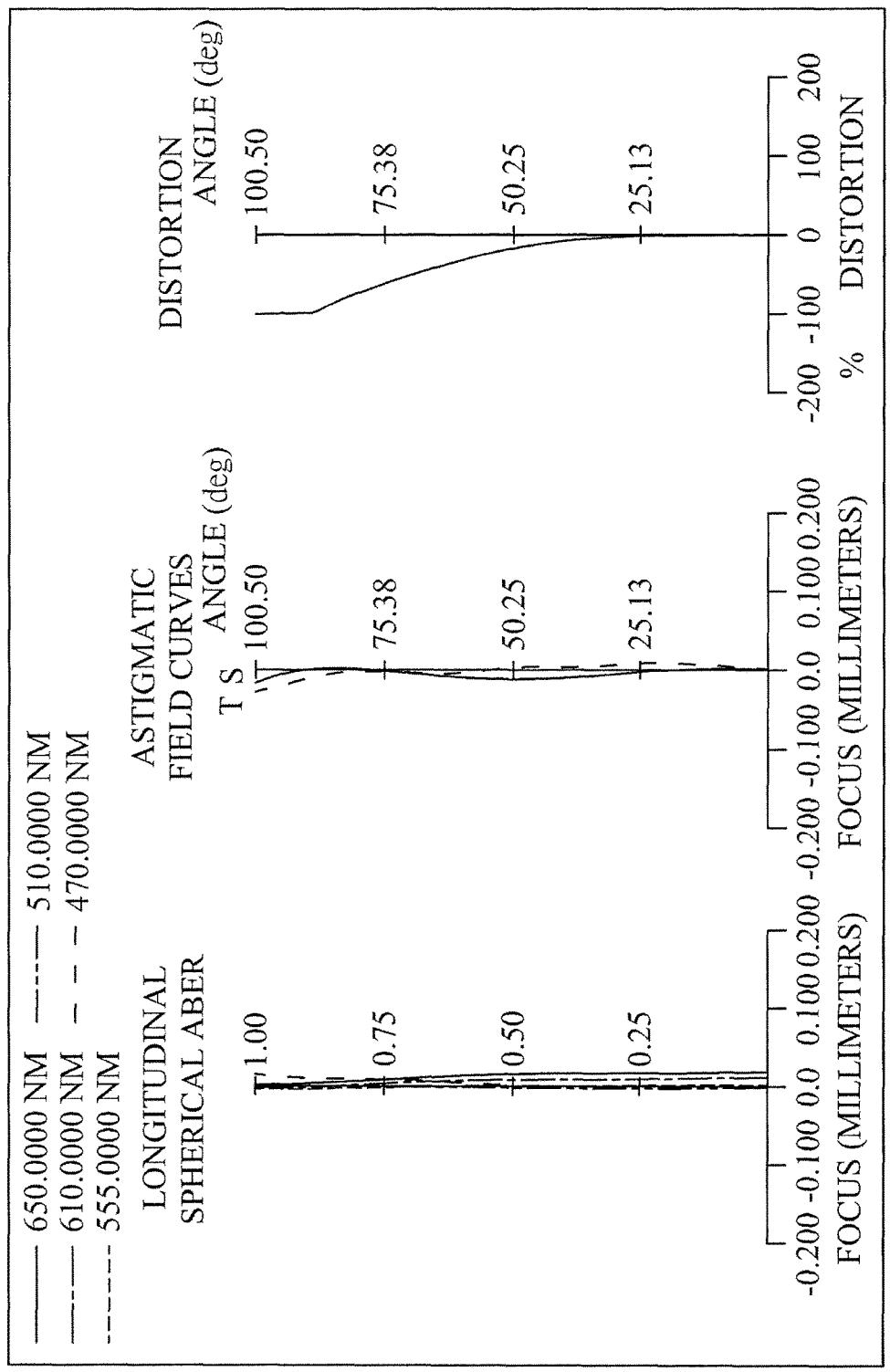
FIG. 4B shows the longitudinal spherical aberration curves, astigmatic field curves, and optical distortion curve of the optical image capturing system in the order from left to right according to the fourth embodiment of the present invention.
Figure 4C:
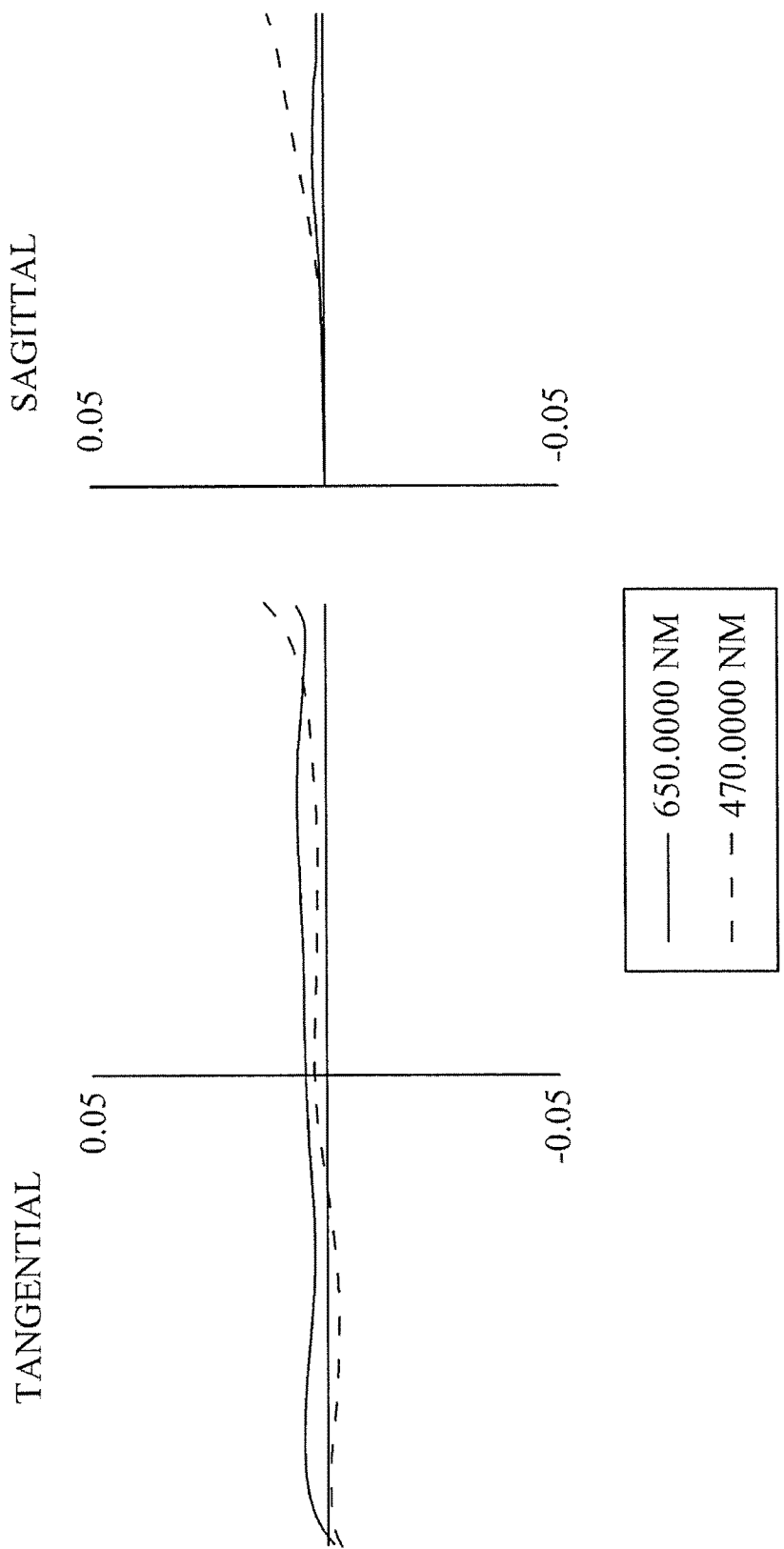
FIG. 4C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the fourth embodiment of the present disclosure.
Figure 4D:
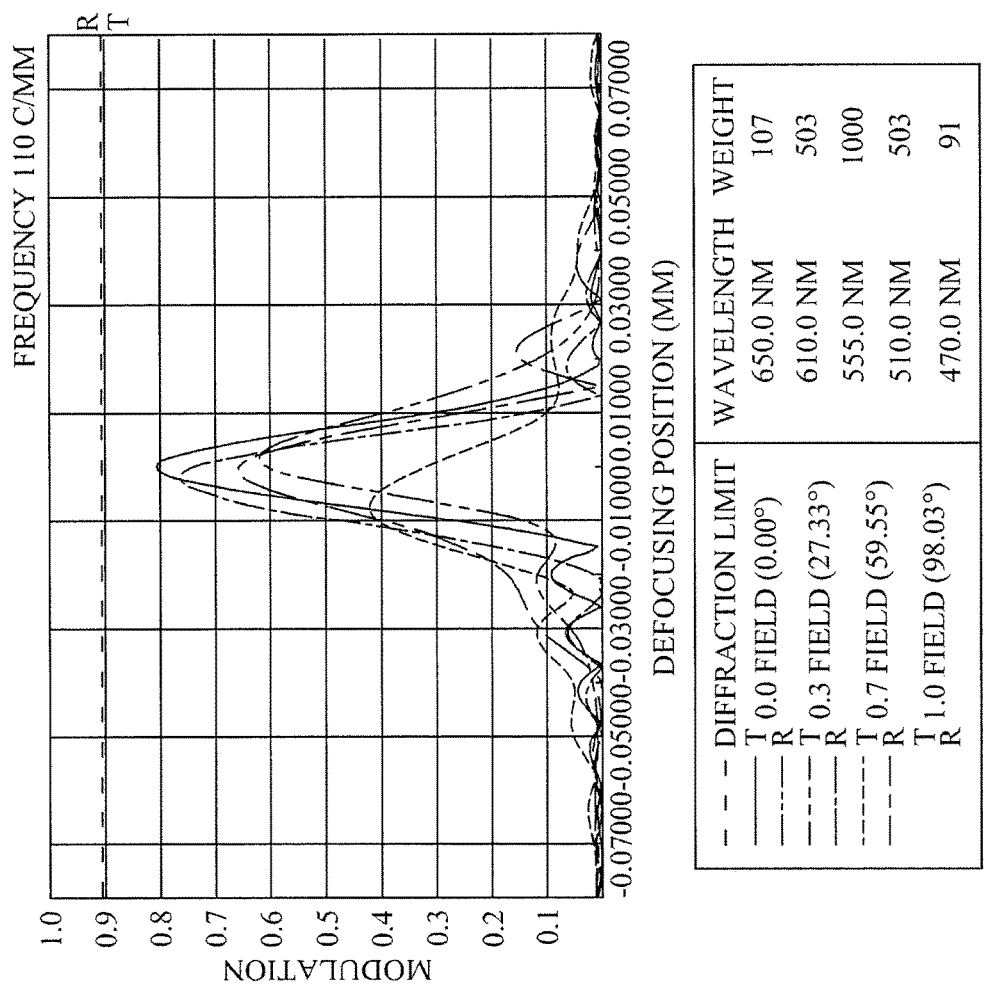
FIG. 4D is a diagram illustrating the through-focus MTF values for the visible light spectrum at the central field of view, 0.3 field of view and 0.7 field of view according to the fourth embodiment of the present disclosure.
Figure 4E:
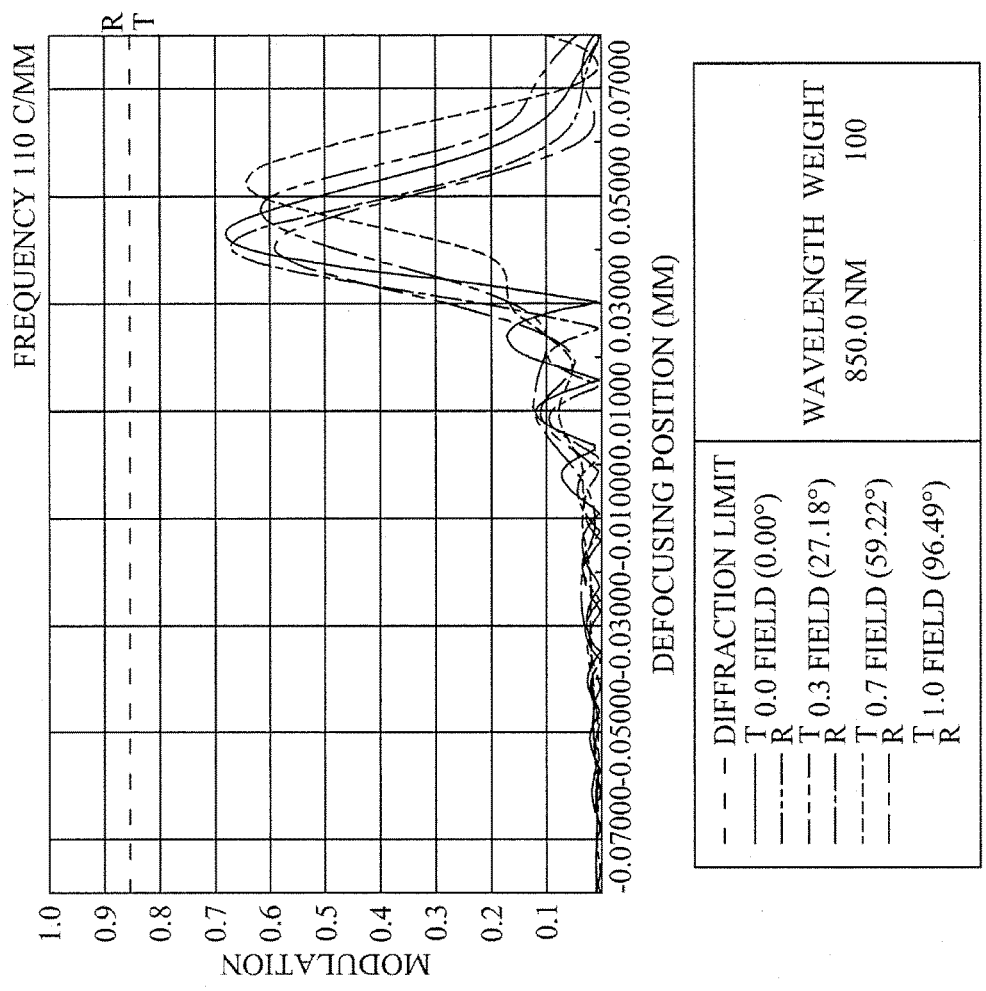
FIG. 4E is a diagram illustrating the through-focus MTF values for the infrared light spectrum at the central field of view, 0.3 field of view and 0.7 field of view according to the fourth embodiment of the present disclosure.

Please refer to FIG. 4A and FIG. 4B, wherein FIG. 4A is a schematic view of the optical image capturing system according to the fourth embodiment of the present invention and FIG. 4B shows the longitudinal spherical aberration curves, astigmatic field curves, and optical distortion curve of the optical image capturing system in the order from left to right according to the fourth embodiment of the present invention. FIG. 4C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the fourth embodiment of the present disclosure. FIG. 4D is a diagram illustrating the through-focus MTF values for the visible light spectrum at the central field of view, 0.3 field of view and 0.7 field of view according to the first embodiment of the present disclosure. FIG. 4E is a diagram illustrating the through-focus MTF values for the infrared light spectrum at the central field of view, 0.3 field of view and 0.7 field of view according to the fourth embodiment of the present disclosure. As shown in FIG. 4A, in the order from an object-side surface to an image-side surface, the optical image capturing system includes a first lens 410, a second lens 420, a third lens 430, an aperture 400, a fourth lens 440, a fifth lens 450, a sixth lens 460, a seventh lens 470, an eighth lens 480, an Infrared filter 490, an image plane 492, and an image sensing device 494.

The first lens 410 has negative refractive power and is made of plastic material. The object-side surface 412 of the first lens 410 is a convex surface and the image-side surface 414 of the first lens 410 is a concave surface. Both the object-side surface 412 and the image-side surface 414 are aspheric. The object-side surface 412 has one inflection point.

The second lens 420 has negative refractive power and is made of plastic material. The object-side surface 422 of the second lens 420 is a concave surface and the image-side surface 424 of the second lens 420 is a concave surface. Both the object-side surface 422 and the image-side surface 424 are aspheric. The object-side surface 422 has one inflection point.

The third lens 430 has positive refractive power and is made of plastic material. The object-side surface 432 of the third lens 430 is a convex surface and the image-side surface 434 of the third lens 430 is a convex surface. Both the object-side surface 432 and the image-side surface 434 are aspheric and have one inflection point.

The fourth lens 440 has positive refractive power and is made of plastic material. The object-side surface 442 of the fourth lens 440 is a convex surface and the image-side surface 444 of the fourth lens 440 is a convex surface. Both the object-side surface 442 and the image-side surface 444 are aspheric.

The fifth lens 450 has positive refractive power and is made of plastic material. The object-side surface 452 of the fifth lens 450 is a convex surface and the image-side surface 454 of the fifth lens 450 is a convex surface. Both the object-side surface 452 and the image-side surface 454 are aspheric.

The sixth lens 460 has negative refractive power and is made of plastic material. The object-side surface 462 of the sixth lens 460 is a concave surface and the image-side surface 464 of the sixth lens 460 is a concave surface. Both the object-side surface 462 and the image-side surface 464 are aspheric. Hereby, the angle of striking on the sixth lens 460 in each field of view may be effectively adjusted so as to improve the aberration.

The seventh lens 470 has positive refractive power and is made of plastic material. The object-side surface 472 thereof is a convex surface and the image-side surface 474 thereof is a convex surface. Both the object-side surface 472 and the image-side surface 474 are aspheric. Hereby, the configuration is beneficial to shorten the back focal distance of the optical image capturing system so as to keep its miniaturization. Besides, the image-side surface 474 has one inflection point. Hence, it can reduce the incident angle of the off-axis rays effectively, and thereby further correcting the off-axis aberration.

The eighth lens 480 has positive refractive power and is made of plastic material. The object-side surface 482 thereof is a convex surface and the image-side surface 484 thereof is a concave surface. Both the object-side surface 482 and the image-side surface 484 are aspheric. Hereby, the configuration is beneficial to shorten the back focal distance of the optical image capturing system so as to keep its miniaturization. Besides, both the object-side surface 482 and the image-side surface 484 have one inflection point. Hence, it can reduce the incident angle of the off-axis rays effectively, and thereby further correcting the off-axis aberration.

The Infrared filter 490 is made of glass material and is disposed between the eighth lens 480 and the image plane 492. The Infrared filter 480 does not affect the focal length of the optical image capturing system.

The contents in Tables 7 and 8 below should be incorporated into the reference of the present embodiment.

TABLE 7

Lens Parameters for the Fourth Embodiment
f(focal length) = 2.9473 mm; f/HEP = 1.2; HAF(half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 123.6520124 | 9.026 | Plastic | 1.544 | 55.96 | −27.0754 |
| 2 | | 12.85947493 | 11.278 | | | | |
| 3 | Lens 2 | −37.58975527 | 3.029 | Plastic | 1.544 | 55.96 | −15.7456 |
| 4 | | 11.45743033 | 4.042 | | | | |
| 5 | Lens 3 | 247.4872552 | 31.485 | Plastic | 1.632 | 22.57 | 59.4981 |
| 6 | | −42.54033317 | 8.607 | | | | |
| 7 | Aperture | 1E+18 | 0.890 | | | | |
| 8 | Lens 4 | 35.30658554 | 3.852 | Plastic | 1.544 | 55.96 | 18.773 |
| 9 | | −13.87865763 | 0.163 | | | | |
| 10 | Lens 5 | 14.72738122 | 6.040 | Plastic | 1.544 | 55.96 | 17.5048 |
| 11 | | −23.25736171 | 0.153 | | | | |
| 12 | Lens 6 | −19.80915149 | 5.952 | Plastic | 1.661 | 20.40 | −7.06951 |
| 13 | | 6.929625558 | 1.812 | | | | |
| 14 | Lens 7 | 10.62188524 | 2.794 | Plastic | 1.544 | 55.96 | 12.0357 |
| 15 | | −15.6161778 | 0.050 | | | | |
| 16 | Lens 8 | 14.46197761 | 2.450 | Plastic | 1.544 | 55.96 | 30.451 |
| 17 | | 104.7433214 | 1.000 | | | | |
| 18 | Infrared filter | 1E+18 | 0.300 | BK_7 | 1.517 | 64.2 | |
| 19 | | 1E+18 | 0.707 | | | | |
| 20 | Image Plane | 1E+18 | −0.002 | | | | |

Reference Wavelength (d-line) = 555 nm

TABLE 8

The Aspheric Coefficients of the Fourth Embodiment
Table 8: Aspheric Coefficients

| | Surface No | | | | | | |
|---|---|---|---|---|---|---|---|
| | 1 | 2 | 3 | 4 | 5 | 6 | 8 |
| k | −1.593063E−02 | −4.744277E−02 | −1.805585E−01 | −2.894556E−02 | 5.000000E+01 | 2.242388E+00 | 4.276565E−02 |
| A4 | 3.935129E−07 | −4.442156E−05 | 1.993685E−05 | −8.723825E−05 | −7.856272E−06 | 8.867021E−05 | 1.056803E−04 |
| A6 | 1.434603E−11 | −2.587461E−07 | −1.811665E−08 | −6.306283E−07 | 2.046222E−07 | 8.520515E−08 | −2.724374E−07 |
| A8 | −1.081835E−13 | 2.026097E−09 | −6.771981E−10 | −3.927516E−09 | −2.568776E−09 | −3.079563E−09 | −2.682100E−09 |
| A10 | −1.026609E−16 | −7.462679E−12 | 3.234072E−12 | 7.341719E−12 | 1.995625E−12 | 9.624623E−12 | 5.182198E−11 |
| A12 | 0.000000E+00 | 0.000000E+00 | 0.000000E+00 | 0.000000E+00 | 0.000000E+00 | 0.000000E+00 | 0.000000E+00 |

| | Surface No | | | | | | |
|---|---|---|---|---|---|---|---|
| | 9 | 10 | 11 | 12 | 13 | 14 | 15 |
| k | −4.925714E−02 | −1.418408E−01 | −2.009670E−01 | −3.466895E+00 | −8.928102E−01 | −1.662759E+00 | −1.399119E+01 |
| A4 | 1.628151E−04 | −1.849211E−05 | −4.221994E−05 | −2.327015E−05 | −2.639329E−04 | −7.318238E−05 | 3.522805E−04 |
| A6 | −1.372988E−07 | −1.674442E−07 | −8.504455E−07 | −7.009103E−07 | 1.279884E−05 | 1.508903E−06 | 6.107416E−07 |
| A8 | −2.485102E−09 | 2.382914E−09 | −6.444595E−09 | −2.246409E−08 | 2.378874E−08 | 1.325312E−07 | 6.392650E−08 |
| A10 | 6.263814E−11 | 1.092929E−11 | 3.863881E−10 | 5.032919E−10 | 1.388638E−09 | 4.990633E−09 | 7.967132E−09 |
| A12 | 0.000000E+00 | 0.000000E+00 | 0.000000E+00 | 0.000000E+00 | 0.000000E+00 | 0.000000E+00 | 0.000000E+00 |

| | Surface No | |
|---|---|---|
| | 16 | 17 |
| k | −1.056790E+01 | 3.963020E+01 |
| A4 | −1.001933E−04 | −4.384214E−04 |
| A6 | 3.448691E−06 | −9.822635E−06 |
| A8 | 2.056321E−08 | −1.175943E−07 |
| A10 | −7.472591E−09 | 3.435989E−09 |
| A12 | 0.000000E+00 | 0.000000E+00 |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.1089 | 0.1872 | 0.0496 | 0.1570 | 0.1684 | 0.4169 |
| \|f/f7\| | \|f/f8\| | \|f1/f2\| | \|f2/f3\| | \|f6/f7\| | \|f7/f8\| |
| 0.2449 | 0.0968 | 1.7196 | 0.2649 | 0.5874 | 0.3952 |
| IN12/f | IN78/f | (TP1 + IN12)/TP2 | | (TP8 + IN78)/TP7 | |
| 3.8265 | 0.0171 | 6.7027 | | 0.8949 | |
| HOS | InTL | HOS/HOI | InS/HOS | ODT % | TDT % |
| 93.6282 | 91.6239 | 18.8008 | 0.2794 | −123.8170 | 105.5690 |
| HVT11 | HVT12 | HVT21 | HVT22 | HVT31 | HVT32 |
| 0.0000 | 0.0000 | 0.0000 | 0.0000 | 8.8900 | 0.0000 |
| HVT41 | HVT42 | HVT51 | HVT52 | HVT61 | HVT62 |
| 0.0000 | 0.0000 | 0.0000 | 0.0000 | 0.0000 | 0.0000 |
| HVT71 | HVT72 | HVT81 | HVT82 | HVT82/HOI | HVT82/HOS |
| 0.0000 | 4.4307 | 5.4167 | 2.1685 | 0.4354 | 0.0232 |
| PSTA | PLTA | NSTA | NLTA | SSTA | SLTA |
| 0.013 mm | 0.006 mm | −0.003 mm | −0.001 mm | 0.012 mm | 0.001 mm |
| VSFS0 | VSFS3 | VSFS7 | VTFS0 | VTFS3 | VTFS7 |
| 0.000 | 0.000 | 0.000 | 0.000 | 0.000 | −0.010 |
| VSMTF0 | VSMTF3 | VSMTF7 | VTMTF0 | VTMTF3 | VTMTF7 |
| 0.805 | 0.740 | 0.656 | 0.805 | 0.603 | 0.405 |
| ISFS0 | ISFS3 | ISFS7 | ITFS0 | ITFS3 | ITFS7 |
| 0.040 | 0.040 | 0.040 | 0.040 | 0.050 | 0.050 |
| ISMTF0 | ISMTF3 | ISMTF7 | ITMTF0 | ITMTF3 | ITMTF7 |
| 0.631 | 0.669 | 0.590 | 0.631 | 0.595 | 0.616 |
| FS | AIFS | AVFS | AFS | | |
| 0.040 | 0.043 | −0.002 | 0.045 | | |

The values pertaining to the outline curve lengths are obtainable according to the data in Table 7 and Table 8:

| Fourth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.228 | 1.228 | −0.00002 | 100.00% | 9.026 | 13.61% |
| 12 | 1.228 | 1.230 | 0.00182 | 100.15% | 9.026 | 13.63% |
| 21 | 1.228 | 1.228 | 0.00017 | 100.01% | 3.029 | 40.55% |
| 22 | 1.228 | 1.230 | 0.00230 | 100.19% | 3.029 | 40.62% |
| 31 | 1.228 | 1.228 | −0.00004 | 100.00% | 31.485 | 3.90% |
| 32 | 1.228 | 1.228 | 0.00012 | 100.01% | 31.485 | 3.90% |
| 41 | 1.228 | 1.228 | 0.00021 | 100.02% | 3.852 | 31.88% |

-continued

Fourth Embodiment (Primary Reference Wavelength = 555 nm)

| | | | | | | |
|---|---|---|---|---|---|---|
| 42 | 1.228 | 1.230 | 0.00154 | 100.13% | 3.852 | 31.92% |
| 51 | 1.228 | 1.229 | 0.00138 | 100.11% | 6.040 | 20.35% |
| 52 | 1.228 | 1.229 | 0.00053 | 100.04% | 6.040 | 20.34% |
| 61 | 1.228 | 1.229 | 0.00074 | 100.06% | 5.952 | 20.64% |
| 62 | 1.228 | 1.234 | 0.00629 | 100.51% | 5.952 | 20.74% |
| 71 | 1.228 | 1.231 | 0.00266 | 100.22% | 2.794 | 44.05% |
| 72 | 1.228 | 1.229 | 0.00111 | 100.09% | 2.794 | 44.00% |
| 81 | 1.228 | 1.229 | 0.00136 | 100.11% | 2.450 | 50.18% |
| 82 | 1.228 | 1.228 | −0.00002 | 100.00% | 2.450 | 50.13% |

| ARS | EHD | ARS value | ARS − EHD | (ARS/EHD)% | TP | ARS/TP (%) |
|---|---|---|---|---|---|---|
| 11 | 29.883 | 30.217 | 0.334 | 101.12% | 9.026 | 334.78% |
| 12 | 12.786 | 16.309 | 3.524 | 127.56% | 9.026 | 180.69% |
| 21 | 11.929 | 12.077 | 0.148 | 101.24% | 3.029 | 398.67% |
| 22 | 9.477 | 10.290 | 0.813 | 108.58% | 3.029 | 339.69% |
| 31 | 9.414 | 9.415 | 0.001 | 100.01% | 31.485 | 29.90% |
| 32 | 7.552 | 7.564 | 0.012 | 100.16% | 31.485 | 24.02% |
| 41 | 7.025 | 7.114 | 0.089 | 101.27% | 3.852 | 184.67% |
| 42 | 7.151 | 7.361 | 0.209 | 102.93% | 3.852 | 191.07% |
| 51 | 6.973 | 7.241 | 0.267 | 103.83% | 6.040 | 119.87% |
| 52 | 6.274 | 6.373 | 0.099 | 101.58% | 6.040 | 105.51% |
| 61 | 6.206 | 6.314 | 0.108 | 101.74% | 5.952 | 106.08% |
| 62 | 4.816 | 5.213 | 0.397 | 108.25% | 5.952 | 87.59% |
| 71 | 5.308 | 5.570 | 0.262 | 104.94% | 2.794 | 199.39% |
| 72 | 5.212 | 5.236 | 0.023 | 100.45% | 2.794 | 187.41% |
| 81 | 5.231 | 5.279 | 0.048 | 100.91% | 2.450 | 215.49% |
| 82 | 5.218 | 5.267 | 0.049 | 100.94% | 2.450 | 214.99% |

The following values for the conditional expressions can be obtained from the data in Table 7 and Table 8.

Values Related to Inflection Point of fourth Embodiment (Primary Reference Wavelength = 555 nm)

| | | | | | | | |
|---|---|---|---|---|---|---|---|
| HIF111 | 31.2120 | HIF111/HOI | 6.2675 | SGI111 | 4.2022 | \|SGI111\|/(\|SGI111\| + TP1) | 0.3177 |
| HIF211 | 11.8158 | HIF211/HOI | 2.3727 | SGI211 | −1.6427 | \|SGI211\|/(\|SGI211\| + TP2) | 0.3516 |
| HIF311 | 6.7284 | HIF311/HOI | 1.3511 | SGI311 | 0.0848 | \|SGI311\|/(\|SGI311\| + TP3) | 0.0027 |
| HIF321 | 4.9222 | HIF321/HOI | 0.9884 | SGI321 | −0.2356 | \|SGI321\|/(\|SGI321\| + TP3) | 0.0074 |
| HIF721 | 2.7843 | HIF721/HOI | 0.5591 | SGI721 | −0.2049 | \|SGI721\|/(\|SGI721\| + TP7) | 0.0683 |
| HIF811 | 3.9753 | HIF711/HOI | 0.7983 | SGI811 | 0.4550 | \|SGI811\|/(\|SGI811\| + TP8) | 0.1566 |
| HIF821 | 1.2922 | HIF821/HOI | 0.2595 | SGI821 | 0.0067 | \|SGI821\|/(\|SGI821\| + TP8) | 0.0027 |

Fifth Embodiment

Figure 5A:
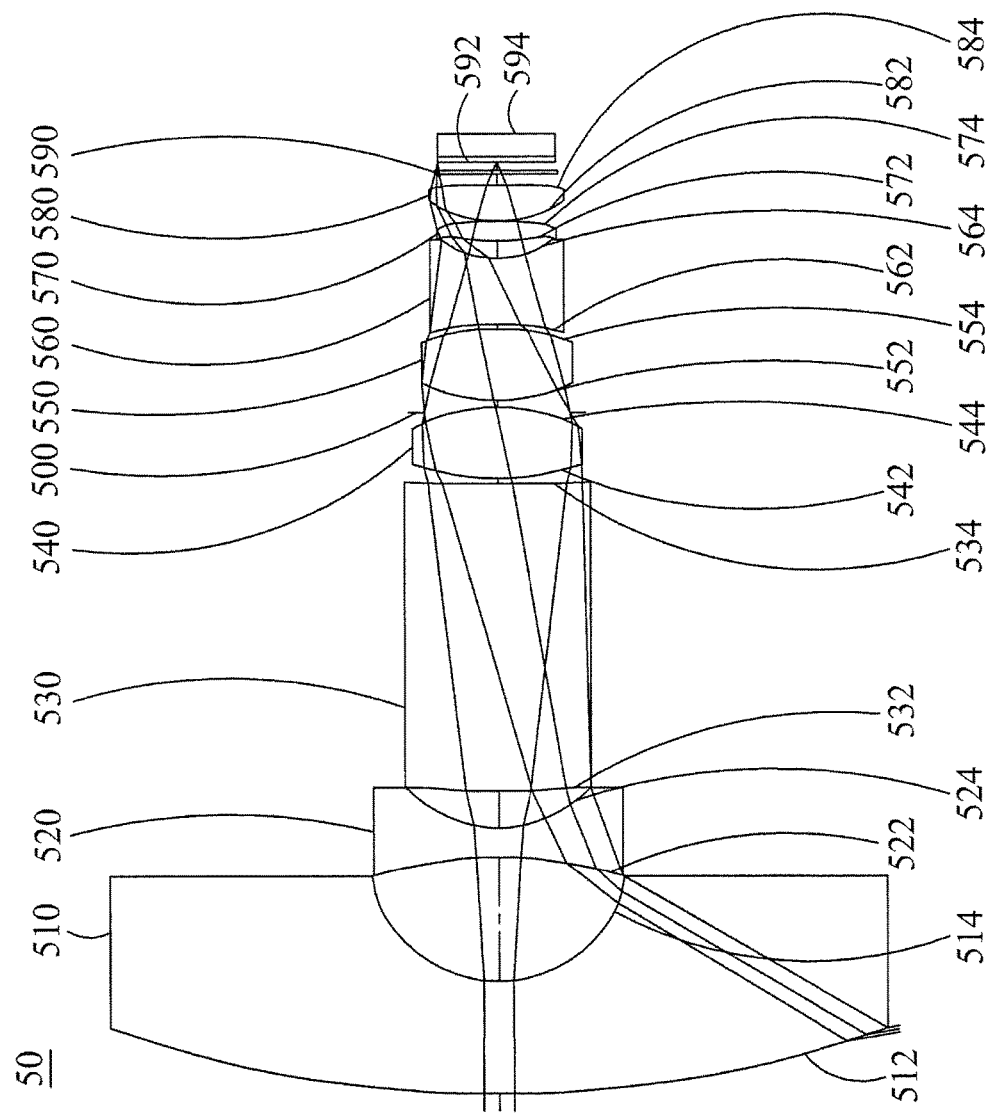
FIG. 5A is a schematic view of the optical image capturing system according to the fifth embodiment of the present invention.
Figure 5B:
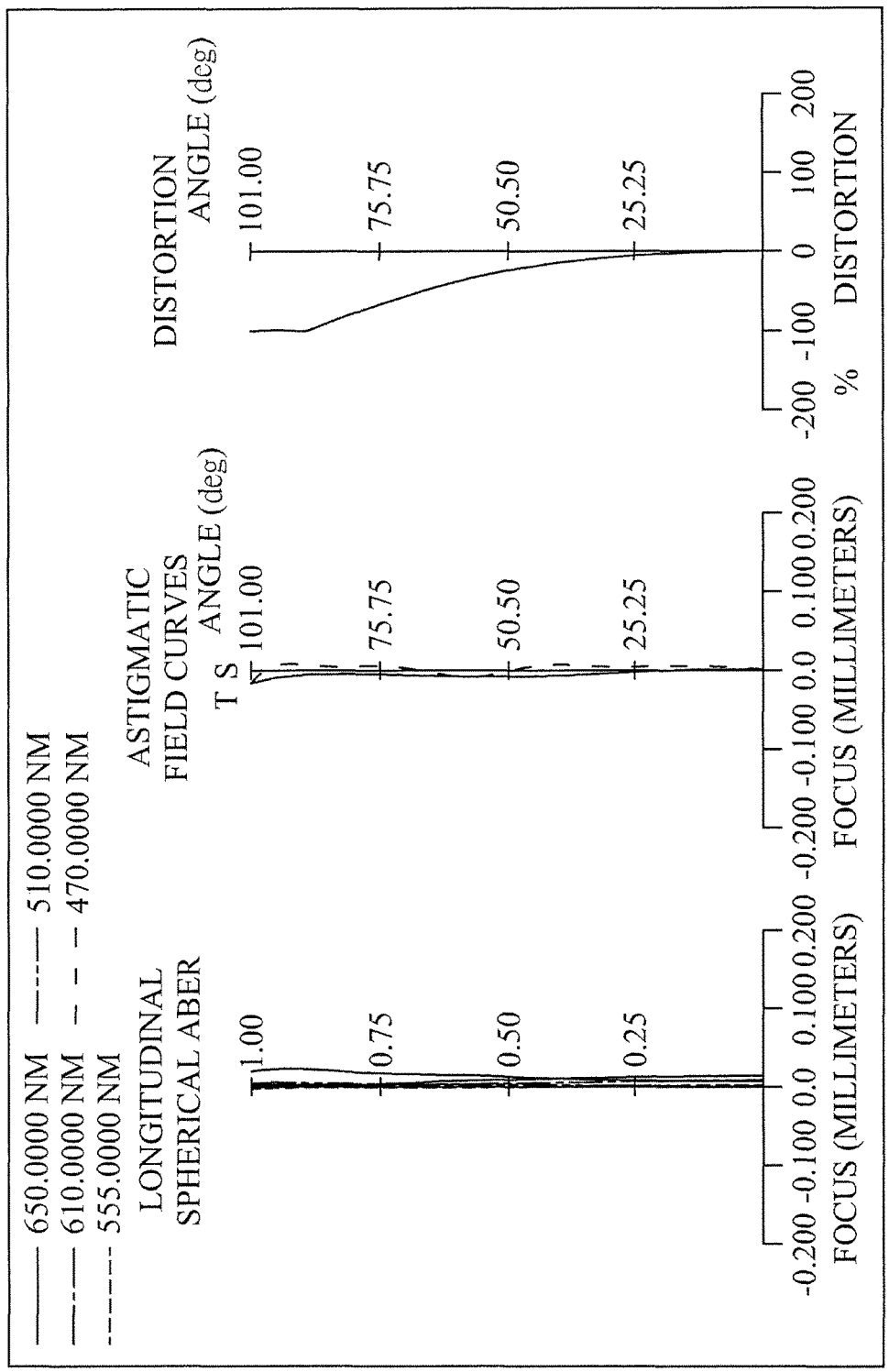
FIG. 5B shows the longitudinal spherical aberration curves, astigmatic field curves, and optical distortion curve of the optical image capturing system in the order from left to right according to the fifth embodiment of the present invention.
Figure 5C:
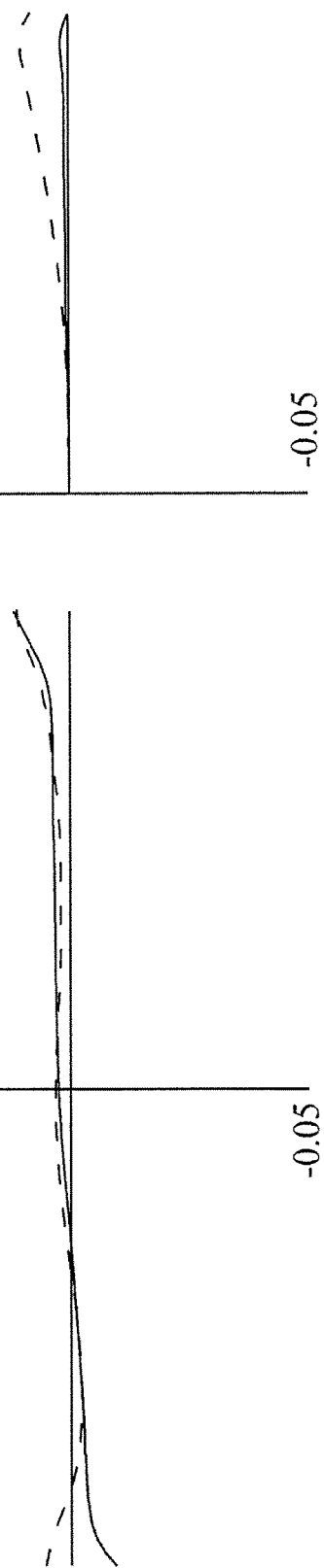
FIG. 5C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the fifth embodiment of the present disclosure.
Figure 5C:
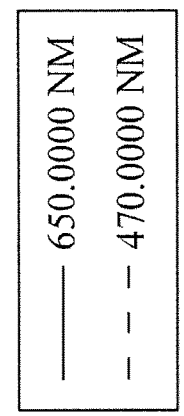
Figure 5D:
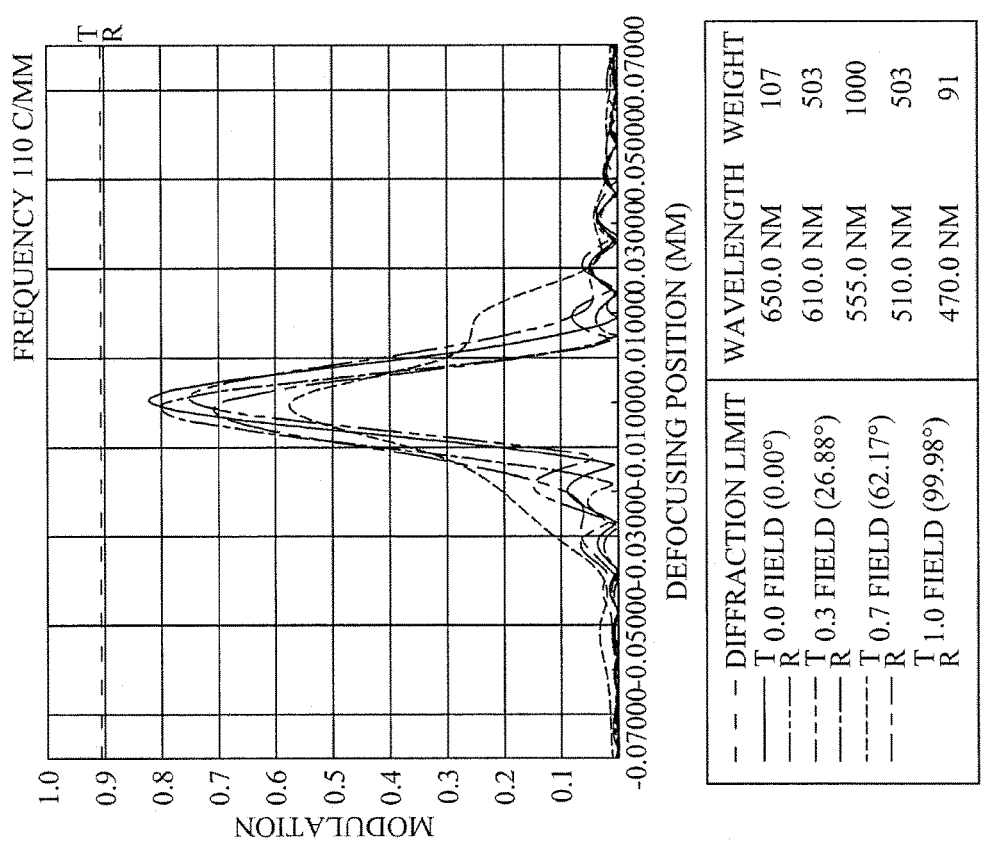
FIG. 5D is a diagram illustrating the through-focus MTF values for the visible light spectrum at the central field of view, 0.3 field of view and 0.7 field of view according to the fifth embodiment of the present disclosure.
Figure 5E:
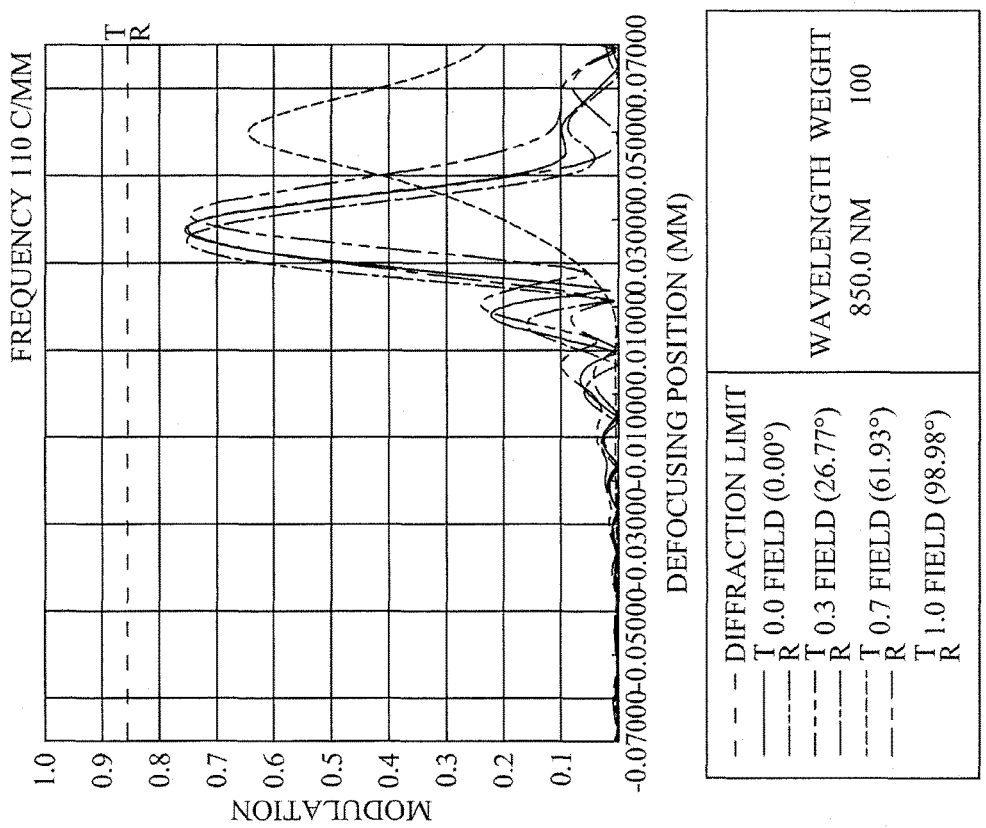
FIG. 5E is a diagram illustrating the through-focus MTF values for the infrared light spectrum at the central field of view, 0.3 field of view and 0.7 field of view according to the fifth embodiment of the present disclosure.

Please refer to FIG. 5A and FIG. 5B, wherein FIG. 5A is a schematic view of the optical image capturing system according to the fifth embodiment of the present invention and FIG. 5B shows the longitudinal spherical aberration curves, astigmatic field curves, and optical distortion curve of the optical image capturing system in the order from left to right according to the fifth embodiment of the present invention. FIG. 5C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the fifth embodiment of the present disclosure. FIG. 5D is a diagram illustrating the through-focus MTF values for the visible light spectrum at the central field of view, 0.3 field of view and 0.7 field of view according to the first embodiment of the present disclosure. FIG. 5E is a diagram illustrating the through-focus MTF values for the infrared light spectrum at the central field of view, 0.3 field of view and 0.7 field of view according to the fifth embodiment of the present disclosure. As shown in FIG. 5A, in the order from an object-side surface to an image-side surface, the optical image capturing system includes a first lens 510, a second lens 520, a third lens 530, a fourth lens 540, an aperture 500, a fifth lens 550, a sixth lens 560, a seventh lens 570, an eighth lens 580, an Infrared filter 590, an image plane 592, and an image sensing device 594.

The first lens 510 has negative refractive power and is made of plastic material. The object-side surface 512 of the first lens 510 is a convex surface and the image-side surface 514 of the first lens 510 is a concave surface. Both the object-side surface 512 and the image-side surface 514 are aspheric.

The second lens 520 has negative refractive power and is made of plastic material. The object-side surface 522 of the second lens 520 is a concave surface and the image-side surface 524 of the second lens 520 is a concave surface. Both the object-side surface 522 and the image-side surface 524 are aspheric. The object-side surface 522 has one inflection point.

The third lens 530 has positive refractive power and is made of plastic material. The object-side surface 532 of the third lens 530 is a convex surface and the image-side surface 534 of the third lens 530 is a convex surface. Both object-side surface 532 and image-side surface 534 are aspheric. The object-side surface 532 has one inflection point, and the image-side surface 534 has two inflection points.

The fourth lens 540 has positive refractive power and is made of plastic material. The object-side surface 542 of the fourth lens 540 is a convex surface and the image-side surface 544 of the fourth lens 540 is a convex surface. Both object-side surface 542 and image-side surface 544 are aspheric. The object-side surface 542 has one inflection point.

The fifth lens 550 has positive refractive power and is made of plastic material. The object-side surface 552 of the fifth lens 550 is a convex surface and the image-side surface 554 of the fifth lens 550 is a convex surface. Both object-side surface 552 and image-side surface 554 are aspheric.

The sixth lens 560 has negative refractive power and is made of plastic material. The object-side surface 562 of the sixth lens 560 is a concave surface and the image-side surface 564 of the sixth lens 560 is a concave surface. Both object-side surface 562 and image-side surface 564 are aspheric. Hereby, the angle of striking on the sixth lens 560 in each field of view may be effectively adjusted so as to improve the aberration.

The seventh lens 570 has positive refractive power and is made of plastic material. The object-side surface 572 thereof is a convex surface and the image-side surface 574 thereof is a convex surface. Both object-side surface 572 and image-side surface 574 are aspheric. Hereby, the configuration is beneficial to shorten the back focal distance of the optical image capturing system so as to keep its miniaturization. Besides, the object-side surface 572 has one inflection point. Hence, it can reduce the incident angle of the off-axis rays effectively, and thereby further correcting the off-axis aberration.

The eighth lens 580 has positive refractive power and is made of plastic material. The object-side surface 582 thereof is a convex surface and the image-side surface 584 thereof is a convex surface. Both object-side surface 582 and image-side surface 584 are aspheric. Hereby, the configuration is beneficial to shorten the back focal distance of the optical image capturing system so as to keep its miniaturization. Besides, the image-side surface 584 has one inflection point. Hence, it can reduce the incident angle of the off-axis rays effectively, and thereby further correcting the off-axis aberration.

The Infrared filter 590 is made of glass material and is disposed between the eighth lens 580 and the image plane 592. The Infrared filter 590 does not affect the focal length of the optical image capturing system.

The contents in Tables 9 and 10 below should be incorporated into the reference of the present embodiment.

TABLE 9

Lens Parameters for the Fifth Embodiment
f(focal length) = 3.1301 mm; f/HEP = 1.2; HAF(half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | 102.5422296 | 9.939 | Plastic | 1.544 | 55.96 | −22.401 |
| 2 | | 10.54979614 | 10.921 | | | | |
| 3 | Lens 2 | −31.7943937 | 2.581 | Plastic | 1.544 | 55.96 | −12.497 |
| 4 | | 8.931836854 | 3.305 | | | | |
| 5 | Lens 3 | 61.89409204 | 27.132 | Plastic | 1.661 | 20.40 | 86.727 |
| 6 | | −726.1463397 | 0.466 | | | | |
| 7 | Lens 4 | 19.46251795 | 6.209 | Plastic | 1.544 | 55.96 | 16.552 |
| 8 | | −14.95989693 | −0.396 | | | | |
| 9 | Aperture | 1E+18 | 1.033 | | | | |
| 10 | Lens 5 | 14.011673 | 6.223 | Plastic | 1.544 | 55.96 | 16.318 |
| 11 | | −20.60692189 | 0.405 | | | | |
| 12 | Lens 6 | −27.01164132 | 5.853 | Plastic | 1.661 | 20.40 | −8.105 |
| 13 | | 7.34152972 | 1.485 | | | | |
| 14 | Lens 7 | 14.09374473 | 1.751 | Plastic | 1.544 | 55.96 | 17.344 |
| 15 | | −27.56349476 | 0.050 | | | | |
| 16 | Lens 8 | 11.42174753 | 3.124 | Plastic | 1.544 | 55.96 | 20.426 |
| 17 | | −420.3524588 | 1.000 | | | | |
| 18 | Infrared filter | 1E+18 | 0.300 | BK_7 | 1.517 | 64.2 | |
| 19 | | 1E+18 | 0.701 | | | | |
| 20 | Image Plane | 1E+18 | −0.002 | | | | |

Reference Wavelength (d-line) = 555 nm

TABLE 10

The Aspheric Coefficients of the Fifth Embodiment
Table 10: Aspheric Coefficients

| | Surface No | | | | | |
|---|---|---|---|---|---|---|
| | 1 | 2 | 3 | 4 | 5 | 6 |
| k | 1.986691E+01 | −5.281953E−01 | −9.160089E−01 | 8.594970E+00 | 1.117947E−01 | 9.005434E−01 |
| A4 | 3.445215E−06 | −6.442926E−05 | −7.025456E−06 | −6.274507E−05 | −1.248868E−04 | −1.250503E−04 |
| A6 | −3.817675E−08 | −1.511598E−07 | 2.888502E−07 | 8.416746E−07 | 3.183830E−07 | 1.353870E−06 |
| A8 | 1.182963E−10 | −1.345124E−09 | −1.031081E−09 | −5.715452E−09 | 8.261522E−09 | −7.315375E−09 |
| A10 | −9.534673E−14 | −2.321608E−12 | 1.315692E−11 | 7.906733E−11 | −7.382921E−11 | 1.195825E−10 |
| A12 | 0.000000E+00 | 0.000000E+00 | 0.000000E+00 | 0.000000E+00 | 0.000000E+00 | 0.000000E+00 |

TABLE 10-continued

The Aspheric Coefficients of the Fifth Embodiment
Table 10: Aspheric Coefficients

| | Surface No | | | | | |
|---|---|---|---|---|---|---|
| | 7 | 8 | 10 | 11 | 12 | 13 |
| k | 2.180481E−01 | −2.585463E−02 | 5.313497E−02 | 1.785668E−01 | 5.483010E+00 | −8.973066E−01 |
| A4 | 7.693388E−05 | 6.333247E−06 | −3.894066E−05 | 5.429618E−06 | −6.099567E−05 | −1.263767E−04 |
| A6 | −1.710585E−06 | 4.642970E−07 | −5.099203E−07 | −2.995037E−06 | 3.061687E−06 | 1.746857E−05 |
| A8 | 2.088310E−08 | −8.573421E−09 | 1.248652E−09 | 2.371900E−08 | −8.822710E−08 | −4.397966E−07 |
| A10 | 4.244397E−11 | 5.926653E−11 | −2.996675E−11 | 3.648544E−11 | 8.402385E−10 | 1.062570E−08 |
| A12 | 0.000000E+00 | 0.000000E+00 | 0.000000E+00 | 0.000000E+00 | 0.000000E+00 | 0.000000E+00 |

| | Surface No | | | |
|---|---|---|---|---|
| | 14 | 15 | 16 | 17 |
| k | −3.319107E+00 | 2.273022E+01 | 1.056617E+00 | −5.000000E+01 |
| A4 | −1.625996E−04 | 5.301629E−04 | −4.942415E−05 | −9.690020E−05 |
| A6 | −1.451596E−05 | −1.099419E−05 | 6.867005E−06 | −1.076528E−05 |
| A8 | −3.580061E−07 | −4.736643E−07 | 3.578378E−08 | −3.055981E−08 |
| A10 | −2.087920E−08 | −6.035179E−10 | −4.120133E−09 | 5.796409E−09 |
| A12 | 0.000000E+00 | 0.000000E+00 | 0.000000E+00 | 0.000000E+00 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| |f/f1| | |f/f2| | |f/f3| | |f/f4| | |f/f5| | |f/f6| |
| 0.1397 | 0.2505 | 0.0361 | 0.1891 | 0.1918 | 0.3862 |
| |f/f7| | |f/f8| | |f1/f2| | |f2/f3| | |f6/f7| | |f7/f8| |
| 0.1805 | 0.1532 | 1.7926 | 0.1441 | 0.4673 | 0.8491 |
| IN12/f | IN78/f | (TP1 + IN12)/TP2 | | (TP8 + IN78)/TP7 | |
| 3.4889 | 0.0160 | 8.0808 | | 1.8131 | |
| HOS | InTL | HOS/HOI | InS/HOS | ODT % | TDT % |
| 82.0800 | 80.0813 | 16.4160 | 0.2671 | −128.1570 | 100.8520 |
| HVT11 | HVT12 | HVT21 | HVT22 | HVT31 | HVT32 |
| 0.0000 | 0.0000 | 0.0000 | 0.0000 | 0.0000 | 2.1952 |
| HVT41 | HVT42 | HVT51 | HVT52 | HVT61 | HVT62 |
| 0.0000 | 0.0000 | 0.0000 | 0.0000 | 0.0000 | 0.0000 |
| HVT71 | HVT72 | HVT81 | HVT82 | HVT82/HOI | HVT82/HOS |
| 4.0888 | 0.0000 | 0.0000 | 0.0000 | 0.0000 | 0.0000 |
| PSTA | PLTA | NSTA | NLTA | SSTA | SLTA |
| 0.011 mm | 0.012 mm | 0.006 mm | −0.009 mm | 0.008 mm | 0.00026 mm |
| VSFS0 | VSFS3 | VSFS7 | VTFS0 | VTFS3 | VTFS7 |
| 0.000 | 0.000 | 0.000 | 0.000 | 0.000 | 0.000 |
| VSMTF0 | VSMTF3 | VSMTF7 | VTMTF0 | VTMTF3 | VTMTF7 |
| 0.819 | 0.791 | 0.695 | 0.819 | 0.743 | 0.573 |

-continued

| Fifth Embodiment (Primary Reference Wavelength = 555 nm) | | | | | |
|---|---|---|---|---|---|
| ISFS0 | ISFS3 | ISFS7 | ITFS0 | ITFS3 | ITFS7 |
| 0.040 | 0.040 | 0.040 | 0.040 | 0.040 | 0.060 |
| ISMTF0 | ISMTF3 | ISMTF7 | ITMTF0 | ITMTF3 | ITMTF7 |
| 0.721 | 0.637 | 0.723 | 0.721 | 0.742 | 0.644 |
| FS | AIFS | AVFS | AFS | | |
| 0.040 | 0.043 | 0.000 | 0.043 | | |

The values pertaining to the outline curve lengths are obtainable according to the data in Table 9 and Table 10:

| Fifth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.304 | 1.304 | −0.00024 | 99.98% | 9.939 | 13.12% |
| 12 | 1.304 | 1.307 | 0.00306 | 100.23% | 9.939 | 13.15% |
| 21 | 1.304 | 1.304 | 0.00009 | 100.01% | 2.581 | 50.53% |
| 22 | 1.304 | 1.309 | 0.00437 | 100.33% | 2.581 | 50.69% |
| 31 | 1.304 | 1.304 | −0.00018 | 99.99% | 27.132 | 4.81% |
| 32 | 1.304 | 1.304 | −0.00027 | 99.98% | 27.132 | 4.81% |
| 41 | 1.304 | 1.305 | 0.00070 | 100.05% | 6.209 | 21.02% |
| 42 | 1.304 | 1.306 | 0.00138 | 100.11% | 6.209 | 21.03% |
| 51 | 1.304 | 1.306 | 0.00161 | 100.12% | 6.223 | 20.99% |
| 52 | 1.304 | 1.305 | 0.00060 | 100.05% | 6.223 | 20.97% |
| 61 | 1.304 | 1.305 | 0.00024 | 100.02% | 5.853 | 22.29% |
| 62 | 1.304 | 1.311 | 0.00653 | 100.50% | 5.853 | 22.39% |
| 71 | 1.304 | 1.306 | 0.00152 | 100.12% | 1.751 | 74.59% |
| 72 | 1.304 | 1.304 | 0.00018 | 100.01% | 1.751 | 74.52% |
| 81 | 1.304 | 1.307 | 0.00259 | 100.20% | 3.124 | 41.83% |
| 82 | 1.304 | 1.304 | −0.00027 | 99.98% | 3.124 | 41.74% |
| ARS | EHD | ARS value | ARS − EHD | (ARS/EHD)% | TP | ARS/TP (%) |
| 11 | 33.069 | 33.761 | 0.692 | 102.09% | 9.939 | 339.68% |
| 12 | 10.697 | 15.452 | 4.755 | 144.45% | 9.939 | 155.47% |
| 21 | 10.612 | 10.764 | 0.152 | 101.44% | 2.581 | 416.99% |
| 22 | 7.937 | 8.931 | 0.995 | 112.53% | 2.581 | 345.97% |
| 31 | 7.934 | 7.945 | 0.011 | 100.14% | 27.132 | 29.28% |
| 32 | 7.277 | 7.278 | 0.001 | 100.01% | 27.132 | 26.82% |
| 41 | 7.233 | 7.355 | 0.122 | 101.69% | 6.209 | 118.45% |
| 42 | 6.896 | 7.153 | 0.257 | 103.73% | 6.209 | 115.20% |
| 51 | 6.403 | 6.614 | 0.212 | 103.31% | 6.223 | 106.29% |
| 52 | 6.007 | 6.121 | 0.114 | 101.89% | 6.223 | 98.36% |
| 61 | 5.694 | 5.749 | 0.055 | 100.97% | 5.853 | 98.22% |
| 62 | 4.702 | 5.053 | 0.352 | 107.48% | 5.853 | 86.33% |
| 71 | 4.767 | 4.805 | 0.038 | 100.80% | 1.751 | 274.49% |
| 72 | 5.074 | 5.174 | 0.100 | 101.97% | 1.751 | 295.55% |
| 81 | 5.703 | 6.072 | 0.368 | 106.46% | 3.124 | 194.36% |
| 82 | 5.590 | 5.610 | 0.019 | 100.35% | 3.124 | 179.57% |

The following values for the conditional expressions can be obtained from the data in Table 9 and Table 10.

| Values Related to Inflection Point of Fifth Embodiment (Primary Reference Wavelength = 555 nm) | | | | | | | |
|---|---|---|---|---|---|---|---|
| HIF211 | 9.5406 | HIF211/HOI | 1.9081 | SGI211 | −1.3363 | |SGI211|/(|SGI211| + TP2) | 0.3411 |
| HIF311 | 5.7977 | HIF311/HOI | 1.1595 | SGI311 | 0.2554 | |SGI311|/(|SGI311| + TP3) | 0.0093 |
| HIF321 | 1.2540 | HIF321/HOI | 0.2508 | SGI321 | −0.0009 | |SGI321|/(|SGI321| + TP3) | 0.0000 |
| HIF322 | 6.3333 | HIF322/HOI | 1.2667 | SGI322 | 0.0555 | |SGI322|/(|SGI322| + TP3) | 0.0020 |
| HIF411 | 6.1490 | HIF411/HOI | 1.2298 | SGI411 | 0.9251 | |SGI411|/(|SGI411| + TP4) | 0.1297 |
| HIF711 | 2.8347 | HIF711/HOI | 0.5669 | SGI711 | 0.2585 | |SGI711|/(|SGI711| + TP7) | 0.1287 |
| HIF821 | 5.3122 | HIF821/HOI | 1.0624 | SGI821 | −0.2682 | |SGI821|/(|SGI821| + TP8) | 0.0791 |

Sixth Embodiment

Figure 6A:
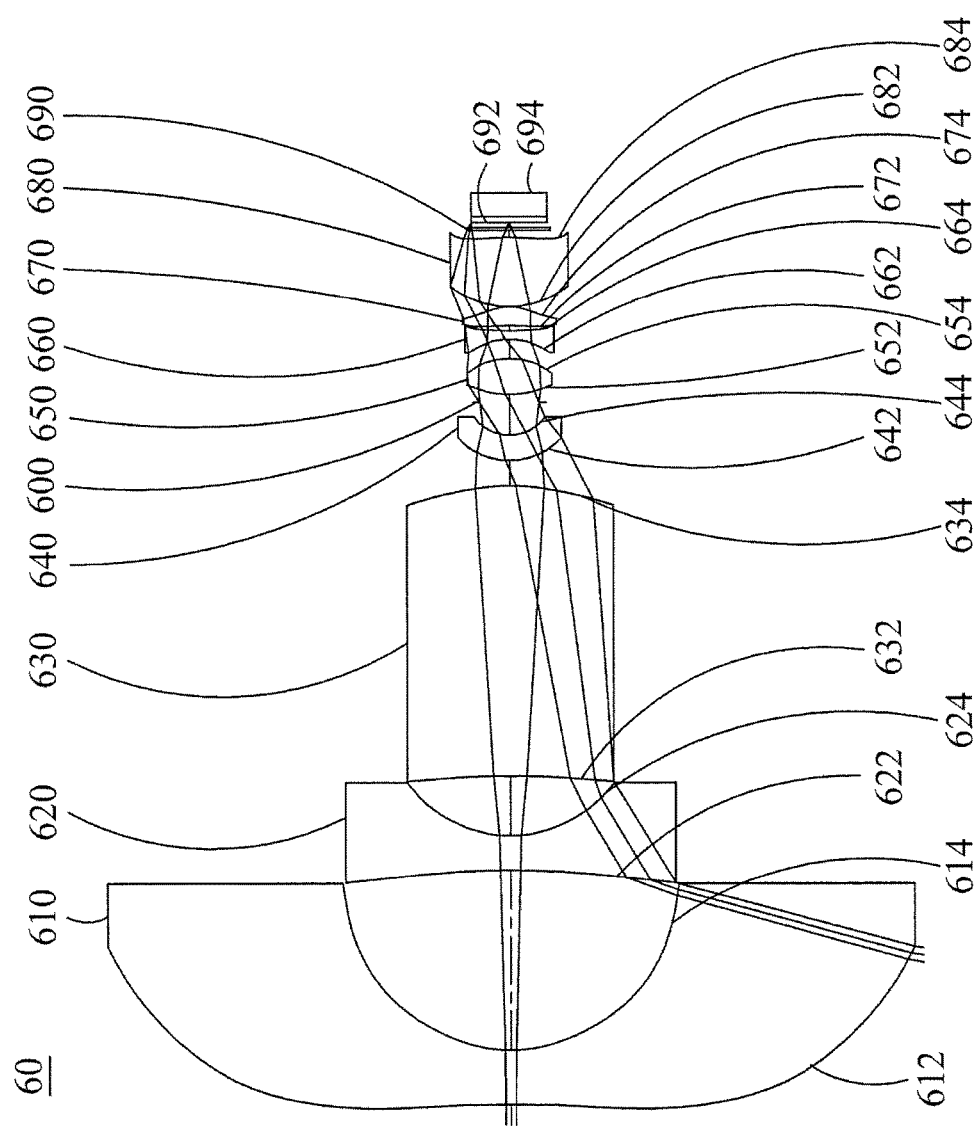
FIG. 6A is a schematic view of the optical image capturing system according to the sixth embodiment of the present invention.
Figure 6B:
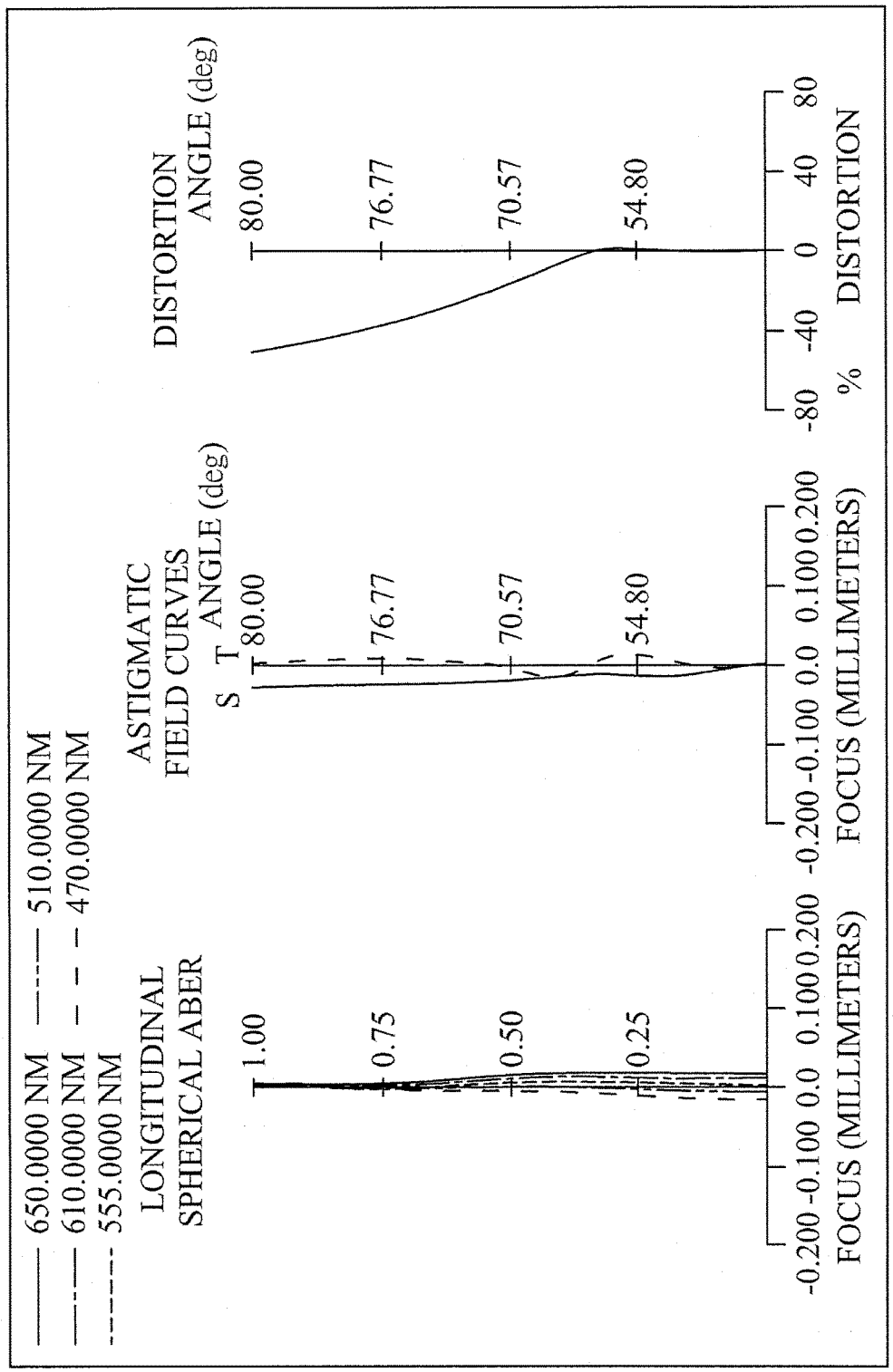
FIG. 6B shows the longitudinal spherical aberration curves, astigmatic field curves, and optical distortion curve of the optical image capturing system in the order from left to right according to the sixth embodiment of the present invention.
Figure 6C:
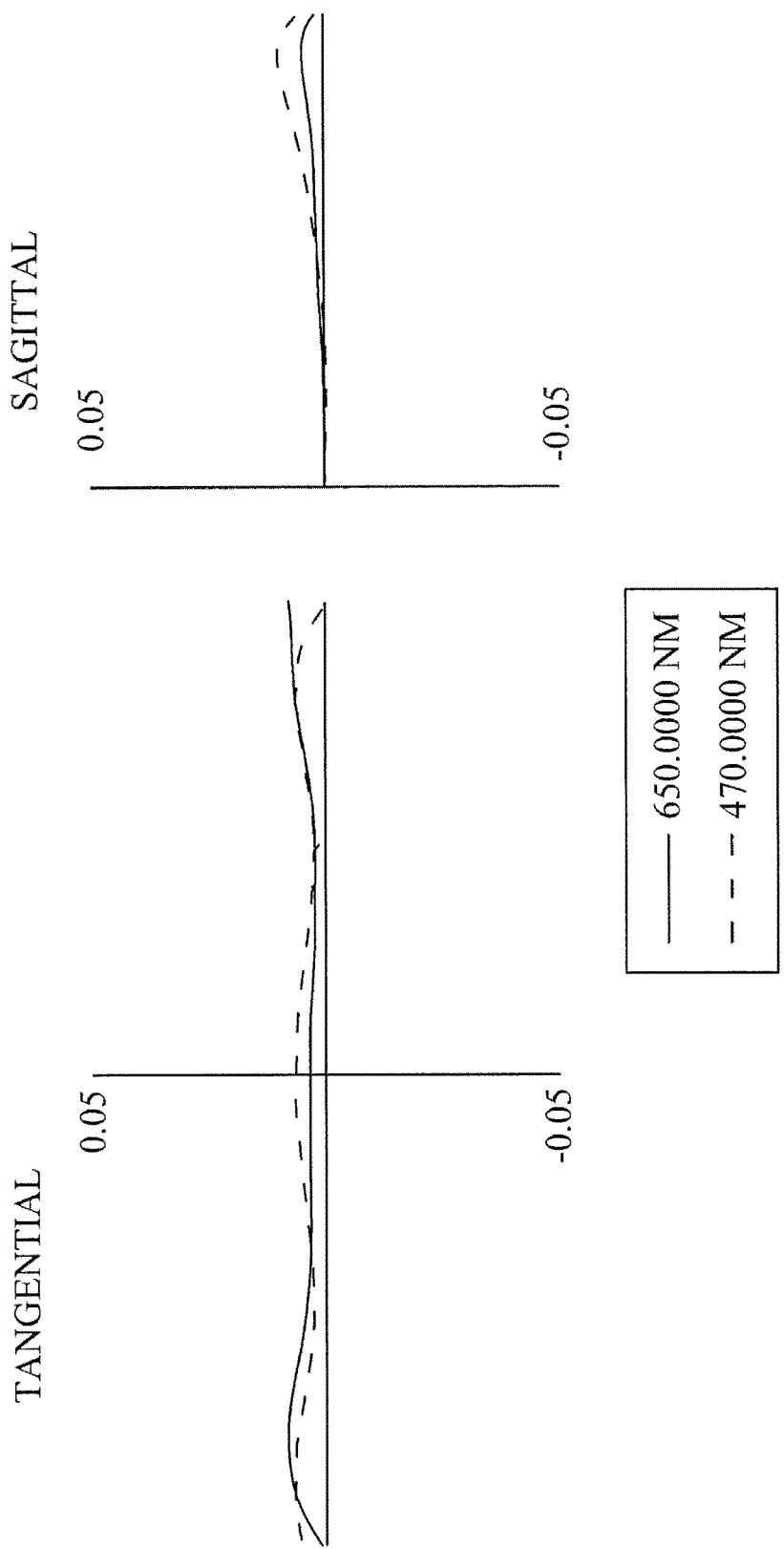
FIG. 6C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the sixth embodiment of the present disclosure.
Figure 6D:
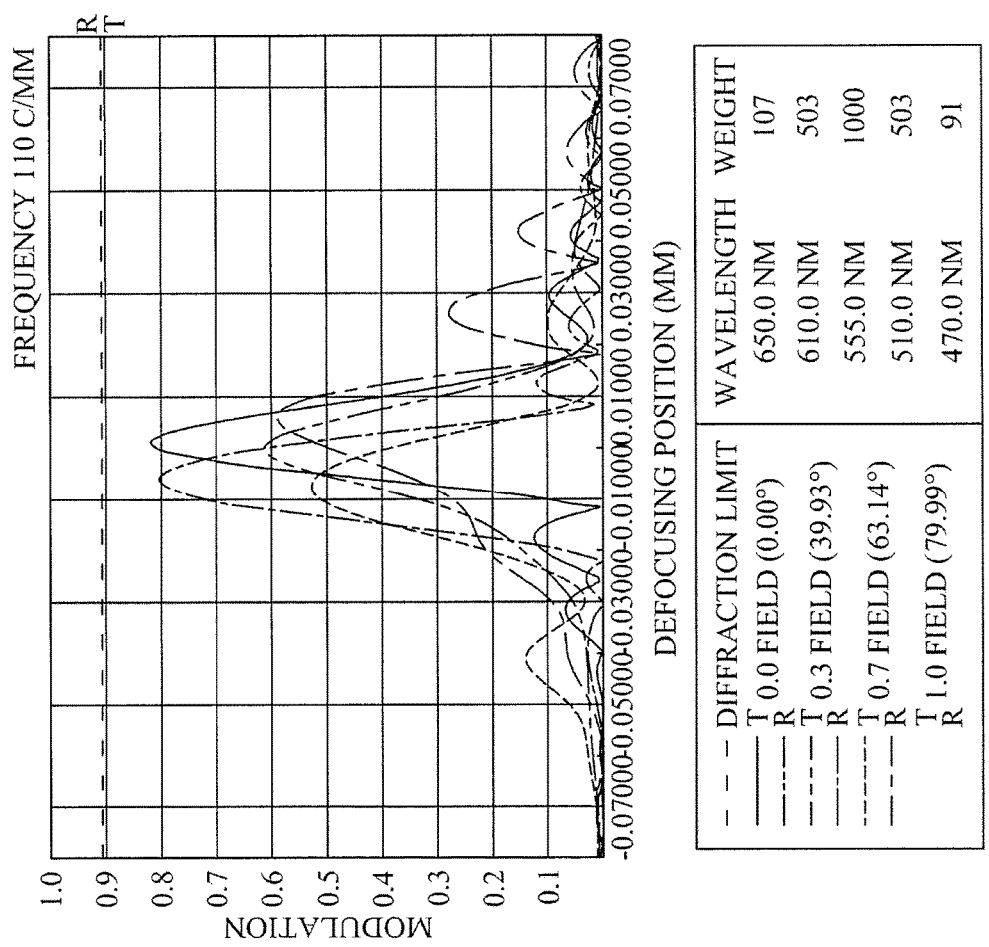
FIG. 6D is a diagram illustrating the through-focus MTF values for the visible light spectrum at the central field of view, 0.3 field of view and 0.7 field of view according to the sixth embodiment of the present disclosure.
Figure 6E:
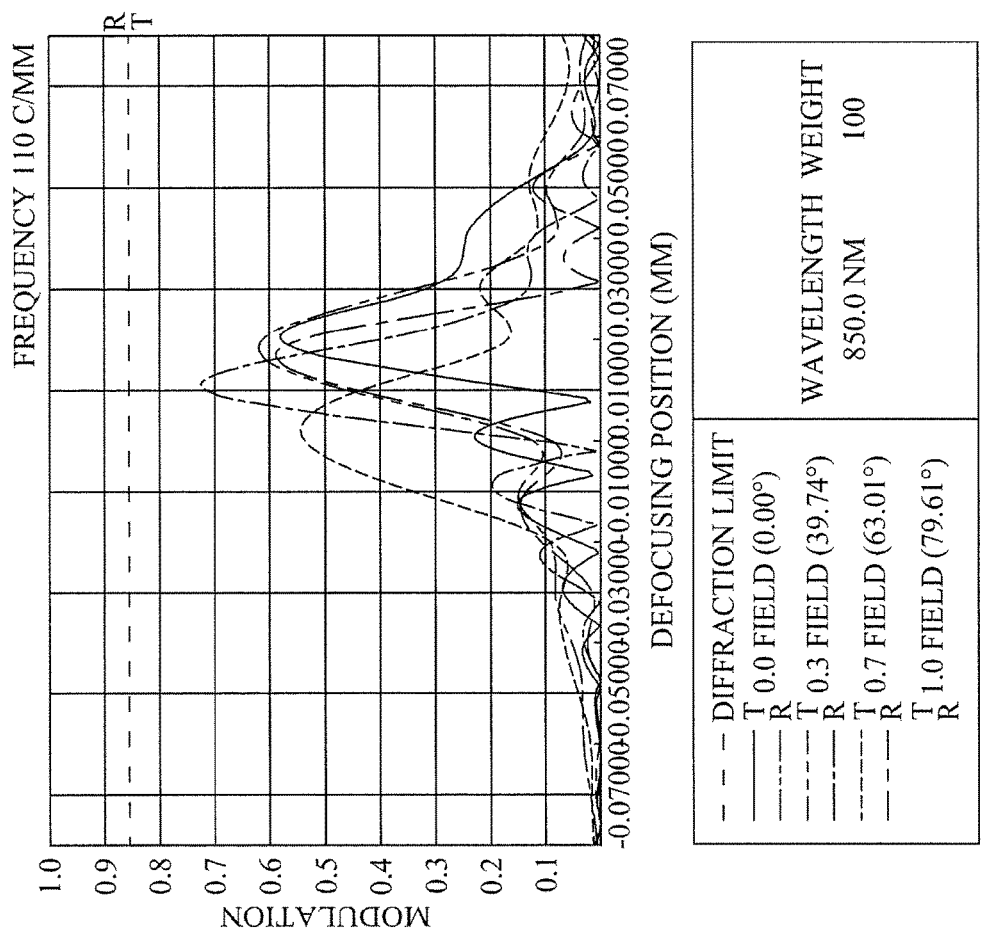
FIG. 6E is a diagram illustrating the through-focus MTF values for the infrared light spectrum at the central field of view, 0.3 field of view and 0.7 field of view according to the sixth embodiment of the present disclosure.

Please refer to FIG. 6A and FIG. 6B, wherein FIG. 6A is a schematic view of the optical image capturing system according to the sixth embodiment of the present invention and FIG. 6B shows the longitudinal spherical aberration curves, astigmatic field curves, and optical distortion curve of the optical image capturing system in the order from left to right according to the sixth embodiment of the present invention. FIG. 6C is a transverse aberration diagram of the longest operation wavelength and the shortest operation wavelength for tangential fan and sagittal fan, of which the longest operation wavelength and the shortest operation wavelength pass through an edge of aperture at the position of 0.7 field of view on the image plane, according to the sixth embodiment of the present disclosure. FIG. 6D is a diagram illustrating the through-focus MTF values for the visible light spectrum at the central field of view, 0.3 field of view and 0.7 field of view according to the first embodiment of the present disclosure. FIG. 6E is a diagram illustrating the through-focus MTF values for the infrared light spectrum at the central field of view, 0.3 field of view and 0.7 field of view according to the sixth embodiment of the present disclosure. As shown in FIG. 6A, in the order from an object-side surface to an image-side surface, the optical image capturing system includes a first lens 610, a second lens 620, a third lens 630, a fourth lens 640, an aperture 600, a fifth lens 650, a sixth lens 660, a seventh lens 670, an eighth lens 680, an Infrared filter 690, an image plane 692, and an image sensing device 694.

The first lens 610 has negative refractive power and is made of glass material. The object-side surface 612 of the first lens 610 is a concave surface and the image-side surface 614 of the first lens 610 is a concave surface. Both the object-side surface 612 and the image-side surface 614 are aspheric. The object-side surface 612 thereof has one inflection point.

The second lens 620 has negative refractive power and is made of glass material. The object-side surface 622 of the second lens 620 is a concave surface and the image-side surface 624 of the second lens 620 is a concave surface. Both the object-side surface 622 and the image-side surface 624 are aspheric. The object-side surface 622 has one inflection point. The object-side surface 622 thereof has one inflection point.

The third lens 630 has positive refractive power and is made of glass material. The object-side surface 632 of the third lens 630 is a concave surface and the image-side surface 634 of the third lens 630 is a convex surface. Both the object-side surface 632 and the image-side surface 634 are aspheric. The object-side surface 632 has one inflection point.

The fourth lens 640 has negative refractive power and is made of plastic material. The object-side surface 642 of the fourth lens 640 is a convex surface and the image-side surface 644 of the fourth lens 640 is a concave surface. Both the object-side surface 642 and the image-side surface 644 are aspheric.

The fifth lens 650 has positive refractive power and is made of glass material. The object-side surface 652 of the fifth lens 650 is a convex surface and the image-side surface 654 of the fifth lens 650 is a convex surface. Both the object-side surface 652 and the image-side surface 654 are aspheric. The object-side surface 652 thereof has one inflection point.

The sixth lens 660 has negative refractive power and is made of plastic material. The object-side surface 662 thereof is a concave surface and the image-side surface 664 thereof is a concave surface. Both the object-side surface 662 and the image-side surface 664 are aspheric. Hereby, the angle of striking on the sixth lens 660 in each field of view may be effectively adjusted so as to improve the aberration.

The seventh lens 670 has positive refractive power and is made of glass material. The object-side surface 672 thereof is a concave surface and the image-side surface 674 thereof is a convex surface. Both the object-side surface 672 and the image-side surface 674 are aspheric. Hereby, the configuration is beneficial to shorten the back focal length of the optical image capturing system so as to keep its miniaturization. Besides, the object-side surface 672 has two inflection points and the image-side surface 674 has one inflection point. Hence, the incident angle of the off-axis rays can be reduced effectively and thereby further correcting the off-axis aberration.

The eighth lens 680 has positive refractive power and is made of glass material. The object-side surface 682 thereof is a convex surface and the image-side surface 684 thereof is a convex surface. Both the object-side surface 682 and the image-side surface 684 are aspheric. Hereby, the configuration is beneficial to shorten the back focal length of the optical image capturing system so as to keep its miniaturization. Besides, the image-side surface 684 has one inflection point. Hence, the incident angle of the off-axis rays can be reduced effectively and thereby further correcting the off-axis aberration.

The Infrared filter 690 is made of glass material and is disposed between the eighth lens 680 and the image plane 692. The Infrared filter 690 does not affect the focal length of the optical image capturing system.

The contents in Tables 11 and 12 below should be incorporated into the reference of the present embodiment.

TABLE 11

Lens Parameters for the Sixth Embodiment
f(focal length) = 1.7990 mm; f/HEP = 1.2; HAF(half angle of view) = 80.0019 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | Lens 1 | −170.7343334 | 7.520 | Glass | 1.497 | 81.61 | −31.2033 |
| 2 | | 17.34995131 | 24.324 | | | | |
| 3 | Lens 2 | −104.8524943 | 4.721 | Glass | 1.639 | 44.87 | −20.0233 |
| 4 | | 14.9061928 | 8.049 | | | | |
| 5 | Lens 3 | −97.02023992 | 39.313 | Glass | 2.003 | 19.32 | 30.6599 |
| 6 | | −28.30030412 | 3.445 | | | | |
| 7 | Lens 4 | 8.679254083 | 3.407 | Plastic | 1.661 | 20.40 | −36.3226 |
| 8 | | 5.386046204 | 4.344 | | | | |
| 9 | Aperture | 1E+18 | 1.077 | | | | |

TABLE 11-continued

Lens Parameters for the Sixth Embodiment
f(focal length) = 1.7990 mm; f/HEP = 1.2; HAF(half angle of view) = 80.0019 deg

| Surface No | | Curvature Radius | Thickness (mm) | Material | Refractive Index | Coefficient of Dispersion | Focal Length |
|---|---|---|---|---|---|---|---|
| 10 | Lens 5 | 11.110907 | 4.815 | Glass | 1.497 | 81.61 | 10.5412 |
| 11 | | −8.52093511 | 2.625 | | | | |
| 12 | Lens 6 | −8.013128971 | 1.169 | Plastic | 1.661 | 20.40 | −9.45995 |
| 13 | | 31.37125086 | 0.635 | | | | |
| 14 | Lens 7 | −29.64872917 | 2.585 | Glass | 1.497 | 81.61 | 17.8324 |
| 15 | | −7.033031619 | 0.050 | | | | |
| 16 | Lens 8 | 12.07947786 | 9.318 | Glass | 2.001 | 29.13 | 10.352 |
| 17 | | −46.69900375 | 1.000 | | | | |
| 18 | Infrared filter | 1E+18 | 0.300 | BK_7 | 1.517 | 64.2 | |
| 19 | | 1E+18 | 0.699 | | | | |
| 20 | Image Plane | 1E+18 | −0.003 | | | | |

Reference Wavelength (d-line) = 555 nm

TABLE 12

The Aspheric Coefficients of the Sixth Embodiment
Table 12: Aspheric Coefficients

| | Surface No | | | | | |
|---|---|---|---|---|---|---|
| | 1 | 2 | 3 | 4 | 5 | 6 |
| k | 7.894033E+00 | −3.788562E−01 | −3.184856E+00 | −4.861005E−02 | −1.069175E+00 | −1.001094E+00 |
| A4 | 5.333454E−06 | −2.409881E−05 | 1.244563E−06 | −2.256919E−05 | 3.809418E−06 | 1.419848E−05 |
| A6 | −4.758083E−10 | −9.027180E−09 | 1.634623E−09 | −3.372145E−08 | 6.302888E−09 | 2.403291E−07 |
| A8 | −1.886676E−13 | 1.008199E−10 | 2.950062E−12 | −5.846059E−11 | 3.309783E−11 | −1.847500E−09 |
| A10 | 8.296853E−17 | −4.059811E−14 | −4.650102E−15 | −7.696123E−13 | 4.639312E−14 | 3.686305E−12 |
| A12 | 0.000000E+00 | 0.000000E+00 | 0.000000E+00 | 0.000000E+00 | 0.000000E+00 | 0.000000E+00 |

| | Surface No | | | | | |
|---|---|---|---|---|---|---|
| | 7 | 8 | 10 | 11 | 12 | 13 |
| k | 9.189787E−03 | −2.202689E−03 | −3.497016E−01 | 5.036818E−02 | 1.253105E−01 | −1.571200E+01 |
| A4 | −2.049173E−04 | −5.694960E−04 | −6.366809E−05 | 2.750097E−04 | 2.645454E−05 | −1.862266E−04 |
| A6 | −8.242483E−07 | −1.082842E−05 | 1.149904E−08 | −1.082315E−05 | −9.837898E−07 | 4.565016E−06 |
| A8 | 1.188838E−07 | 7.326892E−07 | −2.331187E−07 | 1.549108E−07 | 8.155852E−07 | 6.791231E−07 |
| A10 | −9.588679E−10 | −9.465156E−09 | 3.430276E−09 | −4.367885E−11 | −1.109404E−08 | −1.597944E−08 |
| A12 | 0.000000E+00 | 0.000000E+00 | 0.000000E+00 | 0.000000E+00 | 0.000000E+00 | 0.000000E+00 |

| | Surface No | | | |
|---|---|---|---|---|
| | 14 | 15 | 16 | 17 |
| k | −5.000000E+01 | −8.998607E−01 | −1.430685E−01 | −4.622954E+01 |
| A4 | 2.590479E−04 | 2.816869E−04 | −4.516530E−05 | 6.882074E−05 |
| A6 | 7.567558E−06 | 1.077331E−05 | 6.086240E−07 | 3.668719E−07 |
| A8 | 4.329546E−07 | 1.822003E−07 | 8.957219E−09 | 2.128179E−08 |
| A10 | −1.202629E−08 | −1.214532E−09 | −4.083764E−11 | 8.566527E−10 |
| A12 | 0.000000E+00 | 0.000000E+00 | 0.000000E+00 | 0.000000E+00 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12.

| Sixth Embodiment (Primary Reference Wavelength = 555 nm) | | | | | |
|---|---|---|---|---|---|
| |f/f1| | |f/f2| | |f/f3| | |f/f4| | |f/f5| | |f/f6| |
| 0.0577 | 0.0898 | 0.0587 | 0.0495 | 0.1707 | 0.1902 |

| Sixth Embodiment (Primary Reference Wavelength = 555 nm) | | | | | |
|---|---|---|---|---|---|
| \|f/f7\| | \|f/f8\| | \|f1/f2\| | \|f2/f3\| | \|f6/f7\| | \|f7/f8\| |
| 0.1009 | 0.1738 | 1.5583 | 0.6531 | 0.5305 | 1.7226 |
| IN12/f | IN78/f | (TP1 + IN12)/TP2 | | (TP8 + IN78)/TP7 | |
| 13.5211 | 0.0278 | 6.7444 | | 3.6244 | |
| HOS | InTL | HOS/HOI | InS/HOS | ODT % | TDT % |
| 119.3940 | 117.3980 | 23.8788 | 0.2033 | −51.0033 | 52.4141 |
| HVT11 | HVT12 | HVT21 | HVT22 | HVT31 | HVT32 |
| 17.3776 | 0.0000 | 0.0000 | 0.0000 | 0.0000 | 0.0000 |
| HVT41 | HVT42 | HVT51 | HVT52 | HVT61 | HVT62 |
| 0.0000 | 0.0000 | 0.0000 | 0.0000 | 0.0000 | 0.0000 |
| HVT71 | HVT72 | HVT81 | HVT82 | HVT82/HOI | HVT82/HOS |
| 3.6207 | 5.7618 | 0.0000 | 5.2088 | 1.0418 | 0.0436 |
| PSTA | PLTA | NSTA | NLTA | SSTA | SLTA |
| 0.001 mm | 0.008 mm | 0.006 mm | 0.001 mm | 0.006 mm | 0.002 mm |
| VSFS0 | VSFS3 | VSFS7 | VTFS0 | VTFS3 | VTFS7 |
| 0.000 | −0.010 | 0.010 | 0.000 | 0.000 | −0.010 |
| VSMTF0 | VSMTF3 | VSMTF7 | VTMTF0 | VTMTF3 | VTMTF7 |
| 0.807 | 0.714 | 0.518 | 0.807 | 0.613 | 0.511 |
| ISFS0 | ISFS3 | ISFS7 | ITFS0 | ITFS3 | ITFS7 |
| 0.020 | 0.010 | 0.020 | 0.020 | 0.020 | 0.000 |
| ISMTF0 | ISMTF3 | ISMTF7 | ITMTF0 | ITMTF3 | ITMTF7 |
| 0.579 | 0.715 | 0.546 | 0.579 | 0.613 | 0.536 |
| FS | AIFS | AVFS | AFS | | |
| 0.020 | 0.015 | −0.002 | 0.017 | | |

The values pertaining to the outline curve lengths are obtainable according to the data in Table 11 and Table 12:

| Sixth Embodiment (Primary Reference Wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.750 | 0.749 | −0.00056 | 99.93% | 7.520 | 9.96% |
| 12 | 0.750 | 0.749 | −0.00033 | 99.96% | 7.520 | 9.96% |
| 21 | 0.750 | 0.749 | −0.00056 | 99.93% | 4.721 | 15.86% |
| 22 | 0.750 | 0.749 | −0.00025 | 99.97% | 4.721 | 15.87% |
| 31 | 0.750 | 0.749 | −0.00056 | 99.93% | 39.313 | 1.91% |
| 32 | 0.750 | 0.749 | −0.00048 | 99.94% | 39.313 | 1.91% |
| 41 | 0.750 | 0.750 | 0.00036 | 100.05% | 3.407 | 22.01% |
| 42 | 0.750 | 0.751 | 0.00185 | 100.25% | 3.407 | 22.05% |
| 51 | 0.750 | 0.750 | 0.00000 | 100.00% | 4.815 | 15.57% |
| 52 | 0.750 | 0.750 | 0.00040 | 100.05% | 4.815 | 15.57% |
| 61 | 0.750 | 0.750 | 0.00053 | 100.07% | 1.169 | 64.18% |
| 62 | 0.750 | 0.749 | −0.00049 | 99.93% | 1.169 | 64.09% |
| 71 | 0.750 | 0.749 | −0.00049 | 99.93% | 2.585 | 28.98% |
| 72 | 0.750 | 0.750 | 0.00084 | 100.11% | 2.585 | 29.03% |
| 81 | 0.750 | 0.749 | −0.00008 | 99.99% | 9.318 | 8.04% |
| 82 | 0.750 | 0.749 | −0.00053 | 99.93% | 9.318 | 8.04% |

-continued

| Sixth Embodiment (Primary Reference Wavelength = 555 nm) | | | | | | |
|---|---|---|---|---|---|---|
| ARS | EHD | ARS value | ARS – EHD | (ARS/EHD)% | TP | ARS/TP (%) |
| 11 | 52.530 | 61.441 | 8.911 | 116.96% | 7.520 | 817.06% |
| 12 | 21.819 | 34.052 | 12.232 | 156.06% | 7.520 | 452.83% |
| 21 | 19.516 | 19.584 | 0.069 | 100.35% | 4.721 | 414.79% |
| 22 | 12.796 | 14.673 | 1.877 | 114.67% | 4.721 | 310.78% |
| 31 | 12.565 | 12.586 | 0.021 | 100.17% | 39.313 | 32.01% |
| 32 | 10.228 | 10.381 | 0.153 | 101.50% | 39.313 | 26.41% |
| 41 | 6.608 | 7.423 | 0.815 | 112.33% | 3.407 | 217.84% |
| 42 | 4.607 | 5.360 | 0.753 | 116.35% | 3.407 | 157.32% |
| 51 | 5.297 | 5.460 | 0.163 | 103.08% | 4.815 | 113.39% |
| 52 | 5.618 | 6.103 | 0.485 | 108.63% | 4.815 | 126.74% |
| 61 | 5.310 | 5.659 | 0.349 | 106.58% | 1.169 | 484.24% |
| 62 | 5.839 | 5.891 | 0.052 | 100.90% | 1.169 | 504.10% |
| 71 | 5.934 | 5.972 | 0.038 | 100.64% | 2.585 | 231.05% |
| 72 | 6.081 | 6.324 | 0.244 | 104.01% | 2.585 | 244.68% |
| 81 | 7.774 | 8.453 | 0.678 | 108.72% | 9.318 | 90.71% |
| 82 | 6.000 | 6.004 | 0.004 | 100.07% | 9.318 | 64.43% |

The following values for the conditional expressions can be obtained from the data in Table 11 and Table 12:

| Values Related to Inflection Point of Sixth Embodiment (Primary Reference Wavelength = 555 nm) | | | | | | | |
|---|---|---|---|---|---|---|---|
| HIF111 | 9.9022 | HIF111/HOI | 1.9804 | SGI111 | −0.2385 | \|SGI111\|/(\|SGI111\| + TP1) | 0.0307 |
| HIF211 | 16.5491 | HIF211/HOI | 3.3098 | SGI211 | −1.1523 | \|SGI211\|/(\|SGI211\| + TP2) | 0.1962 |
| HIF311 | 10.4607 | HIF311/HOI | 2.0921 | SGI311 | −0.5045 | \|SGI311\|/(\|SGI311\| + TP3) | 0.0127 |
| HIF511 | 5.1967 | HIF511/HOI | 1.0393 | SGI511 | 1.1409 | \|SGI511\|/(\|SGI511\| + TP5) | 0.1916 |
| HIF611 | 4.8210 | HIF611/HOI | 0.9642 | SGI611 | −1.4742 | \|SGI611\|/(\|SGI611\| + TP6) | 0.5578 |
| HIF621 | 5.3326 | HIF621/HOI | 1.0665 | SGI621 | 0.5145 | \|SGI621\|/(\|SGI621\| + TP6) | 0.3057 |
| HIF711 | 2.2291 | HIF711/HOI | 0.4458 | SGI711 | −0.0711 | \|SGI711\|/(\|SGI711\| + TP7) | 0.0268 |
| HIF712 | 5.6278 | HIF712/HOI | 1.1256 | SGI712 | 0.1515 | \|SGI712\|/(\|SGI712\| + TP7) | 0.0554 |
| HIF721 | 3.8485 | HIF721/HOI | 0.7697 | SGI721 | −0.9563 | \|SGI721\|/(\|SGI721\| + TP7) | 0.2701 |
| HIF821 | 3.4748 | HIF821/HOI | 0.6950 | SGI821 | −0.1107 | \|SGI821\|/(\|SGI821\| + TP8) | 0.0117 |

Although the present invention is disclosed by the aforementioned embodiments, those embodiments do not serve to limit the scope of the present invention. A person skilled in the art can perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens with negative refractive power;
   a second lens with negative refractive power;
   a third lens with positive refractive power;
   a fourth lens with positive or negative refractive power;
   a fifth lens with positive refractive power;
   a sixth lens with negative refractive power;
   a seventh lens with positive refractive power;
   an eighth lens with positive refractive power;
   a first image plane, which is an image plane specifically for visible light and perpendicular to an optical axis, and a central field of view of the first image plane has a maximum value of through-focus modulation transfer rate (MTF) at a first spatial frequency; and
   a second image plane, which is an image plane specifically for infrared light and perpendicular to the optical axis, and a central field of view of the second image plane has a maximum value of through-focus modulation transfer rate (MTF) at the first spatial frequency;
   wherein focal lengths of the eight lenses are denoted as f1, f2, f3, f4, f5, f6, f7 and f8 respectively, a focal length of the optical image capturing system is denoted as f, an entrance pupil diameter of the optical image capturing system is denoted as HEP, a distance on the optical axis from an object-side surface of the first lens to the first image plane is denoted as HOS, a distance on the optical axis from the object-side surface of the first lens to an image-side surface of the eighth lens is denoted as InTL, half of a maximum angle of view of the optical image capturing system is denoted as HAF, the optical image capturing system has a maximum image height HOI perpendicular to the optical axis on the first image plane, a distance on the optical axis between the first image plane and the second image plane is denoted as FS, and conditions as follows are satisfied: $1.0 \leq f/HEI \leq 10.0$, $0 \text{ deg} < HAF \leq 150 \text{ deg}$, and $|FS| \leq 100$ μm.

2. The optical image capturing system of claim 1, wherein a wavelength of the infrared light ranges from 700 nm to 1300 nm, the first spatial frequency is denoted as SP1, and a condition as follows is satisfied: $SP1 \leq 440$ cycles/mm.

3. The optical image capturing system of claim 1, wherein when a vertical height of ½HEP from the optical axis is smaller than a half maximum diameter of any one of the eight lenses, an outline curve starting from an intersection point of the optical axis and any surface of any one of the eight lenses, travelling along an outline of the surface, and ending at a coordinate point on the surface which has the vertical height of ½HEP from the optical axis, has an outline curve length denoted as ARE, and a condition as follows is satisfied: 0.9≤2(ARE/HEP)≤2.0.

4. The optical image capturing system of claim 1, wherein a maximum effective half diameter of any surface of any one of the eight lenses is denoted as EHD, an outline curve starting from an intersection point of the optical axis and any surface of any one of the eight lenses, travelling along an outline of the surface, and ending at a point which defines the maximum effective half diameter, has an outline curve length denoted as ARS, and a condition as follows is satisfied: 0.9≤ARS/EHD≤2.0.

5. The optical image capturing system of claim 1, wherein the optical image capturing system satisfies a condition as follows: 40 deg<HAF≤100 deg.

6. The optical image capturing system of claim 1, wherein when a vertical height of ½HEP from the optical axis is smaller than a half maximum diameter of the eighth lens, an outline curve starting from an intersection point of the optical axis and the object-side surface of the eighth lens, travelling along an outline of the surface, and ending at a coordinate point on the surface which has a vertical height of ½HEP from the optical axis, has an outline curve length denoted as ARE81, an outline curve starting from an intersection point of the optical axis and the image-side surface of the eighth lens, travelling along an outline of the surface, and ending at a coordinate point on the surface which has a vertical height of ½HEP from the optical axis, has an outline curve length denoted as ARE82, a central thickness of the eighth lens on the optical axis is denoted as TP8, and conditions as follows are satisfied: 0.05≤ARE81/TP85≤35, and 0.05≤ARE82/TP8≤35.

7. The optical image capturing system of claim 1, wherein the optical image capturing system has a maximum image height HOI perpendicular to the optical axis on the image plane, a transverse aberration of a longest operation wavelength of a positive direction tangential fan of the optical image capturing system passing through an edge of an entrance pupil and striking at a position of 0.7 HOT on the image plane is denoted as PLTA, a transverse aberration of a shortest operation wavelength of the positive direction tangential fan of the optical image capturing system passing through the edge of the entrance pupil and striking at the position of 0.7 HOI on the image plane is denoted as PSTA, a transverse aberration of the longest operation wavelength of a negative direction tangential fan of the optical image capturing system passing through the edge of the entrance pupil and striking at the position of 0.7 HOI on the image plane is denoted as NLTA, a transverse aberration of the shortest operation wavelength of a negative direction tangential fan of the optical image capturing system passing through the edge of the entrance pupil and striking at the position of 0.7 HOI on the image plane is denoted as NSTA, a transverse aberration of the longest operation wavelength of a sagittal fan of the optical image capturing system passing through the edge of the entrance pupil and striking at the position of 0.7 HOI on the image plane is denoted as SLTA, a transverse aberration of the shortest operation wavelength of the sagittal fan of the optical image capturing system passing through the edge of the entrance pupil and striking at the position of 0.7 HOT on the image plane is denoted as SSTA, and conditions as follows are satisfied: PLTA≤100 µm, PSTA≤100 µm, NLTA≤100 µm, NSTA≤100 µm, SLTA≤100 µm, and SSTA≤100 µm.

8. The optical image capturing system of claim 1, further comprising an aperture, wherein a distance on the optical axis from the aperture to the first image plane is denoted as InS, and a condition as follows is satisfied: 0.2≤InS/HOS≤1.1.

9. An optical image capturing system, from an object side to an image side, comprising:
    a first lens with negative refractive power;
    a second lens with negative refractive power;
    a third lens with positive refractive power;
    a fourth lens with positive or negative refractive power;
    a fifth lens with positive refractive power;
    a sixth lens with negative refractive power;
    a seventh lens with positive refractive power;
    an eighth lens with positive refractive power;
    a first image plane, which is an image plane specifically for visible light and perpendicular to an optical axis, and a central field of view of the first image plane has a maximum value of through-focus modulation transfer rate (MTF) at a first spatial frequency of 110 cycles/mm; and
    a second image plane, which is an image plane specifically for infrared light and perpendicular to the optical axis, and a central field of view of the second image plane has a maximum value of through-focus modulation transfer rate (MTF) at the first spatial frequency of 110 cycles/mm;
    wherein at least one of the eight lenses is made of plastic, the optical image capturing system has a maximum image height HOT perpendicular to the optical axis on the image plane, focal lengths of the eight lenses are denoted as f1, f2, 13, f4, f5, f6, f7 and f8 respectively, a focal length of the optical image capturing system is denoted as f, an entrance pupil diameter of the optical image capturing system is denoted as HEP, a distance on the optical axis from an object-side surface of the first lens to the first image plane is denoted as HOS, a distance on the optical axis from the object-side surface of the first lens to an image-side surface of the eighth lens is denoted as InTL, half of a maximum angle of view of the optical image capturing system is denoted as HAF, a distance on the optical axis between the first image plane and the second image plane is denoted as FS, when a vertical height of ½HEP from the optical axis is smaller than a half maximum diameter of any one of the eight lenses, an outline curve starting from an intersection point of the optical axis and any surface of the any one of the eight lenses, travelling along an outline of the surface, and ending at a coordinate point on the surface which has the vertical height of ½HEP from the optical axis, has an outline curve length denoted as ARE, and conditions as follows are satisfied: 1.0≤f/HEP≤10.0, 0 deg<HAF≤150 deg, |FS|≤100 µm, and 0.9≤2(ARE/HEP)≤2.0.

10. The optical image capturing system of claim 9, wherein a maximum effective half diameter of any surface of any one of the eight lenses is denoted as EHD, an outline curve starting from an intersection point of the optical axis and any surface of any one of the eight lenses, travelling along an outline of the surface, and ending at a point which defines the maximum effective half diameter, has an outline curve length denoted as ARS, and a condition as follows is satisfied: 0.9≤ARS/EHD≤2.0.

11. The optical image capturing system of claim 9, wherein there are air gaps between all of the eight lenses.

12. The optical image capturing system of claim 9, wherein at least one surface of at least one lens among the eight lenses has at least one inflection point.

13. The optical image capturing system of claim 9, wherein the optical image capturing system has a maximum image height HOI perpendicular to the optical axis on the image plane, a transverse aberration of a longest operation wavelength of a visible light of a positive direction tangential fan of the optical image capturing system passing through an edge of an entrance pupil and striking at a position of 0.7 HOI on the image plane is denoted as PLTA, a transverse aberration of a shortest operation wavelength of the visible light of the positive direction tangential fan of the optical image capturing system passing through the edge of the entrance pupil and striking at the position of 0.7 HOI on the image plane is denoted as PSTA, a transverse aberration of the longest operation wavelength of the visible light of a negative direction tangential fan of the optical image capturing system passing through the edge of the entrance pupil and striking at the position of 0.7 HOT on the image plane is denoted as NLTA, a transverse aberration of the shortest operation wavelength of the visible light of a negative direction tangential fan of the optical image capturing system passing through the edge of the entrance pupil and striking at the position of 0.7 HOI on the image plane is denoted as NSTA, a transverse aberration of the longest operation wavelength of the visible light of a sagittal fan of the optical image capturing system passing through the edge of the entrance pupil and striking at the position of 0.7 HOI on the image plane is denoted as SLTA, a transverse aberration of the shortest operation wavelength of the visible light of the sagittal fan of the optical image capturing system passing through the edge of the entrance pupil and striking at the position of 0.7 HOI on the image plane is denoted as SSTA, and conditions as follows are satisfied: PLTA≤200 µm, PSTA≤200 µm, NLTA≤200 µm, NSTA≤200 µm, SLTA≤200 µm, and SSTA≤200 µm.

14. The optical image capturing system of claim 9, wherein at least two lenses among the eight lenses respectively have at least one inflection point on at least one surface thereof.

15. The optical image capturing system of claim 9, wherein a distance between the first lens and the second lens on the optical axis is IN12, and a condition as follows is satisfied: 0<IN12/f≤5.

16. The optical image capturing system of claim 9, wherein the optical image capturing system has the maximum image height HOT perpendicular to the optical axis on the image plane, and a condition as follows is satisfied: HOS/HOI≥1.2.

17. The optical image capturing system of claim 9, wherein at least one lens among the first, second, third, fourth, fifth, sixth, seventh, and eighth lenses of the optical image capturing system is a light filtering element for filtering light with a wavelength less than 500 nm.

18. An optical image capturing system, from an object side to an image side, comprising:
a first lens with negative refractive power;
a second lens with negative refractive power;
a third lens with positive refractive power;
a fourth lens with positive or negative refractive power;
a fifth lens with positive refractive power;
a sixth lens with negative refractive power;
a seventh lens with positive refractive power;
an eighth lens with positive refractive power;
a first average image plane, which is an image plane specifically for visible light and perpendicular to the optical axis, and configured at an average position of the through-focus positions where all of central field of view, 0.3 field of view and 0.7 field of view of the optical image capturing system have their respective maximums of through-focus modulation transfer rates (values of MTF) of the visible light at a first spatial frequency of 110 cycles/mm; and
a second average image plane, which is an image plane specifically for infrared light and perpendicular to the optical axis, and configured at an average position of the through-focus positions where all of central field of view, 0.3 field of view and 0.7 field of view of the optical image capturing system have their respective maximums of through-focus modulation transfer rates (values of MTF) of the infrared light at the first spatial frequency of 110 cycles/mm;
wherein the optical image capturing system has a maximum image height HOT perpendicular to the optical axis on the image plane, focal lengths of the eight lenses are denoted as f1, f2, f3, f4, f5, f6, f7 and f8 respectively, a focal length of the optical image capturing system is denoted as f, an entrance pupil diameter of the optical image capturing system is denoted as HEP, half of a maximum angle of view of the optical image capturing system is denoted as HAF, a distance on the optical axis from an object-side surface of the first lens to the first average image plane is denoted as HOS, a distance on the optical axis from the object-side surface of the first lens to an image-side surface of the eighth lens is denoted as InTL, a distance on the optical axis between the first average image plane and the second average image plane is denoted as AFS, when a vertical height of ½HEP from the optical axis is smaller than a half maximum diameter of any one of the eight lenses, an outline curve starting from an intersection point of the optical axis and any surface of the any one of the eight lenses, travelling along an outline of the surface, and ending at a coordinate point on the surface which has the vertical height of ½HEP from the optical axis, has an outline curve length denoted as ARE, and conditions as follows are satisfied: 1≤f/HEP≤10, 0 deg<HAF≤150 deg, |AFS|≤100 µm, and 0.9≤2(ARE/HEP)≤2.0.

19. The optical image capturing system of claim 18, wherein a maximum effective half diameter of any surface of any one of the eight lenses is denoted as EHD, an outline curve starting from an intersection point of the optical axis and any surface of any one of the eight lenses, travelling along an outline of the surface, and ending at a point which defines the maximum effective half diameter, has an outline curve length denoted as ARS, and a condition as follows is satisfied: 0.9≤ARS/EHD≤2.0.

20. The optical image capturing system of claim 18, wherein there are air gaps between all of the eight lenses.

21. The optical image capturing system of claim 18, further comprising an aperture and an image sensing element, wherein the image sensing element is disposed after the first average image plane and at least equipped with 100 thousand pixels, a distance on the optical axis from the aperture to the first average image plane is denoted as InS, and a formula as follows is satisfied: 0.2≤InS/HOS≤1.1.

* * * * *